(12) United States Patent
Ogura et al.

(10) Patent No.: US 7,423,770 B2
(45) Date of Patent: Sep. 9, 2008

(54) IMAGE-FORMING-DEVICE MANAGEMENT SYSTEM CAPABLE OF OPERATING IN ENERGY-SAVING MODE

(75) Inventors: Masaaki Ogura, Kanagawa (JP);
Hidehiko Watanabe, Kanagawa (JP);
Koubun Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 352 days.

(21) Appl. No.: 11/096,186

(22) Filed: Apr. 1, 2005

(65) Prior Publication Data

US 2005/0179935 A1    Aug. 18, 2005

Related U.S. Application Data

(63) Continuation of application No. 09/874,994, filed on Jun. 7, 2001, now Pat. No. 6,961,136.

(30) Foreign Application Priority Data

| Jun. 8, 2000 | (JP) | ............................. 2000-172219 |
| Jun. 29, 2000 | (JP) | ............................. 2000-196899 |
| Feb. 26, 2001 | (JP) | ............................. 2001-051180 |

(51) Int. Cl.
*G06K 15/00* (2006.01)
*G06F 3/12* (2006.01)

(52) U.S. Cl. .................... 358/1.14; 358/1.15

(58) Field of Classification Search ................ 358/1.14, 358/1.15, 1.13, 1.16, 1.17, 1.1, 1.18, 407, 358/468, 437; 714/100, 1, 5, 6, 7, 14, 2; 399/1, 8, 9, 37; 347/2, 3, 5; 713/100, 300, 713/320, 321, 330, 340
See application file for complete search history.

(56) References Cited

U.S. PATENT DOCUMENTS

| 4,677,310 A | 6/1987 | Midorikawa et al. .......... 307/64 |
| 5,512,979 A | 4/1996 | Ogura ......................... 399/18 |
| 2002/0010854 A1 | 1/2002 | Ogura et al. ................ 713/100 |

FOREIGN PATENT DOCUMENTS

| DE | 44 22 206 | 1/1995 |
| EP | 0 509 525 | 10/1992 |
| EP | 0 768 582 | 4/1997 |
| JP | 9-191568 | 7/1997 |
| JP | 11-78166 | 3/1999 |
| JP | 2000-35732 | 2/2000 |

*Primary Examiner*—Dov Popovici
(74) *Attorney, Agent, or Firm*—Oblon, Spivak, McClelland, Maier & Neustadt, P.C.

(57) ABSTRACT

An image-forming-device management system includes an image-forming device, a data communication device and a central management device. A real-time clock circuit (RTC) of the data communication device compares a current time with a predetermined data transmission time. A CPU included in a part constantly supplied with electricity from a power source in the data communication device instructs a power-source controller to supply the electricity from the power source to a communication-related part including a network control unit (NCU), a modem and an image-forming-device interface, thereby activating the communication-related part. Subsequently, the CPU calls out the central management device by using the NCU, and transmits data acquired from the image-forming device in advance, to the central management device by using the modem.

54 Claims, 32 Drawing Sheets

FIG.12

| CODE | PROCESS NAME | CONTENTS OF PROCESS |
|---|---|---|
| 30 | SC CALL | AUTOMATIC REPORT WHEN SC IS GENERATED |
| 31 | MANUAL CALL | AUTOMATIC REPORT WHEN MANUAL SWITCH IS PRESSED |
| 32 | ALARM TRANSMISSION | AUTOMATIC REPORT WHEN ALARM IS GENERATED |
| 22 | BLOCK BILLING PROCESS | AUTOMATIC REPORT WHEN REACHING BLOCK BILLING NUMBER |
| 02 | DATA READING PROCESS | READ INTERNAL DATA OF PPC |
| 04 | DATA WRITING PROCESS | REWRITE INTERNAL DATA OF PPC |
| 03 | EXECUTION | EXECUTE TESTING, AND ETC BY REMOTE OPERATION |
| 08 | DEVICE-CODE CONFIRMATION | PROCESS FOR CHECKING COMMUNICATION FUNCTION |

FIG.13

| CODE | DATA LENGTH | CONTENTS |
|---|---|---|
| INFORMATION CODE | 11 | CODE INDICATING TYPE OF CONCRETE INFORMATION |
| DIGIT NUMBER OF DATA PART | 2 | · INDICATING DATA LENGTH OF DATA PART IN ASCII CODE<br>· "00" IF THERE IS NO DATA PART |
| DATA PART | VARIABLE | · CONTENTS OF EACH INFORMATION CODE<br>· DATA PART DOES NOT EXIST IF DIGIT NUMBER OF DATA PART IS "00" |

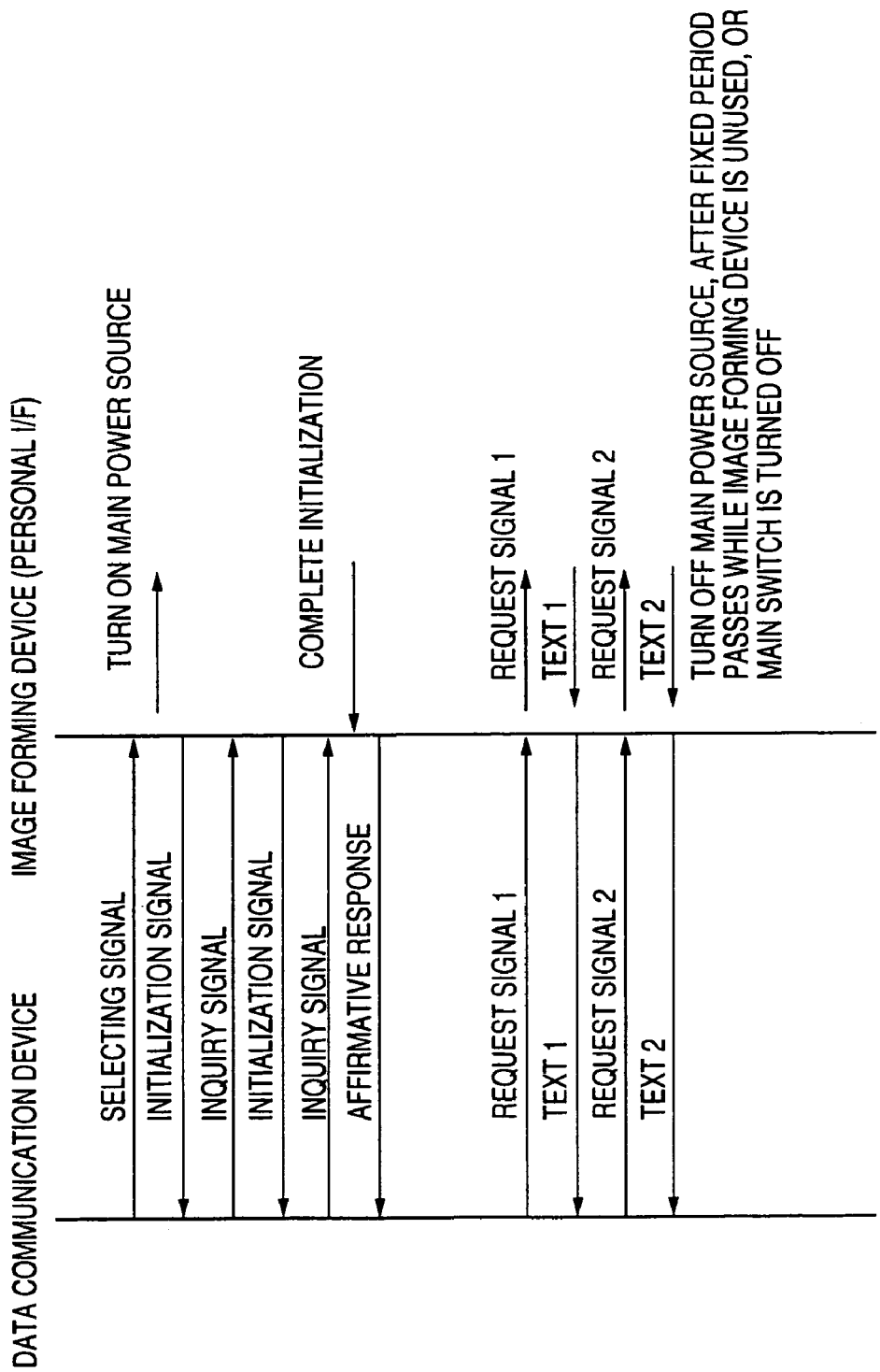

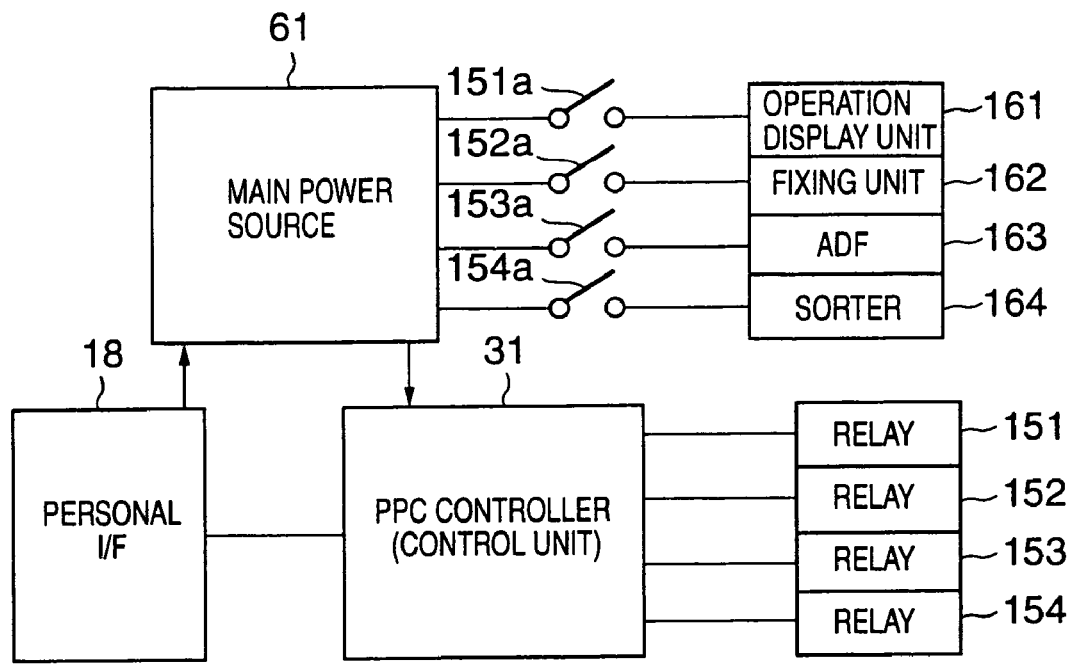

FIG.29
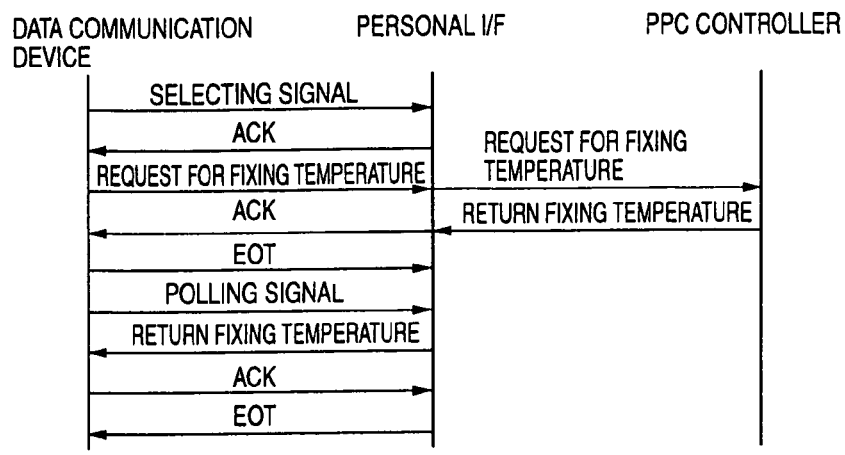
FIG.30
FIG.31
| BIT | PROCESS INFORMATION | NOTE |
|---|---|---|
| 0 | OPERATION UNIT 1:ON,0:OFF | |
| 1 | FIXING UNIT 1:ON,0:OFF | |
| 2 | ADF 1:ON,0:OFF | |
| 3 | SORTER 1:ON,0:OFF | |
| 4 | | |
| 5 | | |
| 6 | | |
| 7 | | |
FIG.32
| INFORMATION ABOUT REQUEST FOR FIXING TEMPERATURE | NOTE |
|---|---|
| 5101105020000 | |
FIG.33
FIG.34
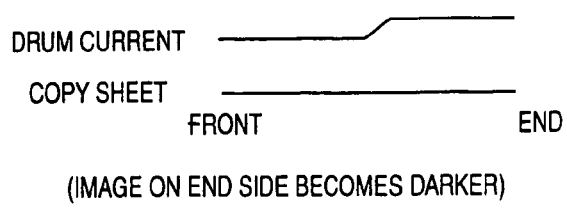
(IMAGE ON END SIDE BECOMES DARKER)

IMAGE-FORMING-DEVICE MANAGEMENT SYSTEM CAPABLE OF OPERATING IN ENERGY-SAVING MODE

BACKGROUND OF THE INVENTION

1. Field of the Invention

The present invention relates to a data communication device, an image-forming device such as a copy machine or a facsimile composite device, an image-forming-device management system composed of the data communication device and the image-forming device, and a method of controlling power supply in the image-forming-device management system.

2. Description of the Related Art

An image-forming-device management system enables each image-forming device installed in a large number of customer offices and the like to connect to a central management device installed in a service center by using a data communication device and a communication line such as a public line or an exclusive line. This image-forming device is defined as a copy machine, a printer, a facsimile device, or the like. Additionally, the central management device carries out remote management of the image-forming device through the communication line and the data communication device (a line adaptor). Such an image-forming-device management system is generally known.

In the above-described image-forming-device management system, the image-forming device transmits data to the data communication device periodically, for instance, at a certain time every day. Alternatively, the image-forming device transmits the data to the data communication device, in response to a data-transmission requesting signal received from the data communication device. This data is related to the image-forming device, and is, for instance, data that indicates a device status including log information such as a total number of formed images (a total counter value) and a surface temperature (a fixing temperature) of a fixing roller inside a fixing unit.

The data communication device stores the data received from the image-forming device in a memory. The data communication device, then, transmits the data stored in the memory to the central management device by calling out spontaneously and periodically, for instance, on a fixed date and time of every month. Alternatively, the data communication device transmits the data stored in the memory to the central management device, in response to a call signal, in fact, a data-transmission requesting signal included in each signal received continuously after the call signal, which corresponds to a call out made by the central management device, and is supplied through the communication line.

Additionally, the data communication device obtains data related to the image-forming device by transmitting the data-transmission requesting signal to the image-forming device in accordance with the call signal that corresponds to the call out made by the central management device, and is received through the communication line, and, then, transmits the data to the central management device.

In addition, there exists another type of an image-forming-device management system, in which an image-forming device having a function (communication control means) as a data communication device can be connected to a central management device installed in a service center, by use of a communication line, and the central management device executes remote management of the image-forming device through the communication line.

In such an image-forming-device management system, the image-forming device transmits data related to the image-forming device to the central management device, by calling out spontaneously and periodically, for instance, on a fixed date and time of every month, or by responding to a call signal that corresponds to a call out made by the central management device, and is received through the communication line.

On the other hand, one of recent image-forming devices such as copy machines or facsimile devices has an energy-saving function to stop supplying power from a power source to a part that consumes much electricity, by setting an energy-saving mode, for the purpose of saving energy or setting consumed energy low if a state in which the image-forming device is not used for a certain period, or if a fixed key operation on an operation display unit is performed.

A facsimile (FAX) device having the above-described energy-saving function is shown in FIG. 1, for example. FIG. 1 is a block diagram showing a structure of a related-art facsimile device that has an energy-saving function.

This facsimile device includes a CIG4 401, an NCU (Network Control Unit) 402, an FCU (Facsimile Control Unit) 403, a scanner 404, a plotter 405 and a main control unit 406. In addition, the facsimile device includes an operation display unit, a main power source and a sub power source, which are not shown in the figures.

The CIG4 401 is a unit for a G4 (Group-4 type) of a facsimile device. The NCU 402 is a network control unit that connects or disconnects lines, and detects connected lines. The FCU 403 is a facsimile control unit that controls communication with an external facsimile device, and includes a CPU (Central Processing Unit) 411, a ROM (Read Only Memory) 412, a RAM (Random Access Memory) 413, an RTC (Real Time Clock) 414, a UART (Universal Asynchronous Receiver/Transmitter) 415, a VIF (Video Interface) 416, a BUSCNT (Bus Control) 417, a DCR 418, a memory 419, a PORT 420, a FAX modem 421, a COMCNT (Communication Control) 422, an AFE (Analog Front End) 423, a DTMF 424, and the like.

The CPU 411 is a central processing unit that controls the FCU 403 entirely. The ROM 412 is a read only memory that stores every type of fixed data including a control program used by the CPU 411. The RAM 413 is a memory temporarily storing data, and is a work memory used by the CPU 411 for processing data, for instance. The RTC 414 is a real-time-clock circuit that includes a timer function generating a current time. The current time is known by the CPU 411 reading the current time generated by the RTC 414.

The UART 415 is a serial communication unit that functions as an interface exchanging a control signal with the main control unit 406. The VIF 416 is a video interface that exchanges image data (image information) with the main control unit 406. The BUSCNT 417 is a bus control circuit that connects or disconnects buses, and substitutes a bit on a bus with another bit on the other bus. The DCR 418 is a compression/decompression circuit that compresses or decompresses the image data. The memory 419 stores the image data. The PORT 420 is an I/O (Input/Output) port that controls input and output of each signal by following an instruction from the CPU 411.

The FAX modem 421 modulates or demodulates image data for a facsimile operation, which is received or to be transmitted. The COMCNT 422 is a communication control circuit that controls input and output of each signal by following an instruction from the CPU 411. In addition, the COMCNT 422 detects or receives a call signal (a ringer signal) corresponding to a call out made by an external facsimile device, and notifies the CPU 411 about the call signal, if the call signal is transmitted from a communication line to the facsimile device shown in FIG. 1. The AFE 423 is an analog front end (an analog signal control circuit) that amplifies and filters a signal from the communication line (a telephone line). The DTMF 424 detects a DTMF signal, for example, a combination code of "*#0#" transmitted from an external device to the facsimile device shown in FIG. 1 through the communication line.

The scanner 404 reads a document image. The plotter 405 forms or prints an image on a sheet of paper, based on image data read by the scanner 404, or image data received by the FCU 403 or the like from an external facsimile device. The main control unit 406 controls the FCU 403, the scanner 404 and the plotter 405 all together.

The facsimile device structured as described above stops supplying power to a display device on the operation display unit, the scanner 404 and the plotter 405 including a fixing roller inside a fixing unit, whose electricity consumption amounts are large, by turning the main power source off in a case in which the energy-saving mode is set. Additionally, the facsimile device continues supplying power from the sub power source to the FCU 403, the CIG4 401 and the NCU 402 that compose a control unit.

In a case in which the COMCNT 422 of the FCU 403 receives the call signal (the ringer signal) that corresponds to the call out made by the external facsimile device, and is transmitted from the communication line through the NCU 402 during the energy-saving mode, the COMCNT 422 notifies the CPU 411 about the received call signal. Subsequently, the CPU 411 having received the notification from the COMCNT 422 supplies the power to the entire facsimile device by turning the main power source on. In addition, the CPU 411 outputs image data to the plotter 405, and makes the plotter 405 form an image or print the image on a sheet of paper, in a case in which the facsimile device receives the image data from the communication line continuously after the reception of the call signal.

This facsimile device also stops supplying the power to the display unit on the operation display unit, the scanner 404 and the plotter 405 by turning the main power source off, in a case in which the energy-saving mode is set while a data-transmission time is set (or a time-specified transmission mode is set). However, the facsimile device continues supplying the power from the sub power source to the FCU 403, the CIG4 401 and the NCU 402. In a case in which the CPU 411 determines that the current time generated by the RTC 414 and a predetermined data-transmission time match with each other by comparing the current time and the data-transmission time during the energy-saving mode, the CPU 411 transmits document image data that is read by the scanner 404 and is stored in the memory 419 in advance, to a predetermined address by using the FAX modem 421, the COMCNT 422 and the NCU 402.

However, the initially described image-forming-device management system using the data communication device among the above related-art image-forming-device management systems has the following problems.

The data communication device used in the initially described image-forming-device management system keeps turning its main power source on at all times, thereby being supplied with the power from the main power source constantly, so that the data communication device can transmit the data related to the image-forming device to the central management device at any time. Consequently, the image-forming-device management system wastes electricity when the data communication device is not transmitting the data to the central management device.

Additionally, the image-forming device used in the initially described image-forming-device management system cannot respond to a data-transmission request transmitted from the data communication device, in a case in which the image-forming device cuts power supply from its main power source to the entire image-forming device by turning the main power source off according to a turned-off main switch, or in a case in which the image-forming device cuts the power supply from the main power source to the entire image-forming device by turning the main power source off in accordance with continuation of an used state for a certain period, in order to achieve energy saving.

Further, if the main power source of the image-forming device is turned off, the data communication device cannot obtain the data related to the image-forming device therefrom by calling out spontaneously at a fixed time or by receiving the call signal (the data-transmission requesting signal) from the central management device, and, thus, cannot transmit the data to the central management device.

On the other hand, the later described image-forming-device management system whose image-forming device includes the communication control means has the following problems.

The entire image-forming device that has the communication control unit, and is used in the later described image-forming-device management system is supplied with the power from the main power source at all times, by turning the main power source on, so that the image-forming device can transmit the data about itself to the central management device. Consequently, the image-forming-device management system wastes electricity when the image-forming device is not transmitting the data to the central management device.

In addition, the image-forming device cannot respond to the call signal transmitted from the central management device, in a case in which the image-forming device cuts power supply from its main power source to the entire image-forming device by turning the main power source off according to a turned-off main switch, or in a case in which the image-forming device cuts the power supply from the main power source to the entire image-forming device by turning the main power source off in accordance with continuation of an used state for a certain period, in order to achieve energy saving.

Accordingly, usage of a technology related to the related-art facsimile device shown in FIG. 1 may be applied to the image-forming device and the data communication device used in each image-forming-.device management system described above.

Such a facsimile device stops supplying power to parts consuming much energy, such as the display unit on the operation display unit not shown in the figures, the scanner 404 and the plotter 405, by turning the main power source off when the energy-saving mode is set. However, the facsimile device needs to continue supplying the power from the sub power source to the FCU 403, the CIG4 401 and the NCU 402 composing the control unit, so that the facsimile device can transmit or receive image data during the energy-saving mode. Thus, the facsimile device certainly consumes the electricity for continuing the control unit powered on.

SUMMARY OF THE INVENTION

Accordingly, it is a general object of the present invention to provide a data communication device, an image-forming device such as a copy machine, an image-forming-device management system composed of the data communication device and the image-forming device, and a method of controlling power supply in the image-forming-device management system.

A more particular object of the present invention is to provide a data communication device, an image-forming device such as a copy machine, an image-forming-device management system composed of the data communication device and the image-forming device, and a method of controlling power supply in the image-forming-device management system, by which-the data communication device or the image-forming device can carry out data transmission regularly, reducing unnecessary electricity consumed by the data communication device or the image-forming device.

The above-described object of the present invention is achieved by a data communication device that is connected to a central management device through a communication line, and controls communication between the central management device and an image-forming device, the data communication device including a power source; a data-storing unit storing data related to the image-forming device; a data transmission unit; a transmission-request generating unit being always supplied with electricity from the power source, and generating a transmission request that requests for transmission of the data to the central management device; and a power-supply control unit being always supplied with the electricity from the power source, and supplying the electricity from the power source to a communication-related part including the data transmission unit, if the transmission-request generating unit generates the transmission request, wherein the data transmission unit transmits the data to the control management device if being supplied with the electricity from the power source.

The above-described object of the present invention is also achieved by an image-forming device that is connected to a data communication device, and communicates with a central management device in accordance with control carried out by the data communication device, the image-forming device including a power source; a data transmission unit; and a power-supply control unit being always supplied with electricity from the power source, and supplying the electricity from the power source to a communication-related part including the data transmission unit if receiving a transmission-request signal from the data communication device, wherein the data transmission unit transmits data related to the image-forming device, to the data communication device if being supplied with the electricity from the power source.

The above-described object of the present invention is also achieved by an image-forming-device management system, including an image-forming device; a data communication device; and a central management device managing the image-forming device remotely through a communication line and the data communication device, wherein the data communication device includes a first power source; a data-storing unit storing data of the image-forming device; a data-type deciding unit; a transmission-request-signal transmitting unit; a first data transmission unit; a call-origin deciding unit being always supplied with the electricity from the first power source, and deciding whether a call origin is the central management device based on a signal received continuously after a call signal if receiving the call signal from the communication line in accordance with a call out made by the call origin; and a first power-supply control unit being always supplied with the electricity from the first power source, and supplying the electricity from the first power source to the data-type deciding unit, the transmission-request-signal transmitting unit and the fist data transmission unit, if the call-origin deciding unit decides that the call origin is the central management device, wherein the data-type deciding unit decides a type of data that should be transmitted to the central management device based on the signal received continuously after the call signal from the communication line, if being supplied with the electricity from the first power source, wherein the transmission-request-signal transmitting unit transmits a transmission-request signal to the image-forming device, if and only if the transmission-request-signal transmitting unit is supplied with the electricity from the first power source, and the data-type deciding unit decides that the data which should be transmitted to the central management device is the data related to the image-forming device, wherein the first data transmission unit transmits the data related to the image-forming device to the central management device if being supplied with the electricity from the first power source, and receiving the data related to the image-forming device from the image-forming device in response to the transmission-request signal transmitted to the image-forming device by the transmission-request-signal transmitting unit, and wherein the first power-supply control unit stops supplying the electricity from the first power source to the data-type deciding unit, the transmission-request-signal transmitting unit and the first data transmission unit, after the first data transmission unit completes transmitting the data related to the image-forming device to the central management device, wherein the image-forming device includes a second power source; a second data transmission unit; and a second power-supply control unit that is always supplied with the electricity from the second power source, and supplies the electricity from the second power source to a communication-related part including the second data transmission unit if receiving the transmission-request signal from the data communication device, wherein the second data transmission unit transmits the data related to the image-forming device, to the data communication device if being supplied with the electricity from the second power source, and wherein the second power-supply control unit stops supplying the electricity from the second power source to the communication-related part after the second data transmission unit completes transmitting the data related to the image-forming device to the data communication device.

The above-described object of the present invention is also achieved by a method of controlling power supply in an image-forming-device management system that remotely manages an image-forming device by using a central management device through a communication line and a data communication device, the method including the steps of supplying electricity constantly from a power source of the data communication device to call-signal receiving means for receiving a call signal from the communication line according to a call out made by a call origin, and call-origin deciding means for deciding whether the call origin is the central management device when receiving the call signal by the call-signal receiving means; supplying the electricity from the power source of the data communication device to a communication-related part if deciding that the call origin is the central management device by the call-origin deciding means, the communication-related part including data-type deciding means for deciding a type of data that should be transmitted to the central management device based on a signal received continuously after the call signal from the communication line, transmission-request signal transmitting means for transmitting a transmission-request signal added with information indicating the type of the data that should be transmitted to the central management device, the type being decided by the data-type deciding means, to the image-forming device if recognizing that the data which should be transmitted to the central management device is data related to the image-forming device based on a result of deciding the type of the data that should be transmitted to the central management device, and data transmission means for receiving data from the image-forming device in response to the transmission-request signal transmitted to the image-forming device, and transmitting the data received from the image-forming device to the central management device; stopping the power supply from the power source to the communication-related part after completing transmission of the data received from the image-forming device to the central management device; supplying the electricity constantly from a power source of the image-forming device to signal receiving means receiving the transmission-request signal from the data communication device; deciding a part that needs the power supply for acquiring the data which should be transmitted to the central management device among the data related to the image-forming device, based on the information added to the transmission-request signal if the transmission-request signal is received by the signal receiving means; supplying the electricity from the power source of the image-forming device to the part that needs the power supply for acquiring the data which should be transmitted to the central management device, and a part that needs the power supply for transmitting the data to the data communication device; and stopping the power supply from the power source of the image-forming device to the part that needs the power supply for acquiring the data which should be transmitted to the central management device, and the part that needs the power supply for transmitting the data to the data communication device, after transmitting the data to the data communication device.

For instance, a real-time clock circuit (RTC) of the data communication device compares a current time with a predetermined data transmission time. If the current time matches with the data transmission time, the RTC generates a data-transmission request that requests for data transmission to the central management device. A CPU included in a part constantly supplied with electricity from a power source in the data communication device instructs a power-source controller to supply the electricity from the power source to a communication-related part including a network control unit (NCU), a modem and an image-forming-device interface, thereby activating the communication-related part. Subsequently, the CPU calls out the central management device by using the NCU, and transmits data acquired from the image-forming device in advance, to the central management device by using the modem.

Accordingly, the data communication device or the image-forming device can carry out data transmission regularly, reducing unnecessary electricity consumed by the data communication device or the image-forming device.

Other objects, features and advantages of the present invention will become more apparent from the following detailed description when read in conjunction with the accompanying drawings.

BRIEF DESCRIPTION OF THE DRAWINGS

FIG. 6 is a diagram showing an image-forming (copy) mode screen displayed on a text-display unit of the operation display unit when the text-display unit is powered on;

FIG. 12 is a table diagram showing a process code used for communication between the central management device and the data communication device;

FIG. 13 is a table diagram showing a format of an information record included in the text data;

FIG. 25 is a diagram showing a communication sequence between the personal interface shown in FIG. 21 and the data communication device shown in FIG. 22;

FIG. 27 is a block diagram showing a structure of units included in each image-forming device shown in FIG. 20 and a power-supply circuit;

FIG. 28 is a diagram showing a power-supply mode setting screen displayed on a text-display unit of an operation display unit included in each image-forming device shown in FIG. 20;

FIG. 29 is another diagram showing a communication sequence between the personal interface shown in FIG. 21 and the data communication device shown in FIG. 22;

FIG. 30 is a diagram showing a structure of a fixing-temperature requesting signal;

FIG. 31 is a diagram showing power-source control information included in the fixing-temperature requesting signal shown in FIG. 30;

FIG. 32 is a diagram showing information that indicates an actual request for a fixing temperature, and is included in the fixing-temperature requesting signal shown in FIG. 30;

FIG. 33 is a diagram showing a structure of an instruction signal that includes the power-source control information shown in FIG. 31, and is transmitted from the data communication device shown in FIG. 22 to each image-forming device shown in FIG. 20;

FIG. 34 is a diagram showing image-density change inside a copy sheet with respect to a change in a value of a current (a drum current) that flows through a photosensitive drum of each image-forming device shown in FIG. 20;

DESCRIPTION OF THE PREFERRED EMBODIMENTS

A description will now be given of preferred embodiments of the present invention, with reference to the accompanying drawings.

Figure 1:
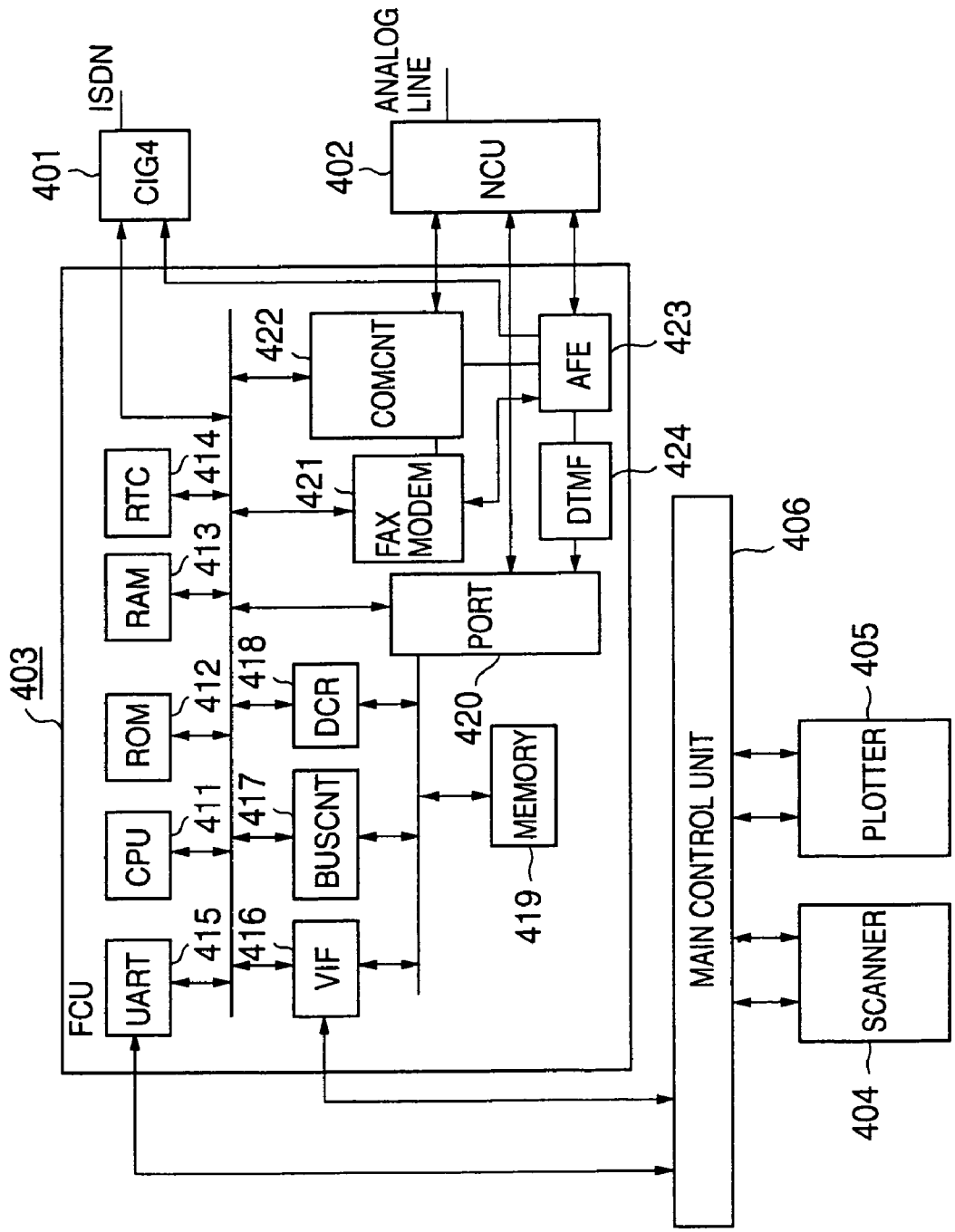
FIG. 1 is a block diagram showing a structure of a related-art facsimile device that has an energy-saving function.
Figure 2:
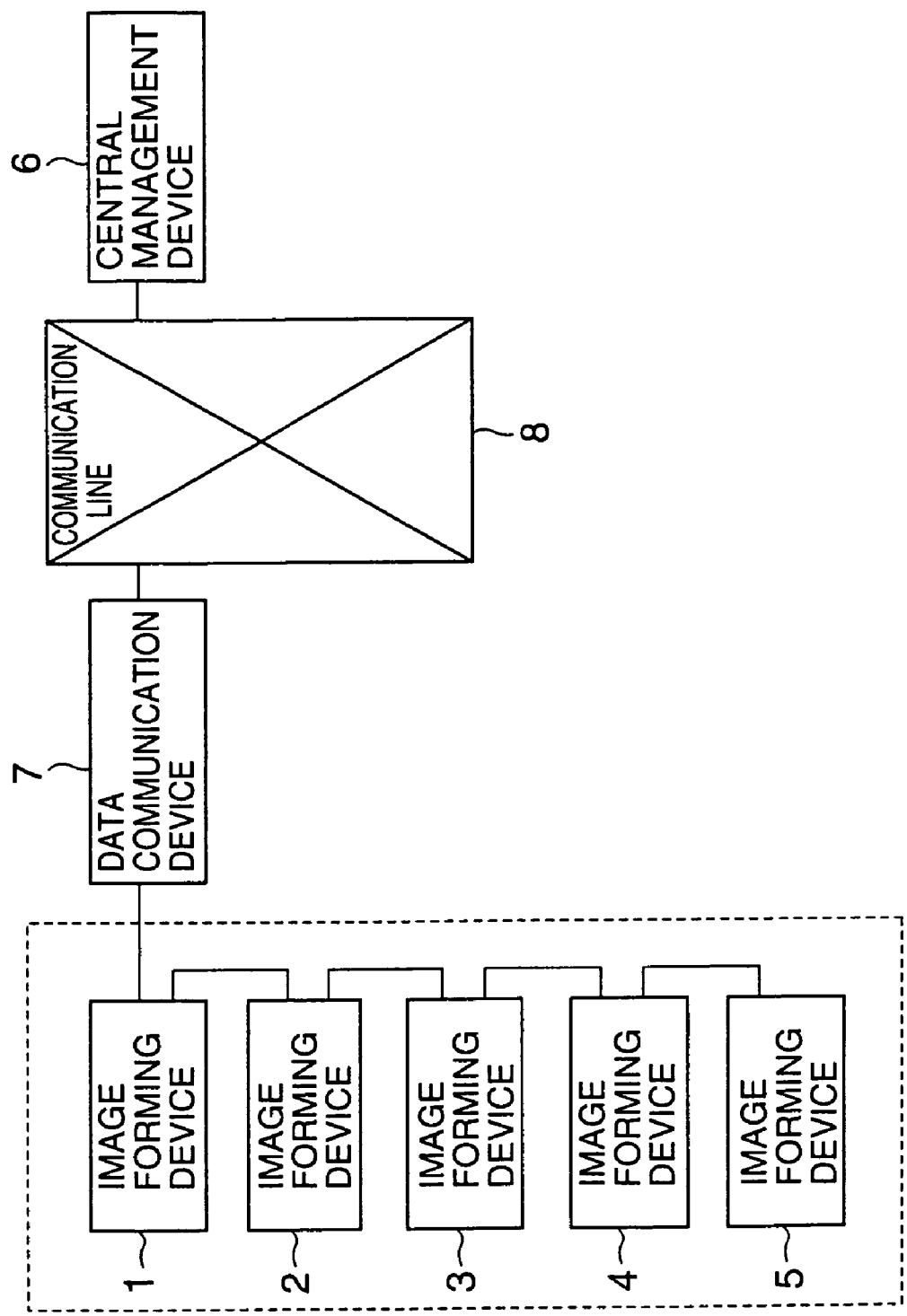
FIG. 2 is a block diagram showing a structure of an image-forming-device management system according to a first embodiment of the present invention.

A description will initially be given of an image-forming-device management system according to a first embodiment of the present invention, with reference to FIG. 2. FIG. 2 is a block diagram showing a structure of the image-forming-device management system according to the first embodiment.

The image-forming-device management system according to the first embodiment includes image-forming devices 1 through 5, a central management device 6, a data communication device 7 and a communication line 8.

The image-forming devices 1 through 5 are remotely managed devices such as copy machines, and are connected to the data communication device 7 through a communication line. The data communication device 7 is connected to the central management device 6 through the communication line 8 such as a public line or an exclusive line. The central management device 6 can carry out remote management of the image-forming devices 1 through 5 collectively through the communication line 8 and the data communication device 7.

The data communication device 7 is connected to the communication line 8, and transmits an instruction signal received from the central management device 6 to the image-forming devices 1 through 5 selectively, or each type of report data received from the image-forming devices 1 through 5 to the central management device 6 via the communication line 8. This instruction signal received from the central management device 6 is, for instance, a data-transmission requesting signal that requests for data transmission, or a data-write requesting signal that requests for a data-write process. The report data is data related to the image-forming devices 1 through 5, such as data indicating a total number of formed images or a device status.

This data communication device 7 is turned on for twenty-four hours a day, and allows communication (data transmission/reception) with the central management device 6 even during the night when the image-forming devices 1 through 5 are normally turned off or cut off. The data communication device 7 is connected to the image-forming devices 1 through 5 by a multi-drop method using a serial communication interface RS-485, and communicates with the image-forming devices 1 through 5 by later-described polling and selecting operations carried out by the data communication device 7.

Figure 3:
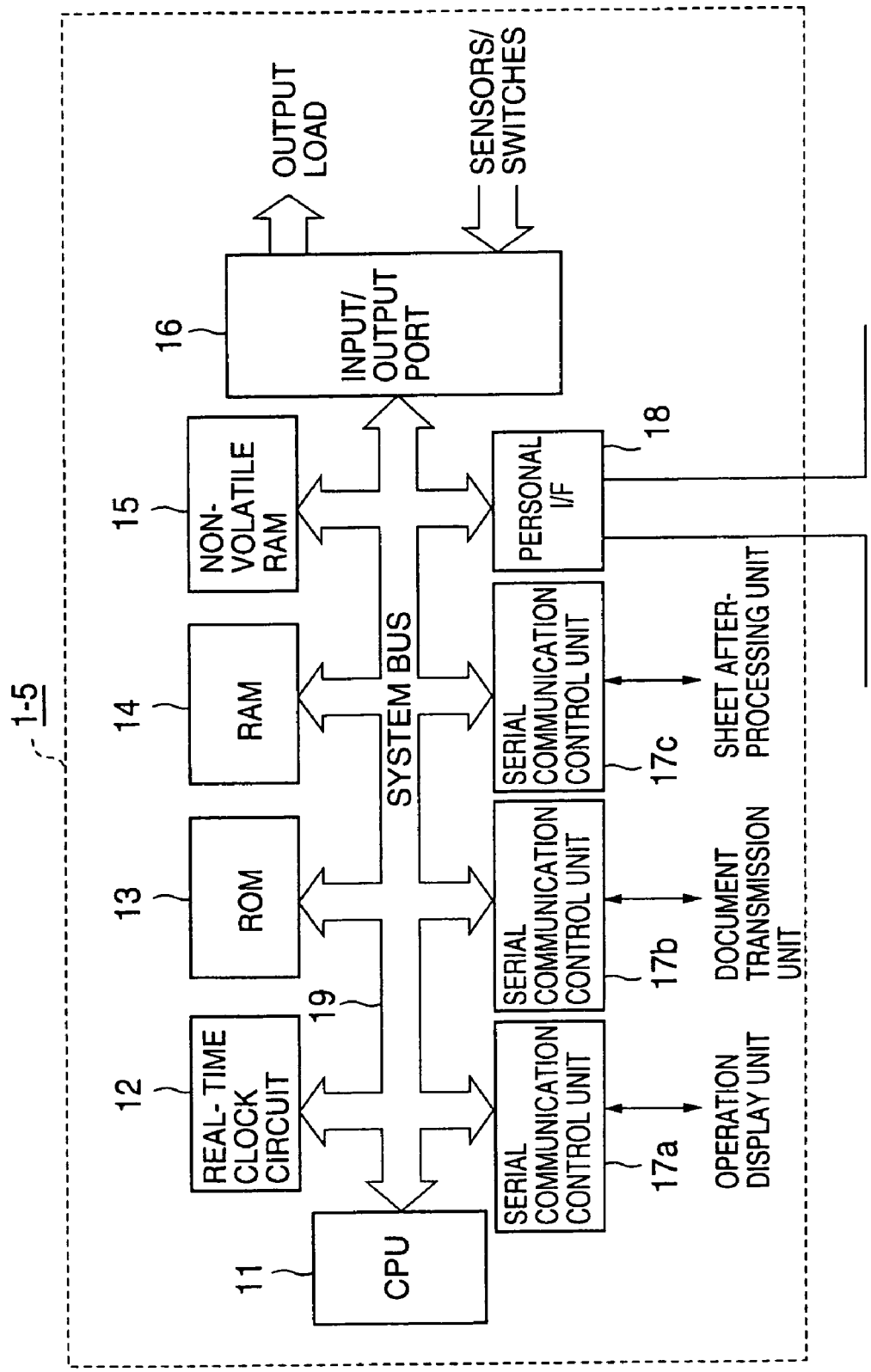
FIG. 3 is a block diagram showing a structure of a control unit of each image-forming device used in the image-forming-device management system according to the first embodiment.

FIG. 3 is a block diagram showing a structure of a control unit of each image-forming device 1 through 5 used in the image-forming-device management system according to the first embodiment. It should be noted that the control unit shown in FIG. 3 corresponds to the control unit of each image-forming device 1 through 5, in a case in which the image-forming devices 1 through 5 are copy machines.

The control unit of each image-forming device 1 through 5 includes a PPC (a copy machine) controller composed of a CPU 11, a real-time clock circuit 12, a ROM 13, a RAM 14, a non-volatile RAM 15, an input/output port 16, and serial communication control units 17a, 17b and 17c. The control unit further includes a personal interface or an interface (I/F) 18 and a system bus 19.

The CPU 11 is a central processing unit that controls the entire control unit collectively by using a control program stored in the ROM 13. The real-time clock circuit (RTC) 12 includes a time generating unit, a transmission-time setting register and a time comparing unit. The time generating unit generates a current time (a year, a month, a date, an hour and a minute). The transmission-time setting register sets a data-transmission time, at which an image-forming device transmits data related to the image-forming device, to the central management unit 6 or the data communication device 7.

In addition, the time comparing unit compares the current time generated by the time generating unit with the data-transmission time preset in the transmission-time setting register. The time comparing unit generates a data-transmission requesting signal transmitted to the central management device 6 or the data communication device 7 if the current time and the data-transmission time match with each other, or if the current time passes the data-transmission time.

The ROM 13 is a read only memory that stores various types of fixed data including the control program used by the CPU 11. The RAM 14 is a temporarily storing memory such as a work memory used by the CPU 11 processing data, for example. The non-volatile RAM 15 is a memory that stores data indicating contents of a mode instruction supplied from a unit such as a later-described operation display unit shown in FIG. 5, for example, and can store the data even if the image-forming device is turned off.

The input/output port 16 connects output loads such as a motor, a solenoid and a clutch included in the image-forming device, sensors, and switches. The serial communication control unit 17a exchanges a signal with the operation display unit. The serial communication control unit 17b exchanges a signal with a document transmission unit not shown in the figures. Additionally, the serial communication control unit 17c exchanges a signal with a copy sheet or sheet after-processing unit not shown in the figures.

The personal interface 18 is an interface circuit that manages communication between the image-forming device and the data communication device 7, and is provided for reducing a load of the CPU 11 for carrying out a communication process between the image-forming device and the data communication device 7. If a processing ability of the CPU 11 is high enough to manage the communication between the image-forming device and the data communication device 7, the CPU 11 may include functions of the personal interface 18.

The functions of the personal interface 18 are to monitor polling and selecting operations from the data communication device 7; to transmit an affirmative response or a negative response to the data communication device 7; to check fairness of data transmitted to or received from the data communication device 7, check parity and request for re-transmission of the data in a case in which an error occurs; and to carry out a header process of data transmitted to or received from the data communication device 7.

Figure 4:
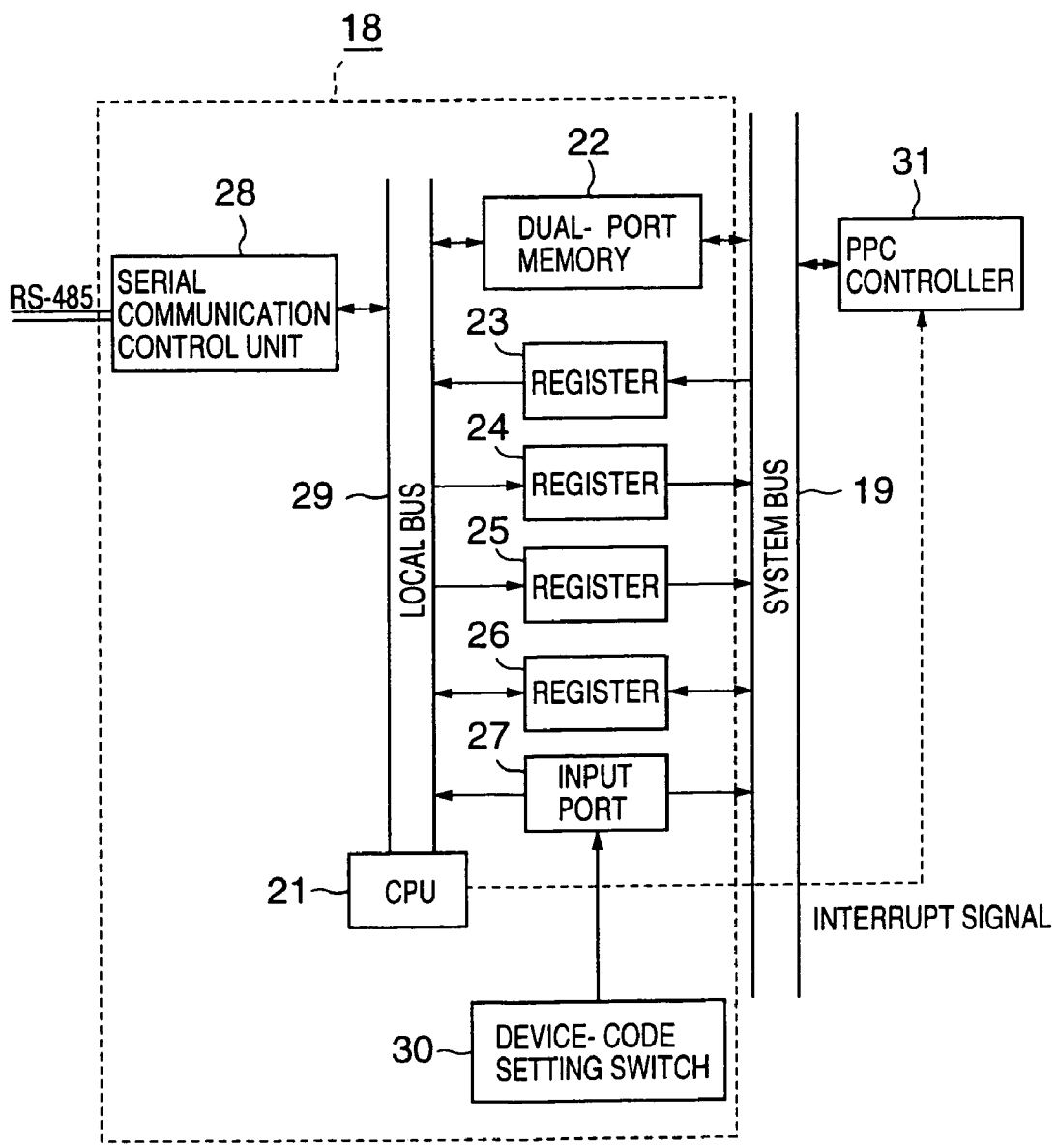
FIG. 4 is a block diagram showing a structure of a personal interface included in the control unit of each image-forming device.

The system bus 19 is a bus line composed of an address bus, a control bus and a data bus, and connects the CPU 11, the real-time clock circuit 12, the ROM 13, the RAM 14, the non-volatile RAM 15, the input/output port 16, the serial communication control units. 17a, 17b and 17c, and the personal interface 18 to each other. FIG. 4 is a block diagram showing a structure of the personal interface 18 included in the control unit of each image-forming device 1 through 5.

The personal interface 18 shown in FIG. 4 includes a CPU 21, a dual-port memory 22, registers 23 through 26, an input port 27, a serial communication control unit 28, a local bus 29 and a device-code setting switch 30. The CPU 21 is a microcomputer fabricated on a single chip including a central processing unit, a ROM, a RAM, a bus connecting each unit, and the like, and controls the entire personal interface 18 collectively. The dual-port memory 22 is a data memory that can be read or written by both of the CPU 21 and the CPU 11 shown in FIG. 3, and is used for transferring text data between the personal interface 18 and a PPC controller 31. This PPC controller 31 is composed of the CPU 11, the real-time clock circuit 12, the ROM 13, the RAM 14, the non-volatile RAM 15, the input/output port 16, and the serial communication control units 17a, 17b and 17c, which are described above.

The registers 23 through 26 are used for controlling the transfer of the above-described text data, and their detailed descriptions are omitted in this embodiment. The device-code setting switch 30 sets a fixed device code for each image-forming device, and is used for identifying a device code when the data communication device 7 carries out the polling and selecting operations. The serial communication control unit 28 is connected to the data communication device 7 and/or the personal interfaces 18 of other image-forming devices.

Figure 5:
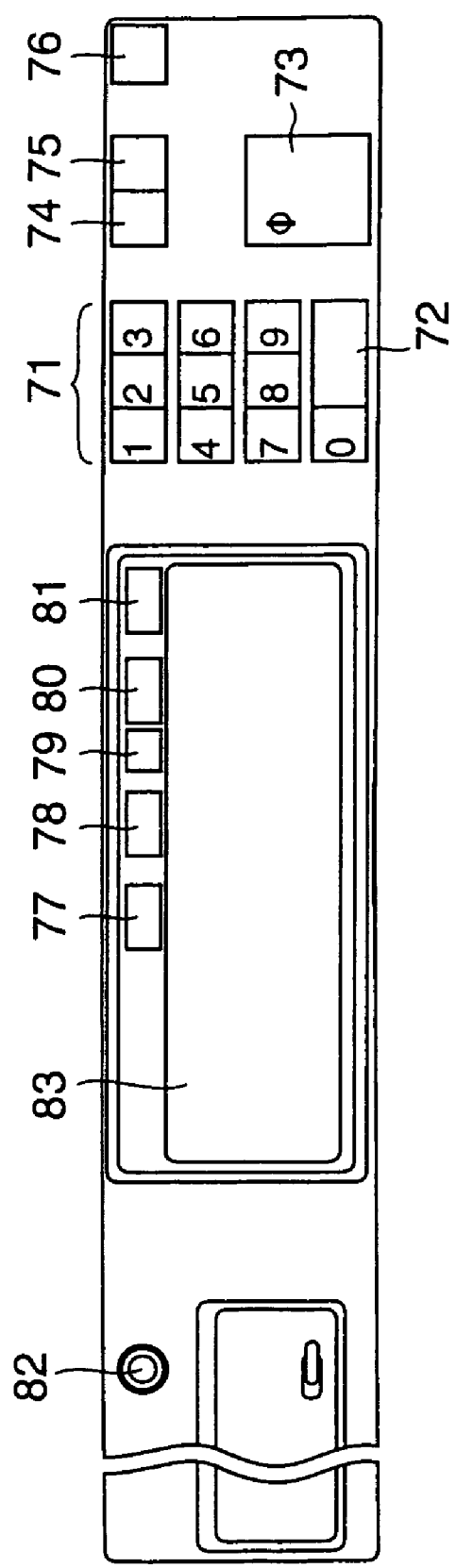
FIG. 5 is a layout diagram showing a structure of an operation display unit included in each image-forming device.

FIG. 5 is a layout diagram showing a structure of the operation display unit included in each image-forming device 1 through 5. This operation display unit corresponds to the operation display unit of each image-forming device 1 through 5 if each image-forming device is a copy machine.

Alike a general control unit such as the control unit of each image-forming device 1 through 5 shown in FIG. 3, the operation display unit includes a ROM storing a control program, a CPU executing various control processes by using the control program, a RAM temporarily storing data, a non-volatile RAM storing data even if the operation display unit is turned off, a serial communication control unit, an input/output port, and the like. This operation display unit and the serial communication control unit 17a shown in FIG. 3 carry out data transfer to each other, but its description is omitted in the first embodiment.

The operation display unit shown in FIG. 5 includes a ten key 71, a clear/stop key 72, a print key 73, an enter key 74, an interruption key 75, a pre-heat/mode-clear key 76, a mode confirmation key 77, a screen switch key 78, a call key 79, a registration key 80, a guidance key 81, a display-contrast volume 82 and a text-display unit 83, in addition to the above-described control unit.

The ten key 71 is a key used for inputting numerical values such as the number of copies or image formation, and a scale factor. The clear/stop key 72 is a key used for clearing the numerical values such as the number of copies, and for stopping a copying operation. The print key 73 is a key used for starting the copying operation that includes a printing operation (an image forming operation). The enter key 74 is a key used for confirming settings of numerical values such as a zooming factor and a binding-margin dimension size number. The interruption key 75 is a key used for copying a document by interrupting a copying process of another document.

The pre-heat/mode-clear key 76 is a key used for canceling all the set contents of a copy mode, and for setting the image-forming device to an electricity-saving state (the energy-saving mode). The mode confirmation key 77 is a key used for confirming each copy mode displayed selectively on the text-display unit 83, by displaying a list of each copy mode. The screen switch key 78 is a key used for switching a displaying form of the text-display unit 83 according to a mastery level of a user. The call key 79 is a key used for calling a user program. The registration key 80 is a key used for registering the user program. The guidance key 81 is a key used for displaying a guidance message or the like on the text-display unit 83. The display-contrast volume 82 is used for adjusting contrast of the text-display unit 83.

Figure 6:
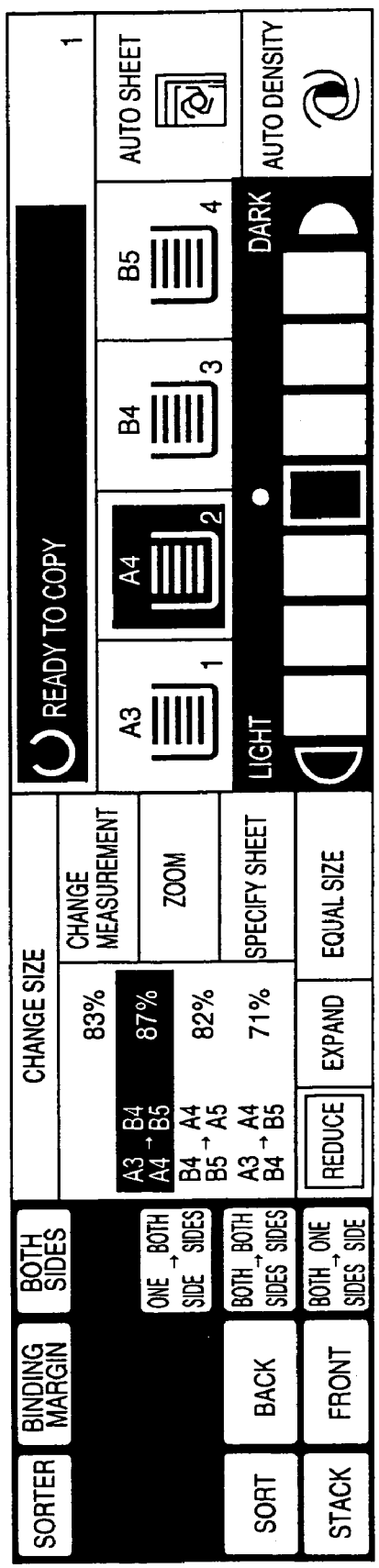

The text-display unit 83 uses a full-dot display device such as an LCD (Liquid Crystal Display) or a fluorescent character display tube, and lays an almost transparent and sheet-shaped matrix touch panel on a top of the full-dot display device. This matrix touch panel includes a plurality of touch sensors, each touch sensor being located on each 8×8 display pixels, for instance. When the operation display unit is supplied with the electricity by turning the main power source on, the text-display unit 83 can display a normal copy mode screen indicating a status of the image-forming device, the number of copies, and various keys, as shown in FIG. 6. The status of the image-forming device may be displayed on the text-display unit 83 as "ready to copy", "copying", "no copy paper", or the like.

A user can select various copy modes related to the copying operation such as a paper-supply tray (a sheet size), an automatic sheet mode, an image density (a copy density), an automatic density mode, a changing-scale mode, a both-sides mode, a binding-margin mode, a sort mode or the like, by touching keys on the copy mode screen. A key touched by the user turns its color over from black to white, or from white to black. If the user selects the automatic sheet mode, a paper-supply tray storing the most appropriate copy paper is automatically selected by the image-forming device according to a size of a document and a set scale factor. In addition, if the user selects the automatic density mode, an image density is selected automatically by the image-forming device according to a density. (a gray scale) of the document. The changing-scale mode includes an equal size mode, a reduction mode, an expansion mode, a changing-scale mode by specifying a sheet size, a zooming mode, and a changing-scale mode by changing a measurement.

Figure 7:
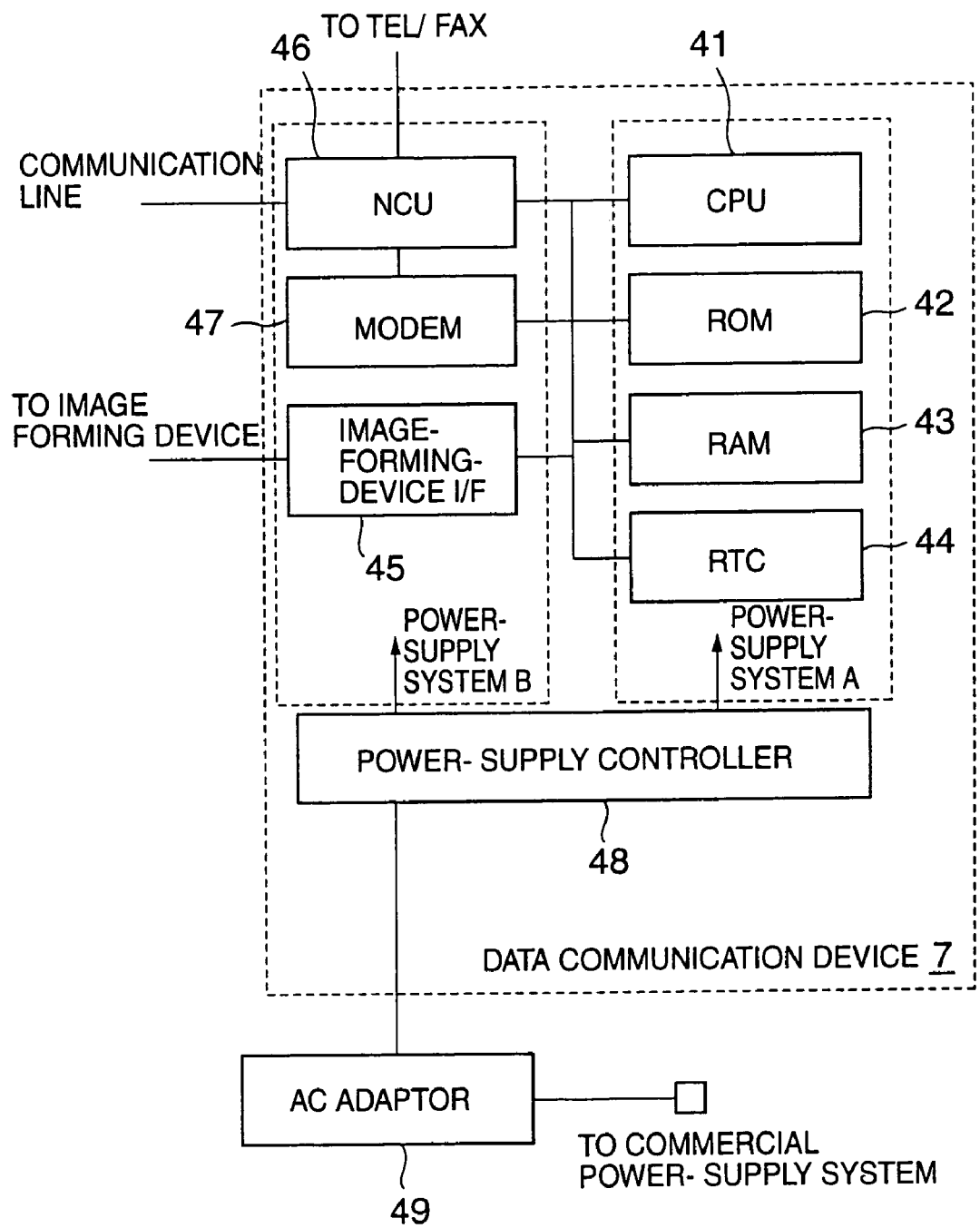
FIG. 7 is a block diagram showing a structure of a data communication device used in the image-forming-device management system according to the first embodiment.

FIG. 7 is a block diagram showing a structure of the data communication device 7 that is shown in FIG. 2, and is used in the image-forming-device management system according to the first embodiment. The data communication device 7 shown in FIG. 7 includes a CPU 41, a ROM 42, a RAM 43, an RTC (Real-Time Clock circuit) 44, an image-forming-device interface (I/F) 45, an NCU 46, a modem 47, a power-supply controller 48, and the like.

The CPU 41 is a central processing unit that controls the entire data communication device 7 collectively. In detail, the CPU 41 controls communication between the data communication device 7 and a plurality of the image-forming devices 1 through 5 by following a control program stored in the ROM 42, and controls transmission/reception of an instruction signal to the central management device 6 via the communication line 8. In addition, the CPU 41 calls the central management device 6 via the communication line 8 based on each type of report data received from the image-forming devices 1 through 5, and controls switching to connect the communication line 8 to a side of the image-forming devices 1 through 5, or to connect to a side of a general telephone device (TEL) or a facsimile device (FAX).

The ROM 42 is a read only memory that stores various types of fixed data including the control program used by the CPU 41. The RAM 43 is a random access memory (data storing means) used as a work memory for the CPU 41 processing data, or a data memory for storing later-described various data (parameters). This RAM 43 stores transmission data transmitted from one of the central management device 6 and the plurality of image-forming devices 1 through 5 to the other, and various parameters such as a device code and an ID code specifying one of the plurality of image-forming devices 1 through 5, a data-transmission time (a year, a month, a date, an hour and a minute), a telephone number (a call destination) of the central management device 6, the number of re-calls (retries) in a case in which a line connection is not succeeded, and an interval between re-calls.

The RTC 44 has a function as data-transmission request generating means including time generating means. In detail, the RTC 44 includes a time generating unit, a transmission-time setting register and a time comparing unit. The time generating unit generates a current time (a year, a month, a date, an hour and a minute). The transmission-time setting register sets a data-transmission time, at which the data communication device 7 transmits data related to one of the image-forming devices 1 through 5, to the central management device 6.

In addition, the time comparing unit compares the current time generated by the time generating unit with the data-transmission time preset in the transmission-time setting register. The time comparing unit generates a data-transmission requesting signal transmitted to the central management device 6 if the current time and the data-transmission time match with each other, or if the current time passes the data-transmission time.

The image-forming-device interface 45 is an interface circuit that manages serial communication between the data communication device 7 and the image-forming devices 1 through 5. The NCU 46 connects the data communication device 7 to the communication line 8 so that the data communication device 7 can communicate with the other devices, and includes an automatic call originating/terminating function. This NCU 46 functions as data transmission means with the CPU 41 and the modem 47. The modem 47 modulates or demodulates data to be transmitted or received.

It should be noted that the CPU 41, the ROM 42, the RAM 43 and the RTC 44 are set as a power-supply system A, and the image-forming-device interface 45, the NCU 46 and the modem 47 are set as a power-supply system B. The data communication device 7 is supplied with electricity from an AC adaptor 49.

The AC adaptor 49 converts AC 100V of a commercial power-supply system to DC 15V. The power-supply controller 48 has a function as main-power-source/power-supply control means. In detail, the power-supply controller 48 converts DC 15V supplied from the AC adaptor 49 to 5V used in the data communication device 7, and supplies the voltage 5V to the power-supply systems A and B.

It should be noted that the data communication device 7 has an energy-saving- mode and a normal operation mode, for instance. The data communication device 7 can shift to the normal operation mode in a case in which the data communication device 7 communicates with the central management device 6 and the image-forming devices 1 through 5, or carries out internal processes. Else, the data communication device can shift to the energy-saving mode.

The power-supply systems A and B are electrically independent from each other in terms of power supply. The power-supply system A is supplied with electricity from the power-supply controller 48 at all times. On the other hand, the power-supply system B is not supplied with electricity from the power-supply controller 48 if an operation mode of the data communication device 7 is the energy-saving mode. The data communication device 7 shifts from the energy-saving mode to the normal operation mode, or from the normal operation mode to the energy-saving mode, by controlling power supply to the power-supply systems A and B according to an instruction from the CPU 41.

Figure 8:
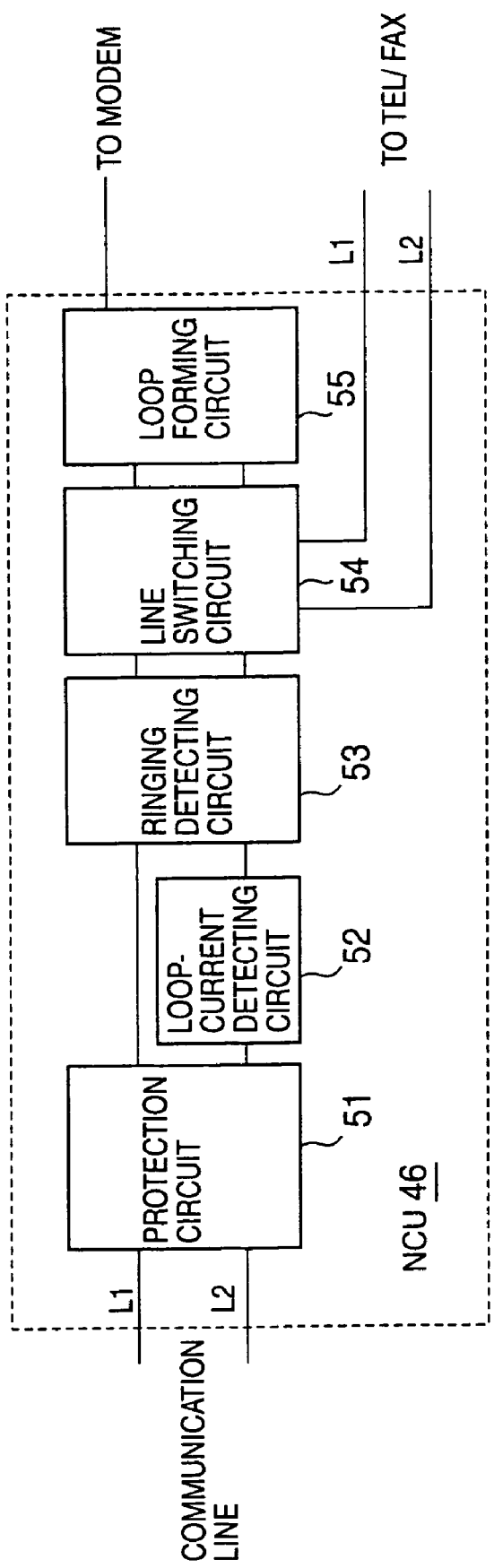
FIG. 8 is a block diagram showing a structure of an NCU included in the data communication device.

FIG. 8 is a block diagram showing a structure of the NCU 46 included in the data communication device. 7. The NCU 46 shown in FIG. 8 includes a protection circuit 51, a loop-current detecting circuit 52, a ringing detecting circuit 53, a line switching circuit 54, a loop forming circuit 55 and the like. The protection circuit 51 is a circuit that protects the data communication device 7 from a noise received through the communication line 8. The loop-current detecting circuit 52 detects a current flowing through a direct current (DC) loop formed by the loop forming circuit 55, and includes a bi-directional photo coupler not shown in the figures, and the like.

The ringing detecting circuit 53 detects a call signal (a ringing) from the communication line 8. The line switching circuit 54 switches connecting the communication line 8 to a side of the modem 47 shown in FIG. 7, or a side of a general telephone device (TEL) or a facsimile device (FAX). The loop forming circuit 55 forms the direct current loop when catching the communication line 8 or connecting lines L1 and L2 of the communication line 8 directly by off-hook, and transmits a modem signal (a voice-grade signal) to, or receives the modem signal from the communication line 8.

A description will now be given of summarized functions of the image-forming-device management system according to the first embodiment. The image-forming-device management system has mainly three types of functions, which are communication control (1) from the central management device 6 to the image-forming devices 1 through 5, communication control (2) from the image-forming devices 1 through 5 to the central management device 6 or the data communication device 7, and control (3) of the data communication device 7 itself.

The communication control (1) from the central management device 6 to the image-forming device 1 through 5 is the followings (A1, A2 and A3), for example.

(A1) The communication control (1) from the central management device 6 to the image-forming devices 1 through 5 is, for instance, to read and reset counter information (text data) such as a total number of forming images, the number of forming images for each paper-supply tray, the number of forming images for each copy paper size, the number of mis-feedings, the number of mis-feedings for each copy paper size, the number of mis-feedings for each copy-paper carrying position and the like at a specific image-forming device.

(A2) In addition, the communication control (1) from the central management device 6 to the image-forming devices 1 through 5 is to set (write) and read adjusting values (log information) such as a control voltage, a current, a resistance, a fixing temperature and a timing of each unit composing the specific image-forming device.

(A3) Further, the communication control (1) from the central management device 6 to the image-forming devices 1 though 5 is to return a result (text data) from the central management device 6 to the image-forming devices 1 through 5 in response to the communication control (2) from the image-forming devices 1 through 5, to the central management device 6.

The data communication device 7 carries out the above-described communication controls by receiving an instruction signal from the central management device 6 and performing a selecting operation to the image-forming devices 1 through 5. This selecting operation is to select one of the five image-forming devices 1 through 5 connected to the data communication device 7, and to communicate with a selected image-forming device.

Figure 9:
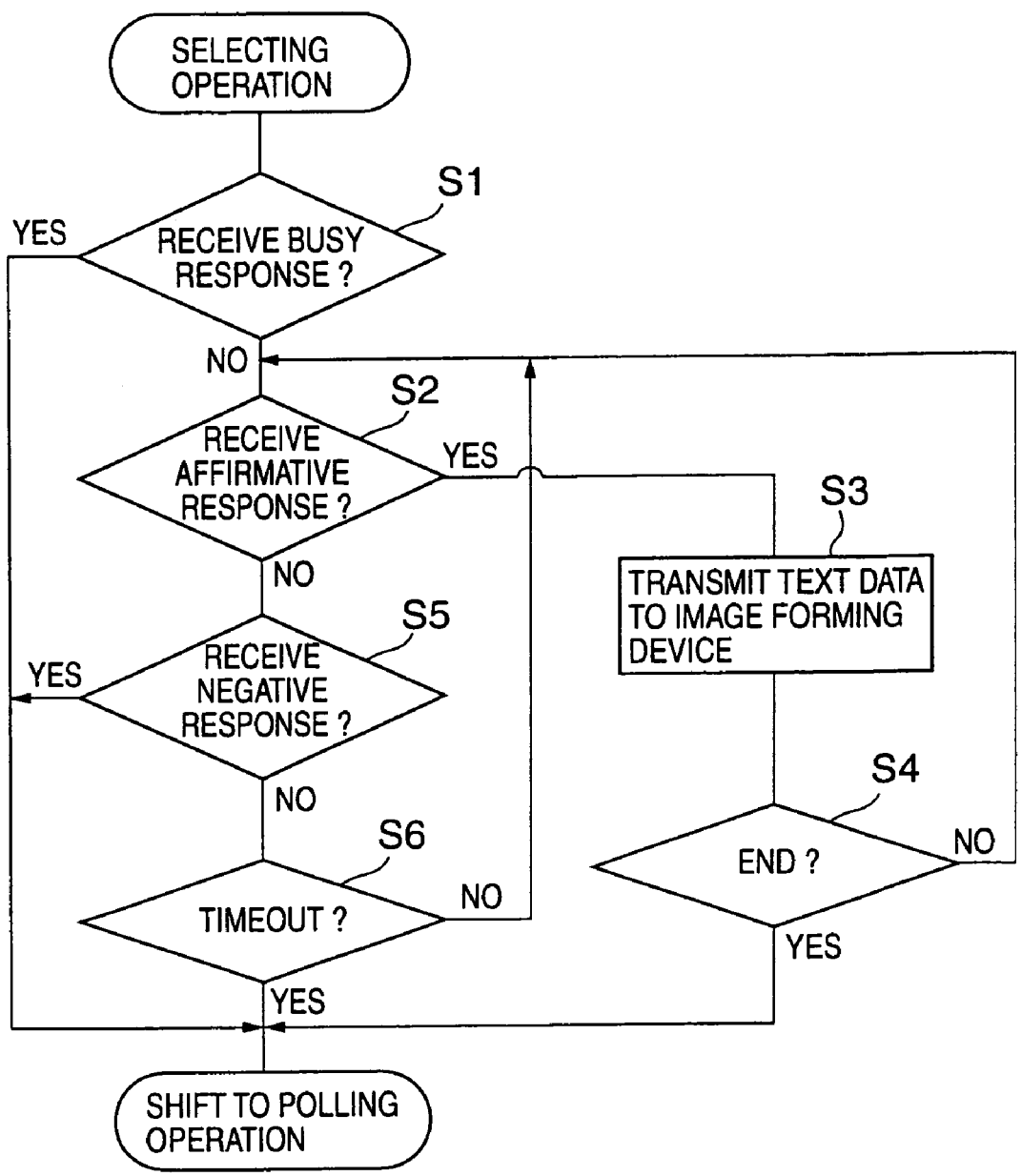
FIG. 9 is a flowchart showing a selecting operation carried out by the data communication device.

FIG. 9 is a flowchart showing the selecting operation carried out by the data communication device 7.

Each image-forming device 1 through 5 has a unique or specific device code. The CPU 41 of the data communication device 7 outputs a specific code (a combination of codes) indicating a predetermined selecting function and a device code of an image-forming device that is to be selected, to the serial communication interface RS-485, in a case in which the data communication device 7 receives an instruction signal from the central management device 6 through the communication line 8 after receiving a call signal from the communication line 8 by using the NCU 46 and the modem 47 in the normal operation mode. The specific code indicating the selecting function and the device code compose a selecting signal (SA). The normal operation mode can be selected by a switch operation not shown in the figures.

In a case in which the CPU 11 of each image-forming device 1 through 5 is supplied with electricity from the main power source, the CPU 11 compares the device code that follows the specific code (the combination of codes) indicating the selecting function, with a device code of its own image-forming device, by using the specific code, if receiving the selecting signal (SA) from the data communication device 7 by use of the personal interface 18. If the device code of the image-forming device matches with the device code that is included in the selecting signal supplied from data communication device 7, the image-forming device recognizes that the image-forming device is selected by the data communication device 7.

In a case in which the selected image-forming device has data to be outputted, the CPU 11 of the selected image-forming device transmits a "busy" response indicated by a predetermined specific code (a combination of codes) to the data communication device.7 by using the personal interface 18. When the data communication device 7 receives the "busy" response from the image-forming device by using the image-forming-device interface 45 at a step S1 shown in FIG. 9, the CPU 41 of the data communication device 7 interrupts the selecting operation, and shifts to a later-described polling operation.

On the other hand, if the selected image-forming device does not have data to be outputted, the CPU 11 of the image-forming device decides whether the image-forming device can correspond to the selecting operation carried out by the data communication device 7. If it is determined that the image-forming device can correspond to the selecting operation, the CPU 11 transmits an affirmative response indicated by a predetermined specific code (a combination of codes) to the data communication device 7 by using the personal interface 18, and carries out communication between the image-forming device and the data communication device 7.

If the data communication device 7 receives the affirmative response from the image-forming device at a step S2 shown in FIG. 9, the data communication device 7 transmits a signal (text data) to the image-forming device, at a step S3. If the data communication device 7 finishes the selecting operation at a step S4, the data communication device proceeds to the polling operation. If not, the data communication device proceeds to the step S2.

If the image-forming device receives a data-transmission requesting signal from the data communication device 7 by using the personal interface 18 at the step S3, the CPU 11 of the image-forming device transmits data that is related to the image-forming device and indicates a device status such as the above-described counter information and the log information, to the data communication device 7, by using the personal interface 18. If the image-forming device receives a data-write requesting signal from the data communication device 7 by using the personal interface 18 at the step S3, the CPU 11 of the image-forming device writes data such as log information or parameters attached to the data-write requesting signal, to the non-volatile RAM 15.

If it is determined that the image-forming device cannot correspond to the selecting operation carried out by the data communication device 7, the CPU 11 of the image-forming device transmits a negative response indicated by a predetermined specific code (a combination of codes) to the data communication device 7 by using the personal interface 18, and terminates communication between the image-forming device and the data communication device 7. When the data communication device 7 receives the negative response from the image-forming device at a step S5 shown in FIG. 9, the data communication device 7 proceeds to the polling operation.

Further, in a case in which an image-forming device corresponding to the device code outputted by the data communication device 7 cannot transmit neither of the affirmative response nor the negative response to the data communication device 7 since the image-forming device is turned off, for example, the data communication device 7 finishes the selecting operation after a predetermined period passes (step S6 shown in FIG. 9).

A description will now be given of one of the three main functions of the image-forming-device management system, which is the communication control (2) from the image-forming devices 1 through 5 to the central management device 6 or the data communication device 7. Examples of this communication control (2) are described below (B1 through B5).

(B1) In a case in which a failure occurs so that an image-forming operation is disabled at each image-forming device 1 through 5, the CPU 11 of each image-forming device 1 through 5 transmits data indicating the failure (emergency-call data) by using the personal interface 18 immediately to the data communication device 7, where the data communication device 7 transmits the data indicating the failure (an emergency report) to the central management device 6 through the communication line 8.

(B2) The CPU 11 of each image-forming device 1 through 5 shifts from an image forming mode to a user-request input mode used by a user to input a necessary request such as a repair request or an equipment-supply request, in response to a key operation carried out by the user on the operation display unit. The CPU 11, then, displays a user-request input screen on the text-display unit 83 of the operation display unit. When the necessary request is inputted, by the user pressing down a fixed key on the screen, the CPU 11 transmits data indicating the necessary request (emergency-call data) by using the personal interface 18 immediately to the data communication device 7, where the data communication device 7 transmits the data (an emergency report) to the central management device 6 through the communication line 8.

(B3) The CPU 11 of each image-forming device 1 through 5 transmits data indicating a total number of forming images or an order of copy paper (emergency-call data) immediately to the data communication device 7 by using the personal interface 18 every time the total number of forming images reaches a predetermined number (a reporting-level value), where the data communication device 7 transmits the data (an emergency report) to the central management device 6 through the communication line 8.

(B4) The CPU 11 of each image-forming device 1 through 5 transmits data indicating the total number of forming images to the data communication device 7 by using the personal interface 18 for every predetermined period. At a preset data-transmission time on a specific day, the CPU 41 of the data communication device 7 transmits the data received from the image-forming device before the data-transmission time together as a non-emergency report, by using the NCU 46 and the modem 47, to the central management device 6 through the communication line 8. This communication control includes control to transmit the data to the central management device 6 without waiting for the preset data-transmission time, in a case in which the number of transmitting the data reaches a predetermined number before the data-transmission time. It should be noted that the data-transmission time is set by the central management device 6, and is stored in the RAM 43 inside the data communication device 7.

(B5) The CPU 11 of each image-forming device 1 through 5 transmits data indicating that preventive maintenance is necessary, to the data communication device 7 by using the personal interface 18, in a case in which the image-forming operation can be started, but an event that needs preventive maintenance occurs. This event is, for instance, an event in which the number or the period which exchangeable parts are used for becomes closer to a predetermined number of times or a predetermined period, or an event in which a sensor reaches a standard level. At a preset data-transmission time on a specific day, the CPU 41 of the data communication device 7 transmits the data (a non-emergency report) received from the image-forming device before the data-transmission time together, by using the NCU 46 and the modem 47, to the central management device 6 through the communication line 8. This communication control includes control to transmit the data to the central management device 6 without waiting for the data-transmission time, in a case in which the number of transmitting the data received from image-forming device reaches a predetermined number. It should be noted that the data-transmission time is set by the central management device 6, and is stored in the RAM 43 inside the data communication device 7.

The above-described communication controls (B1 through B5) are performed when the data communication device 7 carries out the polling operation. The polling operation is to specify an order (1 through 5) of the five image-forming devices connected to the data communication device 7, and to confirm existence and non-existence of a communication request (a data-transmission request) from a specified image-forming device.

Figure 10:
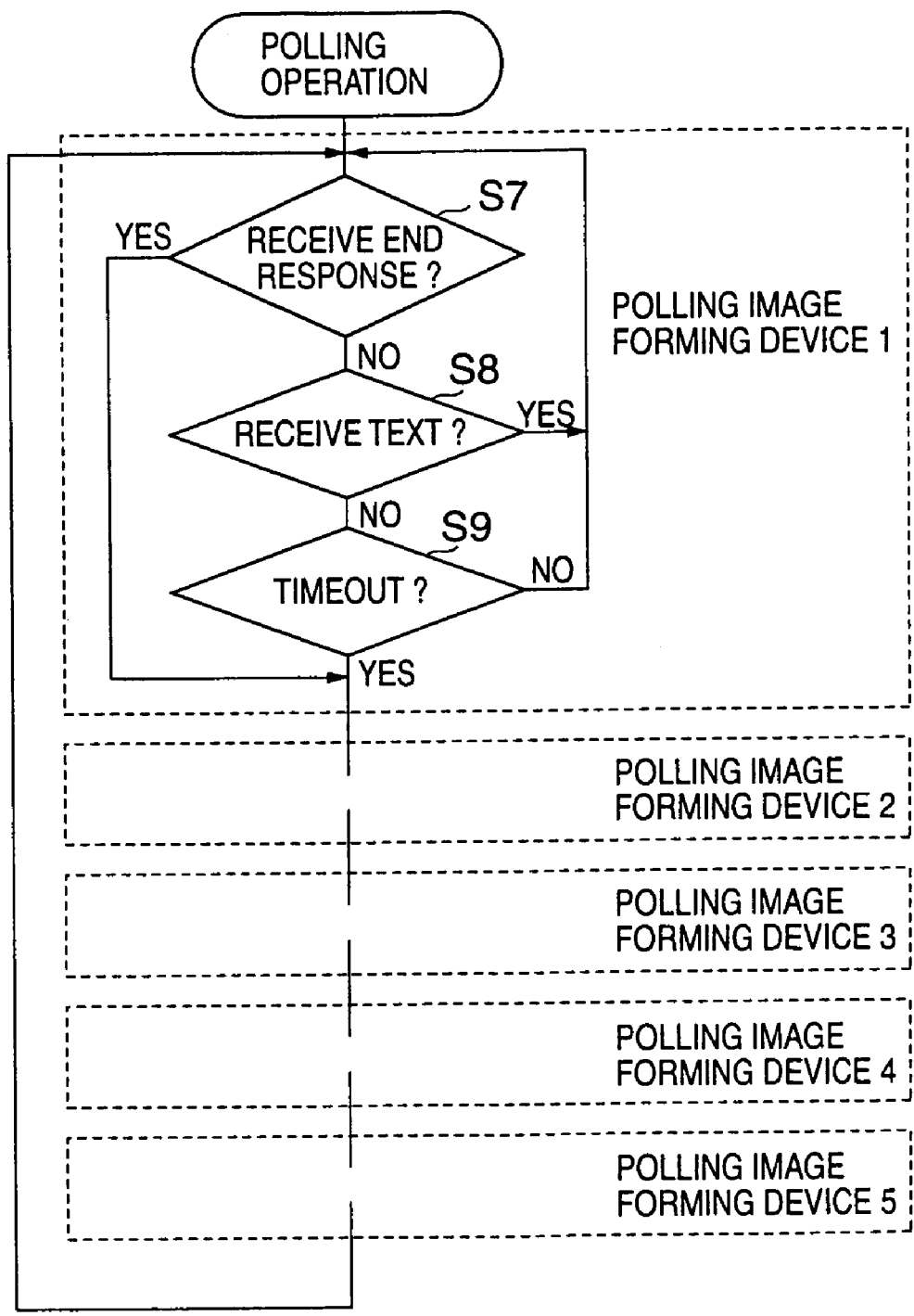
FIG. 10 is a flowchart showing a polling operation carried out by the data communication device.

FIG. 10 is a flowchart showing the polling operation carried out by the data communication device 7. The CPU 41 of the data communication device 7 outputs a predetermined specific code (a combination of codes) indicating a polling function, and a device code of an image-forming device that is to be selected, to the serial communication interface RS-485 by using the image-forming-device interface 45 in the normal operation mode. The specific code indicating the polling function and the device code compose a polling signal (PA) together.

The CPU 11 of each image-forming device 1 through 5 compares the device code that follows the specific code (the combination of codes) indicating the polling function, with a device code of its own image-forming device, by using the specific code, if receiving the polling signal (PA) from the data communication device 7 by use of the personal interface 18. If the device code of the image-forming device matches with the device code that is included in the polling signal supplied from data communication device 7, the image-forming device recognizes that the image-forming device is polled by the data communication device 7.

Subsequently, the CPU 11 of an image-forming device polled by the data communication device 7 starts communication with the data communication device 7, or transmission of data related to the image-forming device, if the image-forming device has output data or receives a data-transmission request requesting transmission of data to the data communication device 7 or the central management device 6. On the other hand, if the image-forming device does not have the output data, or the previously-started communication has ended, the CPU 11 of the image-forming device transmits an end response indicated by a predetermined specific code (a combination of codes) to the data communication device 7 by using the personal interface 18, and, then, terminates the communication between the image-forming device and the data communication device 7. If the data communication device 7 receives the end response from the image-forming device by using the image-forming-device interface 45 at a step S7 shown in FIG. 10, the CPU 41 of the data communication device 7 shifts to the polling operation performed to the next image-forming device.

In addition, in a case in which an image-forming device corresponding to the device code outputted by the data communication device 7 cannot start the communication with the data communication device 7 or cannot even output the end response since the image-forming device is turned off, the CPU 41 of the data communication device 7 finishes the polling operation after a predetermined period passes (a step S9 shown in FIG. 10). This polling operation is repeated sequentially by the data communication device 7 to each image-forming device 1 through 5 connected to the data communication device 7 in the normal operation mode unless the data communication device 7 performs the selecting operation.

A description will now be given of one of the three main functions of the image-forming-device management system, which is the control (3) of the data communication device 7 itself. This control (3) includes the following controls C1 and C2.

(C1) The control C1 is to read data related to an image-forming device such as a total counter value (a total number of forming images).

(C2) The control C2 is to return a result of communication from the image-forming devices 1 through 5 to the data communication device 7 according to the communication control (2).

The data communication device 7 controls reading the data related to the image-forming device such as the total counter value, by carrying out the selecting operation when a data-acquisition request from the image-forming device is generated. The data-acquisition request from the image-forming device is assumed to be generated at a predetermined data acquisition time, for example, at 0:00 AM once a day. In a case in which the image-forming device is turned off when the data-acquisition request is generated, the data communication device 7 controls reading the total counter value by the selecting operation performed when the image-forming device is turned on for the first time after the image-forming device is turned off. Additionally, if the operation mode of the data communication device 7 is the energy-saving mode when the data-acquisition request is generated, the CPU 41 of the data communication device 7 supplies electricity to the power-supply system B by use of the power-supply controller 48, and controls to activate the image-forming-device interface 45.

The data communication device 7 has two memories for a total counter of each image-forming device connected to the data communication device 7, in the RAM 43, which are named a memory A and a memory B. The CPU 41 writes the total counter value read by the selecting operation once a day as described above, in the memory A. Thus, every day, the total counter value written in the memory A on the previous day is rewritten over by the total counter value of the present day. However, if the present day is a holiday on which an image-forming device is not turned on all day long, the total counter value of the previous day is not rewritten by the total counter value of the present day. Additionally, the CPU 41 copies the total counter value stored in the memory A to the memory B on a predetermined day of each month, which is set by the central management device 6 and stored in the RAM 43 of the data communication device 7.

The data communication device 7 transmits contents (the total counter value) of the memory B to the central management device 6 by following one of methods D1 and D2 described below.

(D1) The central management device 6 reads the total counter value stored in the memory B of the data communication device 7 after contents of the memory A is copied to the memory B. In detail, the central management device 6 connects itself to the data communication device 7 by calling the data communication device 7, so that the central management device 6 can communicate with the data communication device 7. Subsequently, the central management device 6 accesses to the data communication device 7 by transmitting a corresponding data-transmission requesting signal (a reading instruction) to the data communication device 7, and obtains the contents (the total counter value of each image-forming device 1 through 5) of the memory B, which is transmitted from the data communication device 7.

(D2) The CPU 41 of the data communication device 7 calls spontaneously by use of the NCU 46 at a predetermined data-transmission time (a year, a month, a date, an hour and a minute), that is, after the above-described date on which the contents of the memory A is copied to the memory B, and, then, transmits the total counter value stored in the memory B to the central management device 6 through the communication line 8 by using the NCU 46 and the modem 47. If the operation mode of the data communication device 7 is the energy-saving mode, the data communication device 7 needs to carry out later-described power-supply control. The data-transmission time is set by the central management device 6, and is stored in the RAM 43 of the data communication device 7.

It should be noted that the data communication device 7 includes a plurality of memories (recording areas), each being composed of the memories A and B, in the RAM 43 for each image-forming device connected to the data communication device 7, because various total counter values may be assigned for black/white copy, application copy and color copy, for instance.

Figure 11:
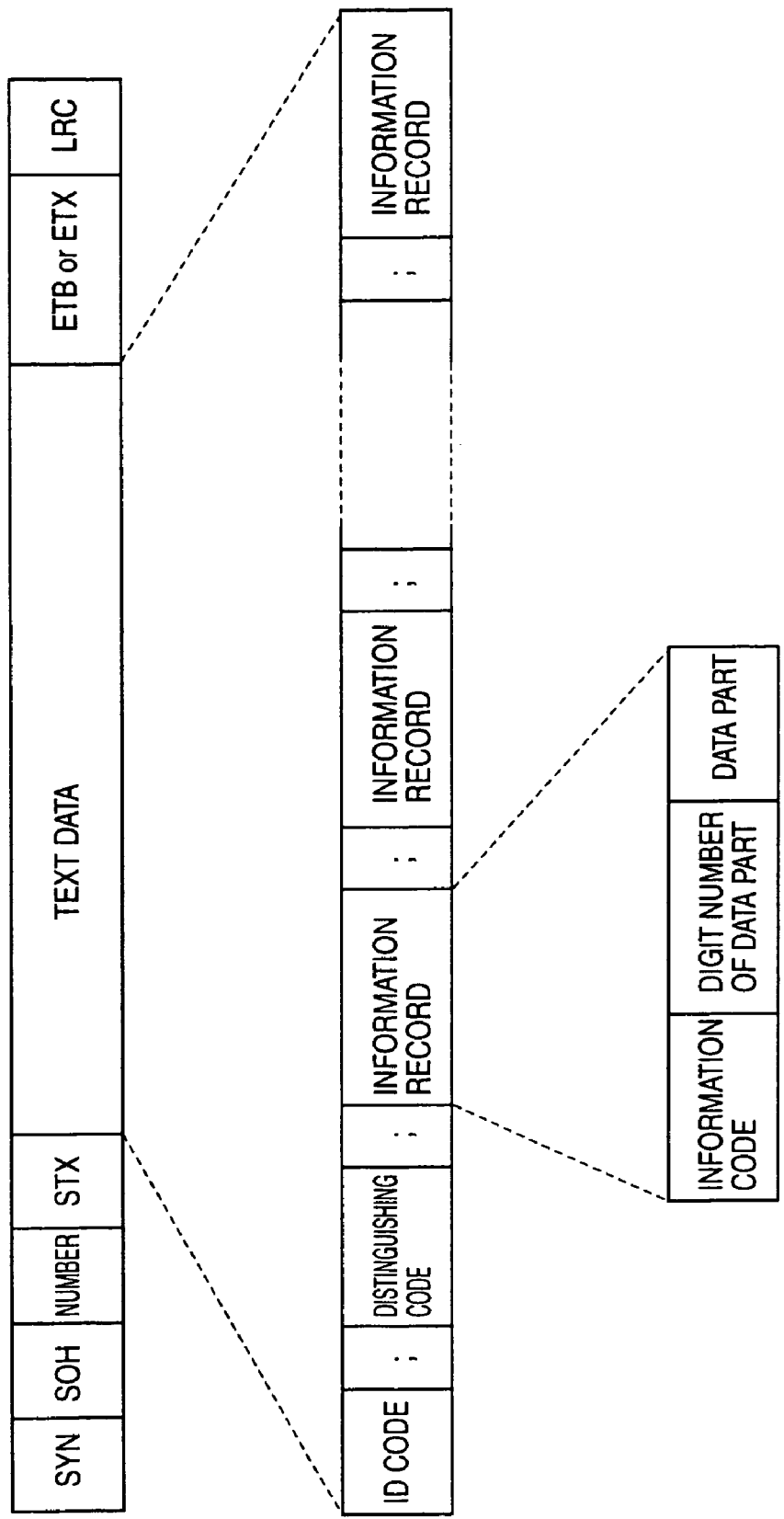
FIG. 11 is a diagram showing a structure of text data transferred between a central management device and the data communication device, both being included in the image-forming-device management system according to the first embodiment.

FIG. 11 is a diagram showing a structure of text data transferred between the central management device 6 and the data communication device 7. A "number" shown in FIG. 11 is a communication block number in one data transmission. The first block in the data transmission has a communication block number "01". Then, the communication block number is incremented by one, up to "99". A communication block number following the communication block number "99" becomes "00".

An ID code is used for specifying the data communication device 7 and one of the five image-forming devices 1 through 5 that are connected to the data communication device 7. A distinguishing code is a process code that indicates a type of a communication purpose including a type of data to be transmitted to the central management device 6, added with an origin (a transmitting end) and a destination (a receiving end) of the text data. The above-described process code is predetermined as shown in FIG. 12. In FIG. 12, a process code "02" corresponds to the data-transmission requesting signal that requests data transmission (data read). Additionally, a process code "04" corresponds to the data-write requesting signal that requests writing data.

An information record shown in FIG. 11 has an information code, a data part and a digit number of the data part, which are determined as shown in FIG. 13. A semicolon is inserted as a separator between the ID code and the distinguishing code, between the distinguishing code and the information record, and between the information records.

Figure 14:
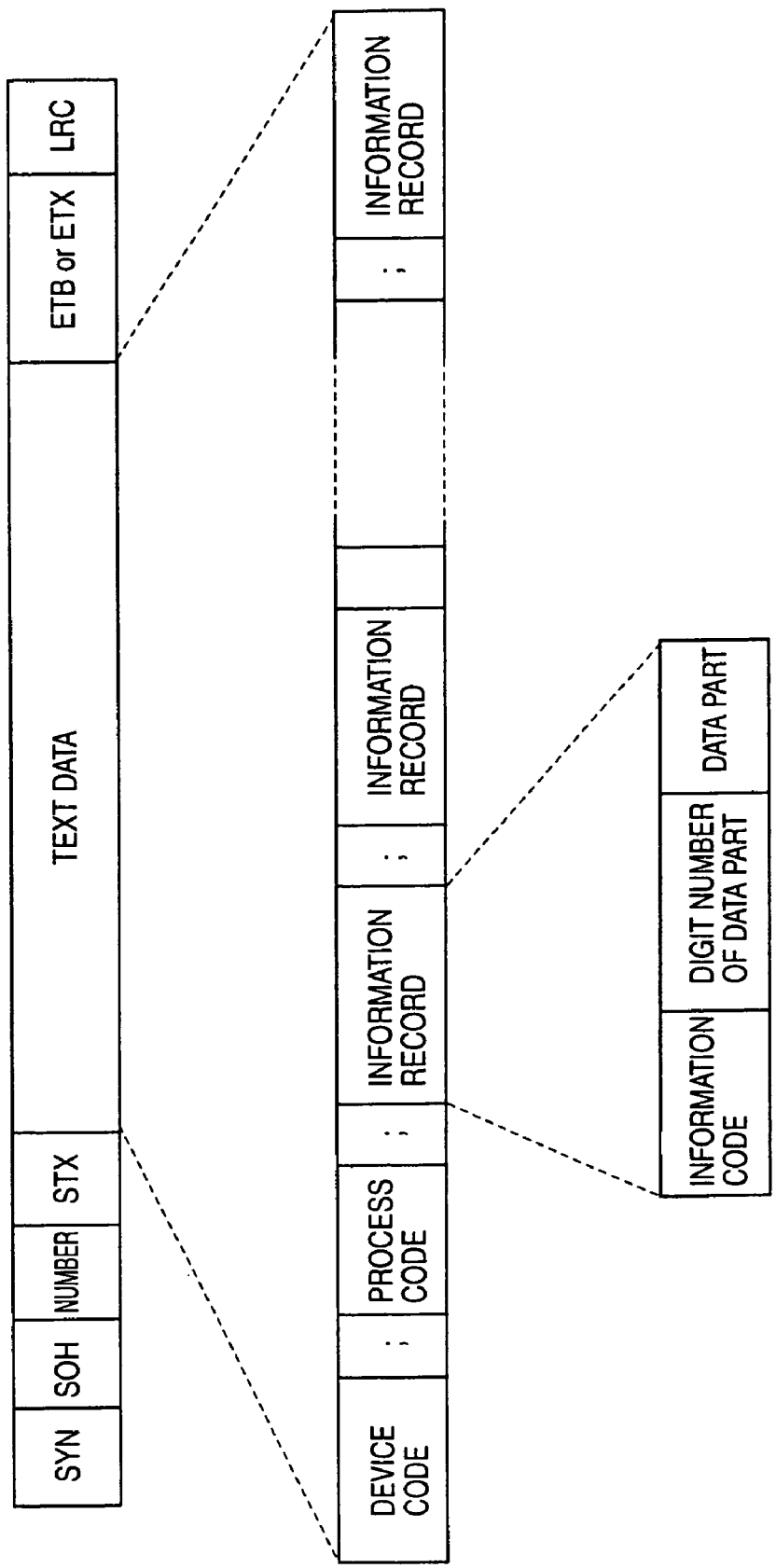
FIG. 14 is a diagram showing a structure of text data transferred between the data communication device and the personal interface of the image-forming device.

FIG. 14 is a diagram showing text data transferred between the data communication -device 7 and the personal interface 18 of the image-forming devices 1 through 5. A device code shown in FIG. 14 is set individually by the device-code setting switch 30 shown in FIG. 4 for each image-forming device 1 through 5. A relation between this device code and the ID code shown in FIG. 11 is read from an image-forming device when the image-forming device is installed and connected to the data communication device 7 for the first time, and, then, is stored in the RAM 43 of the data communication device 7. Since then, the relation between the device code and the ID code is changed according to a direction of transmitting the text data. A process code shown in FIG. 14 is a code indicating a type of a communication purpose, as described above, and equals to the distinguishing code shown in FIG. 11 without the origin and the destination of the text data. This process code is added or discarded by the data communication device 7 according to a direction of transmitting the text data.

Figure 15:
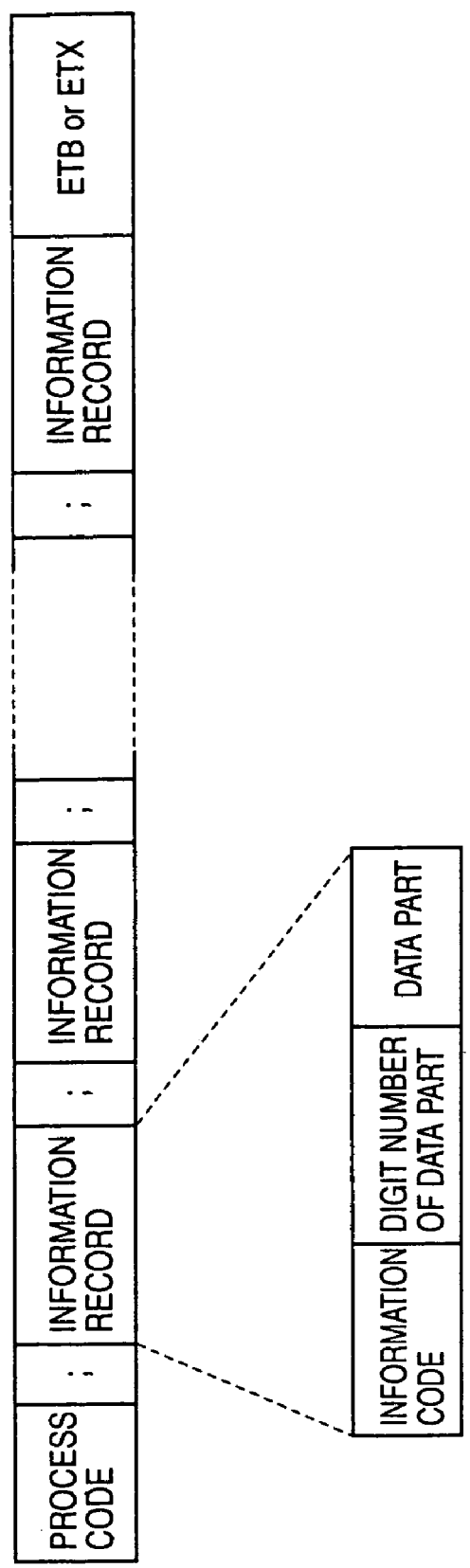
FIG. 15 is a diagram showing a structure of text data transferred between the personal interface of the image-forming device and a PPC controller shown in FIG. 4.

FIG. 15 is a diagram showing a structure of text data transferred between the personal interface 18 of the image-forming device 1 through 5 and the PPC controller 31 shown in FIG. 4. The text data shown in FIG. 15 eliminates a header, the device code and a parity part from the text data that is shown in FIG. 14, and is transferred between the data communication device 7 and the personal interface 18.

A description will now be given of processes performed by the data communication device 7 used in the image-forming-device management system according to the first embodiment, with reference to FIGS. 16 through 19.

Figure 16:
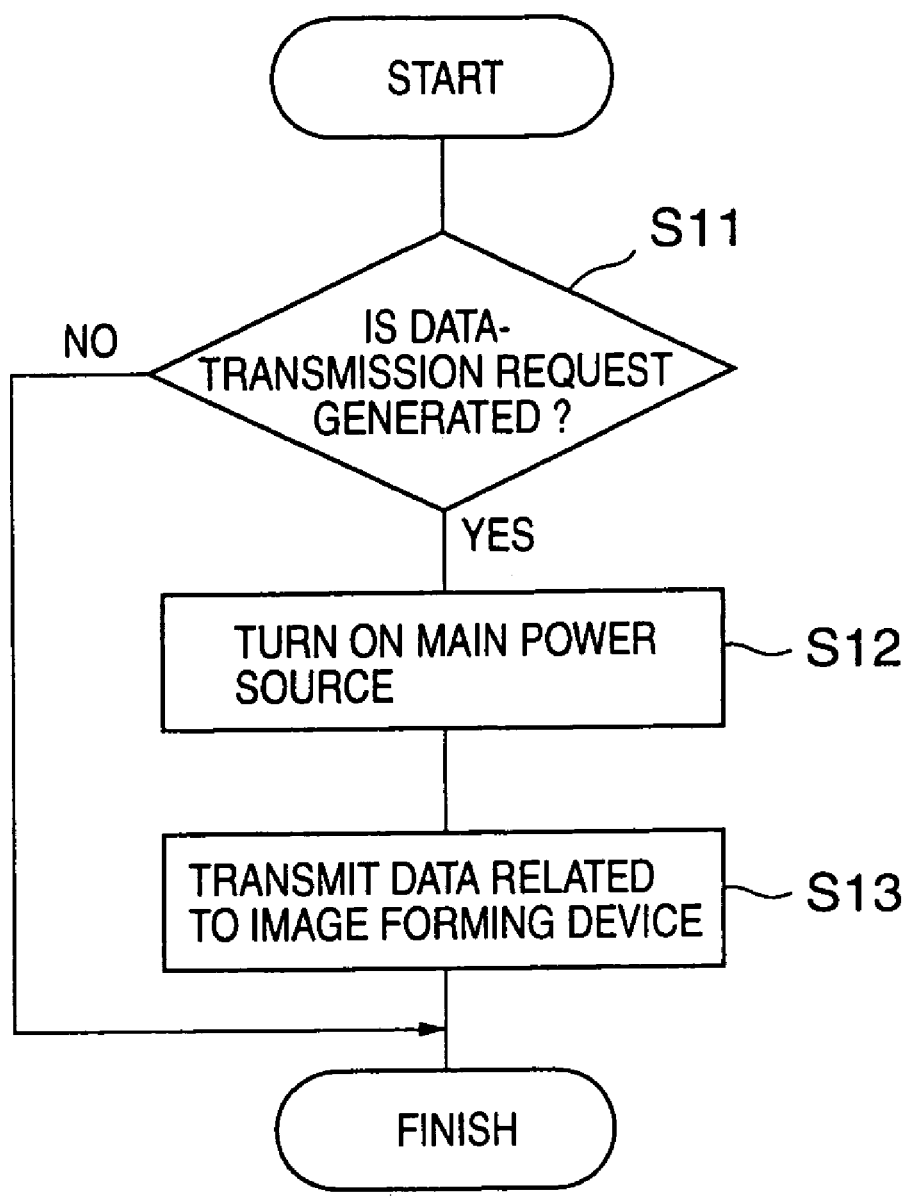
FIG. 16 is a flowchart showing a first example of processes performed by the data communication device.

FIG. 16 is a flowchart showing a first example of the processes performed by the data communication device 7. The data communication device 7 is assumed being in the energy-saving mode. In such an energy-saving mode, the power-supply controller 48 supplies electricity to only the power-supply system A. In other words, the power-supply controller 48 supplies the electricity to only the CPU 41, the ROM 42, the RAM 43 and the RTC 44.

The time comparing unit included in the RTC 44 generates a data-transmission request for the central management device 6 to the CPU 41, or interrupts the CPU 41, when reaching the predetermined data-transmission time (a call time). Examples of a data-transmission request generating process by the time comparing unit of the RTC 44 are shown below (E1, E2, E3 and E4).

(E1) The time comparing unit compares the current time generated by the time generating unit with the data-transmission time preset in the transmission-time setting register, and generates the data-transmission request that requests for data transmission to the central management device 6, if the current time matches with the data-transmission time, or if the current time passes the data-transmission time.

Alternatively, the RTC 44 may include only the time generating unit as a clock function. The transmission-time setting register and the time comparing unit may be provided separately from the RTC 44. In such a case, the RAM 43 may secure an area therein for the transmission-time setting register, for instance. Accordingly, the time comparing unit compares the current time generated by the RTC 44 with the data-transmission time preset in the transmission-time setting register, and generates the data-transmission request that requests for data transmission to the central management device 6, if the current time matches with the data-transmission time, or if the current time passes the data-transmission time.

(E2) The time comparing unit compares the current time generated by the time generating unit with the data-transmission time preset in the transmission-time setting register, and decides whether the RAM 43 (data storing means) stores data related to an image-forming device, if the current time matches with the data-transmission time, or if the current time passes the data-transmission time. If the time comparing unit decides that the RAM 43 stores the data related to the image-forming device, the time comparing unit generates the data-transmission request that requests for data transmission to the central management device 6.

Alternatively, the RTC 44 may include only the time generating unit as a clock function. The transmission-time setting register and the time comparing unit may be provided separately from the RTC 44. In such a case, the RAM 43 may secure an area therein for the transmission-time setting register, for instance. Accordingly, the time comparing unit compares the current time generated by the RTC 44 with the data-transmission time preset in the transmission-time setting register, and notifies the CPU 41 about correspondence of the current time and the data-transmission time if the current time matches with the data-transmission time, or if the current time passes the data-transmission time. When the CPU 41 receives the notification from the time comparing unit, the CPU 41 decides whether the RAM 43 (data storing means) stores data related to an image-forming device. If the CPU 41 decides that the RAM 43 stores the data related to the image-forming device, the CPU 41 generates the data-transmission request that requests for data transmission to the central management device 6.

(E3) The time comparing unit decides whether the RAM 43 stores the data related to the image-forming device. If the time comparing unit decides that the RAM 43 stores the data related to the image-forming device, the time comparing unit compares the current time generated by the time generating unit, with a data-transmission time that is preset in the transmission-time setting register and corresponds to the data. The time comparing unit generates the data-transmission request that requests for data transmission to the central management device 6, if the current time matches with the data-transmission time, or if the current time passes the data-transmission time.

Alternatively, the RTC 44 may include only the time generating unit as a clock function. The transmission-time setting register and the time comparing unit may be provided separately from the RTC 44. In such a case, the RAM 43 may secure an area therein for the transmission-time setting register, for instance. Accordingly, the CPU 41 decides whether the RAM 43 stores the data related to the image-forming device. If the CPU 41 decides that the RAM 43 stores the data related to the image-forming device, the CPU 41 notifies the time comparing unit about the existence of the data in the RAM 43. After receiving the notification from the CPU 41, the time comparing unit compares the current time generated by the RTC 44, with the data-transmission time preset in the transmission-time setting register. The time comparing unit generates the data-transmission request that requests for data transmission to the central management device 6, if the current time matches with the data-transmission time, or if the current time passes the data-transmission time.

(E4) The time comparing unit decides whether the RAM 43 stores the data related to the image-forming device. If the time comparing unit decides that the RAM 43 stores the data related to the image-forming device, the time comparing unit sets a data-transmission time to the central management device 6, in a transmission-time setting register corresponding to the data. Subsequently, the time comparing unit compares the data-transmission time set in the transmission-time setting register, with the current time generated by the time generating unit. The time comparing unit generates the data-transmission request that requests for data transmission to the central management device 6, if the current time matches with the data-transmission time, or if the current time passes the data-transmission time.

Alternatively, the RTC 44 may include only the time generating unit as a clock function. The transmission-time setting register and the time comparing unit may be provided separately from the RTC 44. In such a case, the RAM 43 may secure an area therein for the transmission-time setting register, for instance. Accordingly, the CPU 41 decides whether the RAM 43 stores the data related to the image-forming device. If the CPU 41 decides that the RAM 43 stores the data related to the image-forming device, the CPU 41 sets a data-transmission time to the central management device 6, in a transmission-time setting register corresponding to the data. Subsequently, the time comparing unit compares the current time generated by the RTC 44, with the data-transmission time set in the transmission-time setting register. The time comparing unit generates the data-transmission request that requests for data transmission to the central management device 6, if the current time matches with the data-transmission time, or if the current time passes the data-transmission time.

The CPU 41 of the data communication device 7 starts the processes shown in FIG. 16 periodically. In a case in which the CPU 41 generates the data-transmission request from the RTC 44 to the central management device 6 at a step S11 shown in FIG. 16, the CPU 41 instructs the power-supply controller 48 to supply electricity to the power-supply system B by turning on the main power source. In a case in which the power-supply controller 48 receives the instruction from the CPU 41, the power-supply controller 48 supplies electricity to the entire data communication device 7 at a step S12, by supplying electricity to the power-supply system B, which is a part related to communication, and includes the NCU 46 and the modem 47 functioning as data transmission means. Consequently, the power-supply controller 48 activates the NCU 46, the modem 47 and the image-forming-device interface 45, which are included in the power-supply system B. Thus, the data communication device 7 shifts from the energy-saving mode to the normal operation mode.

Subsequently, the CPU 41 instructs the NCU 46 to call the central management device 6. The CPU 41, then, reads out data that is related to an image-forming device, and is obtained from one of the image-forming device 1 though 5, from the RAM 43, and transmits the data to the central management device 6 through the communication line 8 by using the NCU 46 and the modem 47, at a step S13. In detail, the CPU 41 instructs the modem 47 to modulate the data read out from the RAM 43, and instructs the NCU 46 to transmit the data modulated by the modem 47, to the central management device 6 through the communication line 8.

A large number of recent CPUs have an energy-saving mode, and may be used as the CPU 41 of the data communication device. In detail, when the data communication device 7 is in the energy-saving mode, the CPU 41 of the data communication device 7 becomes also in the energy-saving mode. At this moment, the CPU 41 may start up periodically by its clock function, and may obtain the current time from the RTC 44. Subsequently, the CPU 41 may compare the current time with a data-transmission time stored or preset inside the CPU 41.

The CPU 41 is included in the power-supply system A of the data communication device 7, which is always supplied with electricity. When the data-transmission request that requests for data transmission to the central management device 6 is generated, the CPU 41 starts supplying electricity from the power-supply controller 48 to the power-supply system B, which includes the NCU 46 and the modem 47 functioning as the data transmission means. The CPU 41, then, transmits the data related to the image-forming devices 1 through 5, to the central management device 6, by using the NCU 46 and the modem 47 activated by the power supply. As described above, the data communication device 7 is supplied with electricity at least when the data communication device 7 carries out data transmission (automatic report) to the central management device 6. On the other hand, electricity is supplied to only functions that satisfies minimum requirement of the data communication device 7 in the energy-saving mode. Accordingly, the data communication device 7 can achieve reduction of unnecessary power consumption.

Additionally, according to the data-transmission request generating process as described in E1 through E4, means that needs power supply constantly for generating the data-transmission request that requests for data transmission to the central management device 6 can be composed of minimum requirement, that is, the RTC 44. Thus, the data communication device 7 can further reduce power consumption.

Figure 17:
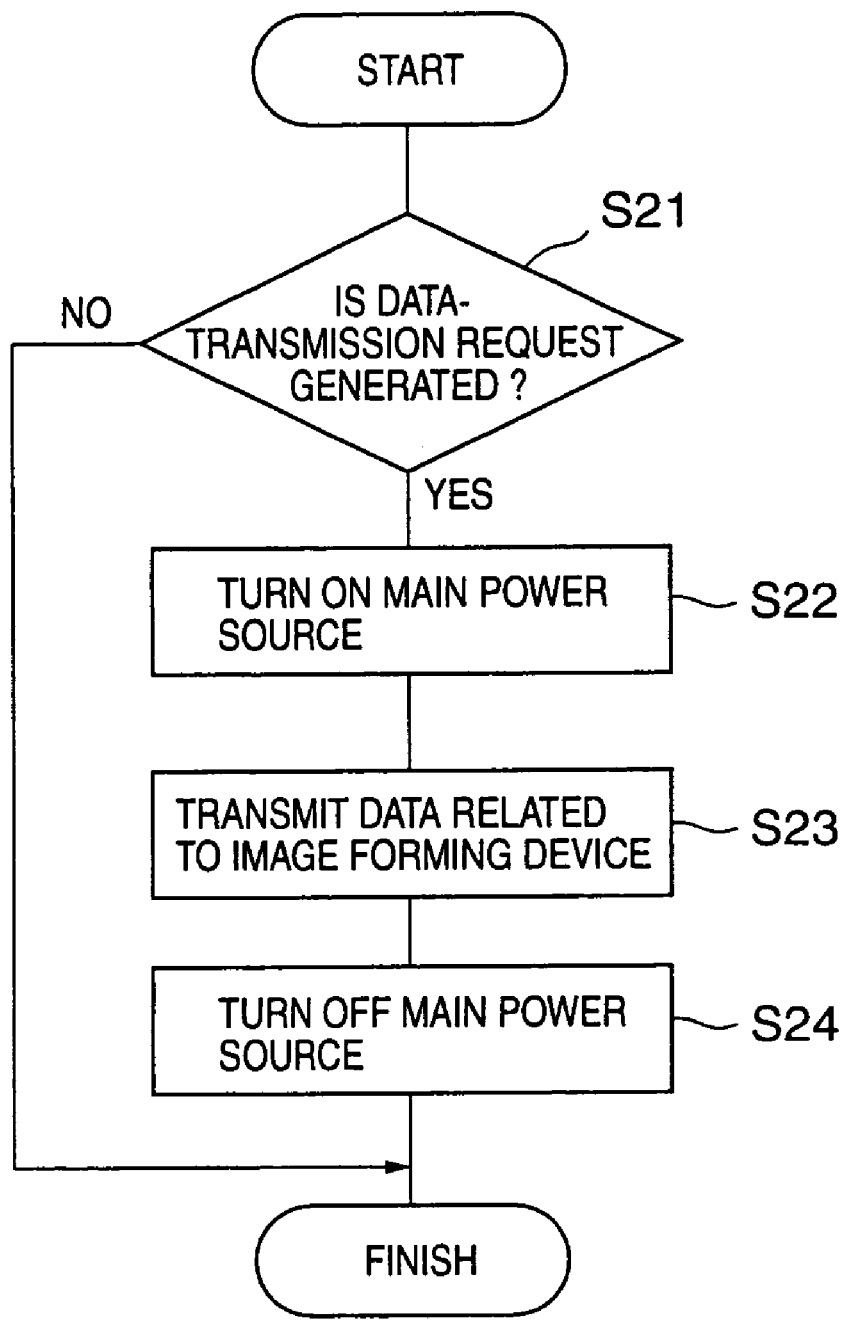
FIG. 17 is a flowchart showing a second example of the processes performed by the data communication device.

FIG. 17 is a flowchart showing a second example of the processes performed by the data communication device 7. The data communication device 7 is assumed being in the energy-saving mode. In this state, electricity is supplied from the power-supply controller 48 to only the power-supply system A, which includes the CPU 41, the ROM 42, the RAM 43 and the RTC 44. The time comparing unit inside the RTC 44 generates the data-transmission request for the central management device 6 to the CPU 41, when reaching the predetermined data-transmission time, as described above. Details of this data-transmission request generating process are described above.

The CPU 41 starts the processes shown in FIG. 17 periodically. When the CPU 41 generates the data-transmission request from the RTC 44 to the central management device 6 at a step S21 shown in FIG. 17, the CPU 41 instructs the power-supply controller 48 to supply electricity to the power-supply system B by turning the main power source. In a case in which the power-supply controller 48 receives the instruction from the CPU 41, the power-supply controller 48 switches to supply electricity to the entire data communication device 7 at a step S22, by supplying electricity to the power-supply system B, which is the part related to communication, and includes the NCU 46 and the modem 47 functioning as the data transmission means. Consequently, the power-supply controller 48 activates the NCU 46, the modem 47 and the image-forming-device interface 45, which are included in the power-supply system B. Thus, the data communication device 7 shifts from the energy-saving mode to the normal operation mode.

Subsequently, the CPU 41 instructs the NCU 46 to call the central management device 6. The CPU 41, then, reads out data that is related to an image-forming device, and is obtained from the image-forming devices 1 though 5, from the RAM 43, and transmits the data to the central management device 6 through the communication line 8 by using the NCU 46 and the modem 47, at a step S23.

After completing transmission of the data related to the image-forming device, the CPU 41 instructs the power-supply controller 48 to stop supplying the electricity to the power-supply system B. If receiving the instruction to stop the power-supply to the power-supply system B from the CPU 41, the power-supply controller 48 stops supplying the electricity to the power-supply system B by turning off the main power source to the power-supply system B, and deactivates the NCU 46, the modem 47 and the image-forming-device interface 45, at a step S24. Consequently, the data communication device 7 shifts back from the normal operation mode to the energy-saving mode. It should be noted that the energy-saving mode of the CPU 41 can be utilized in this second example.

The CPU 41 is included in the power-supply system A of the data communication device 7, which is always supplied with electricity. When the data-transmission request that requests for data transmission to the central management device 6 is generated, the CPU 41 starts supplying electricity from the power-supply controller 48 to the power-supply system B related to communication, which includes the NCU 46 and the modem 47 functioning as the data transmission means. The CPU 41, then, transmits the data related to the image-forming devices 1 through 5, to the central management device 6, by using the NCU 46 and the modem 47 activated by the power supply. After completing the transmission of the data to the central management device 6, the CPU 41 stops supplying the electricity from the power-supply controller 48 to the power-supply system B, which is the part related to communication.

As described above, the data communication device 7 is supplied with electricity entirely only when the data communication device 7 carries out data transmission to the central management device 6. On the other hand, electricity is supplied to only functions that satisfies minimum requirement of the data communication device 7 in the energy-saving mode. Accordingly, the data communication device 7 can achieve reduction of unnecessary power consumption.

Figure 18:
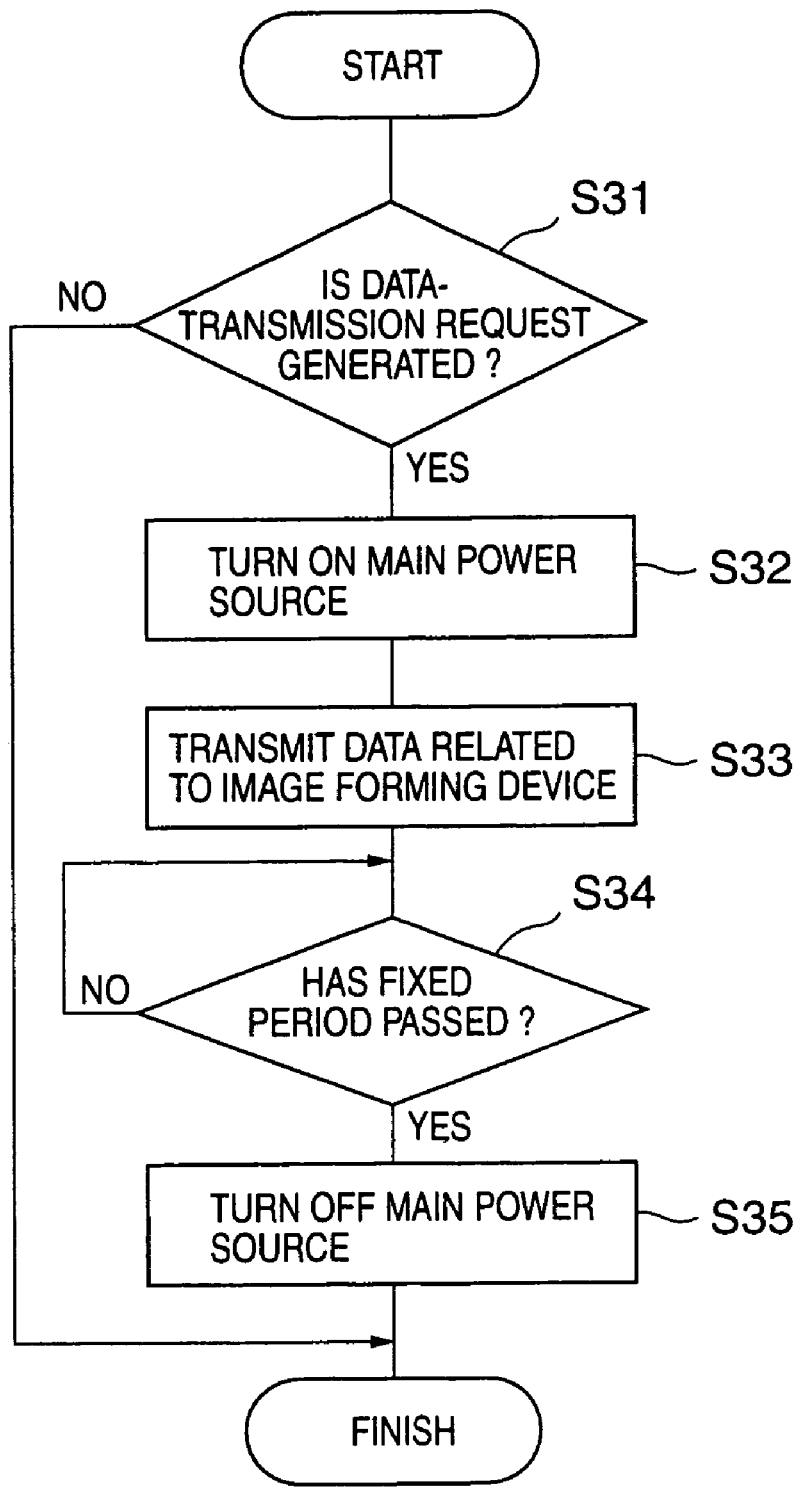
FIG. 18 is a flowchart showing a third example of the processes performed by the data communication device.

FIG. 18 is a flowchart showing a third example of the processes performed by the data communication device 7. The data communication device 7 is assumed being in the energy-saving mode. In this state, electricity is supplied from the power-supply controller 48 to only the power-supply system A. In other words, the electricity is supplied to the CPU 41, the ROM 42, the RAM 43 and the RTC 44. The time comparing unit inside the RTC 44 generates the data-transmission request for the central management device 6 to the CPU 41, when reaching the predetermined data-transmission time, as described above.

The CPU 41 starts the processes shown in FIG. 18 periodically. When the CPU 41 generates the data-transmission request from the RTC 44 to the central management device 6 at a step S31 shown in FIG. 18, the CPU 41 instructs the power-supply controller 48 to supply electricity to the power-supply system B by turning the main power source.

In a case in which the power-supply controller 48 receives the instruction from the CPU 41, the power-supply controller 48 switches to supply electricity to the entire data communication device 7 at a step S32, by supplying electricity to the power-supply system B, which is the part related to communication, and includes the NCU 46 and the modem 47 functioning as the data transmission means. Consequently, the power-supply controller 48 activates the NCU 46, the modem 47 and the image-forming-device interface 45, which are included in the power-supply system B. Thus, the data communication device 7 shifts from the energy-saving mode to the normal operation mode.

Subsequently, the CPU 41 instructs the NCU 46 to call the central management device 6. The CPU 41, then, reads out data that is related to an image-forming device, and is obtained from the image-forming devices 1 though 5, from the RAM 43, and transmits the data to the central management device 6 through the communication line 8 by using the NCU 46 and the modem 47, at a step S33.

After the CPU 41 completes transmission of the data related to the image-forming device, and a predetermined fixed period passes after the completion of the transmission at a step S34, the CPU 41 instructs the power-supply controller 48 to stop supplying the electricity to the power-supply system B. For instance, the CPU 41 sets the above-described fixed period, for example, three minutes, to an internal timer, and instructs the power-supply controller 48 to stop supplying the electricity to the power-supply system B when the internal timer timeouts or has counted the fixed period.

If receiving the instruction to stop the power-supply to the power-supply system B from the CPU 41, the power-supply controller 48 stops supplying the electricity to the power-supply system B by turning off the main power source to the power-supply system B, and deactivates the NCU 46, the modem 47 and the image-forming-device interface 45, at a step S35. Consequently, the data communication device 7 shifts back from the normal operation mode to the energy-saving mode.

The data communication device 7 is not in the energy-saving mode before the above-described fixed period passes, or before the internal timer timeouts. Thus, the CPU 41 can receive an instruction signal from the central management device 6 by using the NCU 46 and the modem 47, and transmits a response to the central management device 6 by using the NCU 46 and the modem 47. Consequently, the data communication device 7 can communicate with the central management device 6 before the fixed period passes. It should be noted that the energy-saving mode of the CPU 41 can also be utilized in this third example, as described above.

The CPU 41 is included in the power-supply system A of the data communication device. 7, which is always supplied with electricity. When the data-transmission request that requests for data transmission to the central management device 6 is generated, the CPU 41 starts supplying electricity from the power-supply controller 48 to the power-supply system B related to communication, which includes the NCU 46 and the modem 47 functioning as the data transmission means. The CPU 41, then, transmits the data related to the image-forming devices 1 through 5, to the central management device 6, by using the NCU 46 and the modem 47 activated by the power supply.

After the CPU 41 completes the transmission of the data to the central management device 6, and the fixed period passes after the transmission of the data, the CPU 41 stops supplying the electricity from the power-supply controller 48 to the power-supply system B, which is the part related to communication. Accordingly, the image-forming-device management system according to the first embodiment can obtain the following effects.

The data communication device 7 is supplied with electricity entirely only when the data communication device 7 carries out data transmission to the central management device 6. On the other hand, electricity is supplied to only functions that satisfies minimum requirement of the data communication device 7 in the energy-saving mode. Accordingly, the data communication device 7 can achieve reduction of unnecessary power consumption.

Additionally, the data communication device 7 can communicate with the central management device 6, in the fixed period between the completion of transmitting the data related to the image-forming device, and the discontinuation of supplying the electricity to the power-supply system B, which is the part related to communication. For example, the data communication device 7 can change a part or all of various parameters that include the above-described fixed time and period, and are stored in the RAM 43, by receiving the instruction signal from the central management device 6, in the fixed period. Consequently, the image-forming-device management system can increase its processing efficiency, and can be structured as a general-purpose system.

Figure 19:
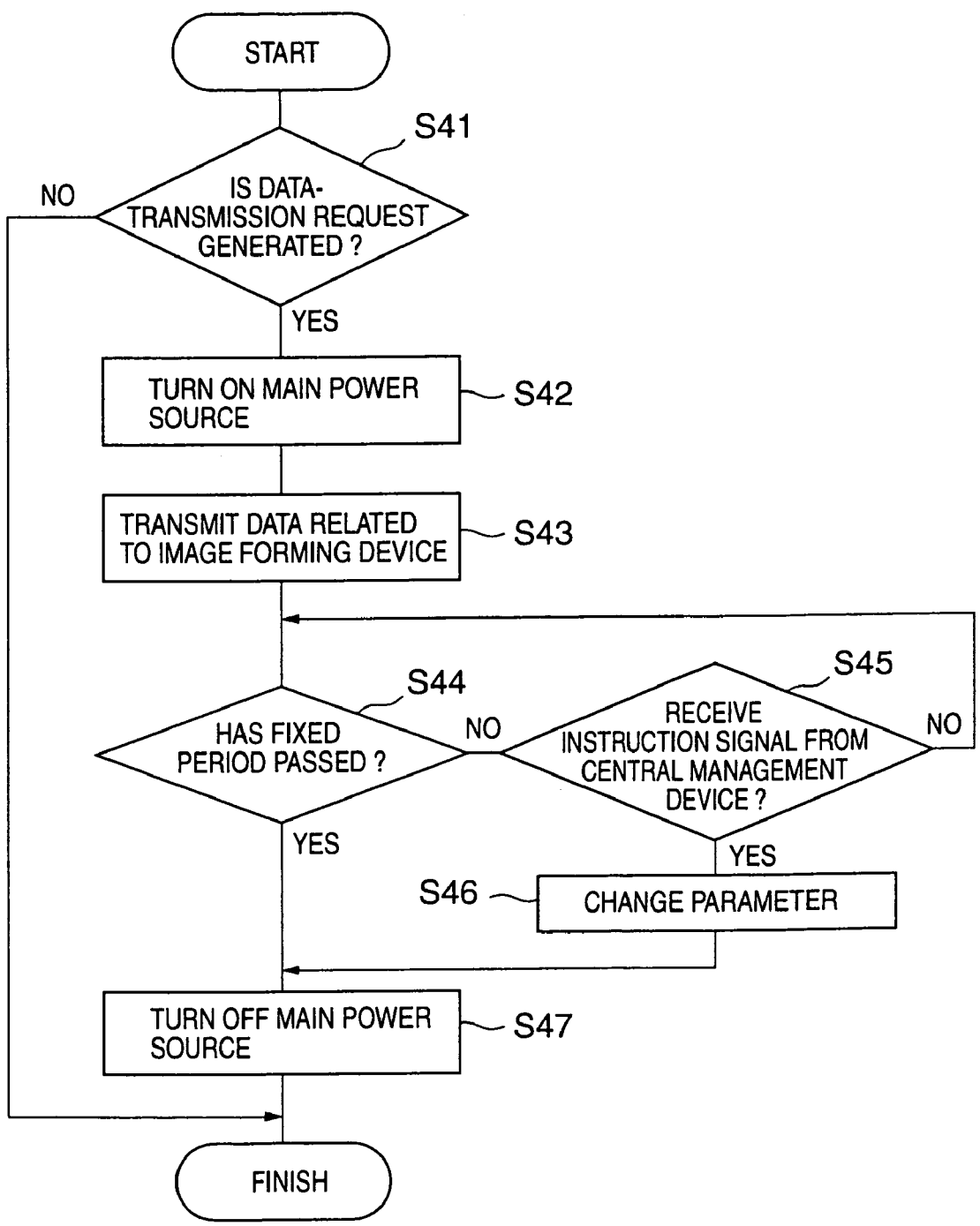
FIG. 19 is a flowchart showing a fourth example of the processes performed by the data communication device.

FIG. 19 is a flowchart showing a fourth example of the processes performed by the data communication device 7. The data communication device 7 is assumed being in the energy-saving mode. In this state, electricity is supplied from the power-supply controller 48 to only the power-supply system A. In other words, the electricity is supplied to the CPU 41, the ROM 42, the RAM 43 and the RTC 44. The time comparing unit inside the RTC 44 generates the data-transmission request for the central management device 6 to the CPU 41, when reaching the predetermined data-transmission time, as described above.

The CPU 41 starts the processes shown in FIG. 19 periodically. When the CPU 41 generates the data-transmission request from the RTC 44 to the central management device 6 at a step S41 shown in FIG. 19, the CPU 41 instructs the power-supply controller 48 to supply electricity to the power-supply system B by turning the main power source on.

In a case in which the power-supply controller 48 receives the instruction from the CPU 41, the power-supply controller 48 switches to supply electricity to the entire data communication device 7 at a step S42, by supplying electricity to the power-supply system B, which is the part related to communication, and includes the NCU 46 and the modem 47 functioning as the data transmission means. Consequently, the power-supply controller 48 activates the NCU 46, the modem 47 and the image-forming-device interface 45, which are included in the power-supply system B. Thus, the data communication device 7 shifts from the energy-saving mode to the normal operation mode.

Subsequently, the CPU 41 instructs the NCU 46 to call the central management device 6. The CPU 41, then, reads out data that is related to an image-forming device, and is obtained from the image-forming devices 1 though 5, from the RAM 43, and transmits the data to the central management device 6 through the communication line 8 by using the NCU 46 and the modem 47, at a step S43.

After the CPU 41 completes transmission of the data related to the image-forming device, and a predetermined fixed period passes after the completion of the transmission at a step S44, the CPU 41 instructs the power-supply controller 48 to stop supplying the electricity to the power-supply system B. For instance, the CPU 41 sets the above-described fixed period, for example, three minutes, to an internal timer, and instructs the power-supply controller 48 to stop supplying the electricity to the power-supply system B when the internal timer timeouts or has counted the fixed period.

If receiving the instruction to stop the power-supply to the power-supply system B from the CPU 41, the power-supply controller 48 stops supplying the electricity to the power-supply system B by turning off the main power source to the power-supply system B, and deactivates the NCU 46, the modem 47 and the image-forming-device interface 45, at a step S47. Consequently, the data communication device 7 shifts back from the normal operation mode to the energy-saving mode.

The data communication device 7 is not in the energy-saving mode before the above-described fixed period passes, or before the internal timer timeouts. Thus, the CPU 41 allows reception of an instruction signal from the central management device 6 while the above-described fixed period does not pass. If the data communication device 7 receives data (parameters) used for changing parameters, as the instruction signal, from the central management device 6 by using the NCU 46 and the modem 47 at a step S45, the CPU 41 of the data communication device 7 changes a part or all of various parameters stored in the RAM 43 by using the data at a step S46, and instructs the power-supply controller 48 to stop supplying the electricity to the power-supply system B.

The various parameters stored in the RAM 43 includes data indicating the call time (the data-transmission time) at which the data communication device 7 calls the central management device 6, and data indicating the fixed period taken from the transmission of the data related to the image-forming devices 1 through 5 to the central management device 6, to the shift from the normal operation mode to the energy-saving mode. It should be noted that the energy-saving mode of the CPU 41 may be utilized in this fourth example.

The CPU 41 is included in the power-supply system A of the data communication device 7, which is always supplied with electricity. When the data-transmission request that requests for data transmission to the central management device 6 is generated, the CPU 41 starts supplying electricity from the power-supply controller 48 to the power-supply system B related to communication, which includes the NCU 46 and the modem 47 functioning as the data transmission means. The CPU 41, then, transmits the data related to the image-forming devices 1 through 5, to the central management device 6, by using the NCU 46 and the modem 47 activated by the power supply.

After the CPU 41 completes the transmission of the data to the central management device 6, and the fixed period passes after the transmission of the data, the CPU 41 stops supplying the electricity from the power-supply controller 48 to the power-supply system B, which is the part related to communication. Accordingly, the image-forming-device management system according to the first embodiment can obtain the following effects.

The data communication device 7 is supplied with electricity entirely only when the data communication device 7 carries out data transmission to the central management device 6. On the other hand, electricity is supplied to only functions that satisfies minimum requirement of the data communication device 7 in the energy-saving mode. Accordingly, the data communication device 7 can achieve reduction of unnecessary power consumption.

Additionally, the data communication device 7 allows the reception of the instruction signal from the central management device 6 until the fixed period passes after the completion of the above-described data transmission, or during the fixed period before stopping the power supply to the part related to communication by use of the power-supply controller 48. Thus, the data communication device 7 can easily change a part or all of the various parameters stored in the RAM 43 by receiving the instruction signal. Consequently, the image-forming-device management system can certainly increase its processing efficiency, and can be structured as a general-purpose system.

A description will now be given of an image-forming-device management system according to a second embodiment of the present invention. As shown in FIG. 2, the image-forming-device management system according to the second embodiment includes the image-forming devices 1 through 5, the central management device 6, the data communication device 7 and the communication line 8.

The image-forming devices 1 through 5 are remotely managed devices, and are connected to the data communication device 7. The data communication device 7 is connected to the central management device 6 through the communication line 8. The central management device 6 can carry out remote management of the image-forming devices 1 through 5 collectively through the communication line 8 and the data communication device 7. Structures of the image-forming devices 1 through 5 and the data communication device 7, and operations performed by the image-forming devices 1 through 5 and the data communication device 7 according to the second embodiment are different from those of the image-forming devices 1 through 5 and the data communication device 7 according to the first embodiment. Thus, a detailed description will be given of parts of the second embodiment that are different from the first embodiment. On the other band, common parts between the first embodiment and the second embodiment will be described simply.

Figure 20:
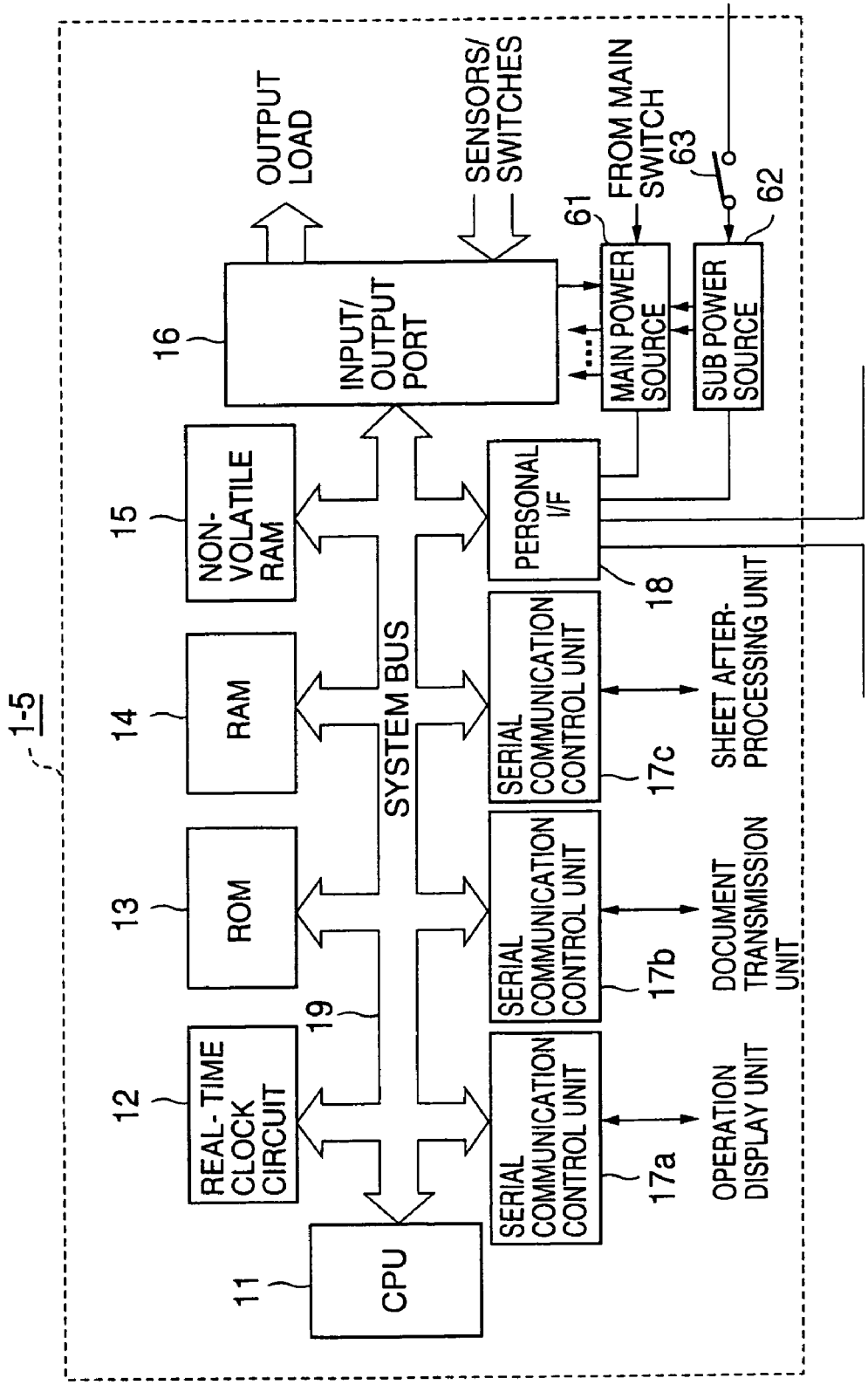
FIG. 20 is a block diagram showing a structure of a control unit of each image-forming device used in an image-forming-device management system according to a second embodiment of the present invention.

FIG. 20 is a block diagram showing a, structure of a control unit of each image-forming device 1 through 5 used in the image-forming-device management system according to the second embodiment. A unit shown in FIG. 20 corresponding to a unit shown in FIG. 3 has the same unit number as the unit shown in FIG. 3.

The control unit of each image-forming device 1 through 5 includes the PPC controller composed of the CPU 11, the RTC (Real-Time. Clock circuit) 12, the ROM 13, the RAM 14, the non-volatile RAM 15, the input/output port 16, and the serial communication control units 17a, 17b and 17c. The control unit further includes the personal interface 18, the system bus 19, a main power source 61, a sub power source 62 and a backup switch 63.

The CPU 11 is a central processing unit that controls the entire control unit collectively by using a control program stored in the ROM 13, and functions as power-supply part setting means. The real-time clock circuit (RTC) 12 functions as data-transmission request generating means including time generating means, and includes a time generating unit, a transmission-time setting register and a time comparing unit. The time generating unit generates a current time (a year, a month, a date, an hour and a minute). The transmission-time setting register sets a data-transmission time, at which an image-forming device transmits data related to the image-forming device, to the central management unit 6 or the data communication device 7.

In addition, the time comparing unit compares the current time generated by the time generating unit with the data-transmission time preset in the transmission-time setting register. The time comparing unit generates a data-transmission requesting signal (a data-transmission request) transmitted to the central management device 6 or the data communication device 7 if the current time and the data-transmission time match with each other, or if the current time passes the data-transmission time.

This RTC 12 is supplied with electricity constantly from the sub power source 62 separated from the main power source 61, and, thus, can generate the accurate current time even if the main power source 61 is turned off.

The personal interface 18 shown in FIG. 20 has functions as data transmission means, power-supply control means and startup-signal transmission means with the CPU 11 and the like, in addition to the same function as the personal interface 18 shown in FIG. 3. This personal interface 18 shown in FIG. 20 is supplied with electricity from the sub power source 62 constantly, and, thus, can monitor an output of the data communication device 7 even if the main power source is turned off. Accordingly, the personal interface 18 can receive each signal including a selecting signal and a polling signal, from the data communication device 7.

The main power source 61 supplies electricity to the entire image-forming device when a main switch not shown in the figures is turned on. Additionally, the main power source 61 supplies electricity to a part that is related to communication, and includes the CPU 11 functioning as the data transmission means, and a part that needs power supply to obtain data to be transmitted to the central management device 6, when the main power source 61 receives a main-power-source turning-on signal (a startup signal) as a main-power-source control signal from the personal interface 18.

On the other hand, the main power source 61 receives a main-power-source turning-off signal from the CPU 11, and is turned off, thereby stopping the power supply to each part, after the image-forming device finishes data transmission to the data communication device 7, or after the image-forming device finishes an image forming operation, and, then, a predetermined fixed time, for example, an hour, passes while the image-forming device is unused. Further, the main power source 61 is turned off, when the main switch is turned off.

The sub power source 62 is a low-power power source different from the main power source 61. The sub power source 62 supplies electricity to the personal interface 18 and the main power source 61 to activate each startup circuit of the personal interface 18 and the main power source 61, or to turn on the personal interface 18 and the main power source 61, if the backup switch 63 is turned on. Thus, the personal interface 18 and the main power source 61 are supplied with the electricity continuously from the sub power source 62, unless the backup switch is turned off.

Figure 21:
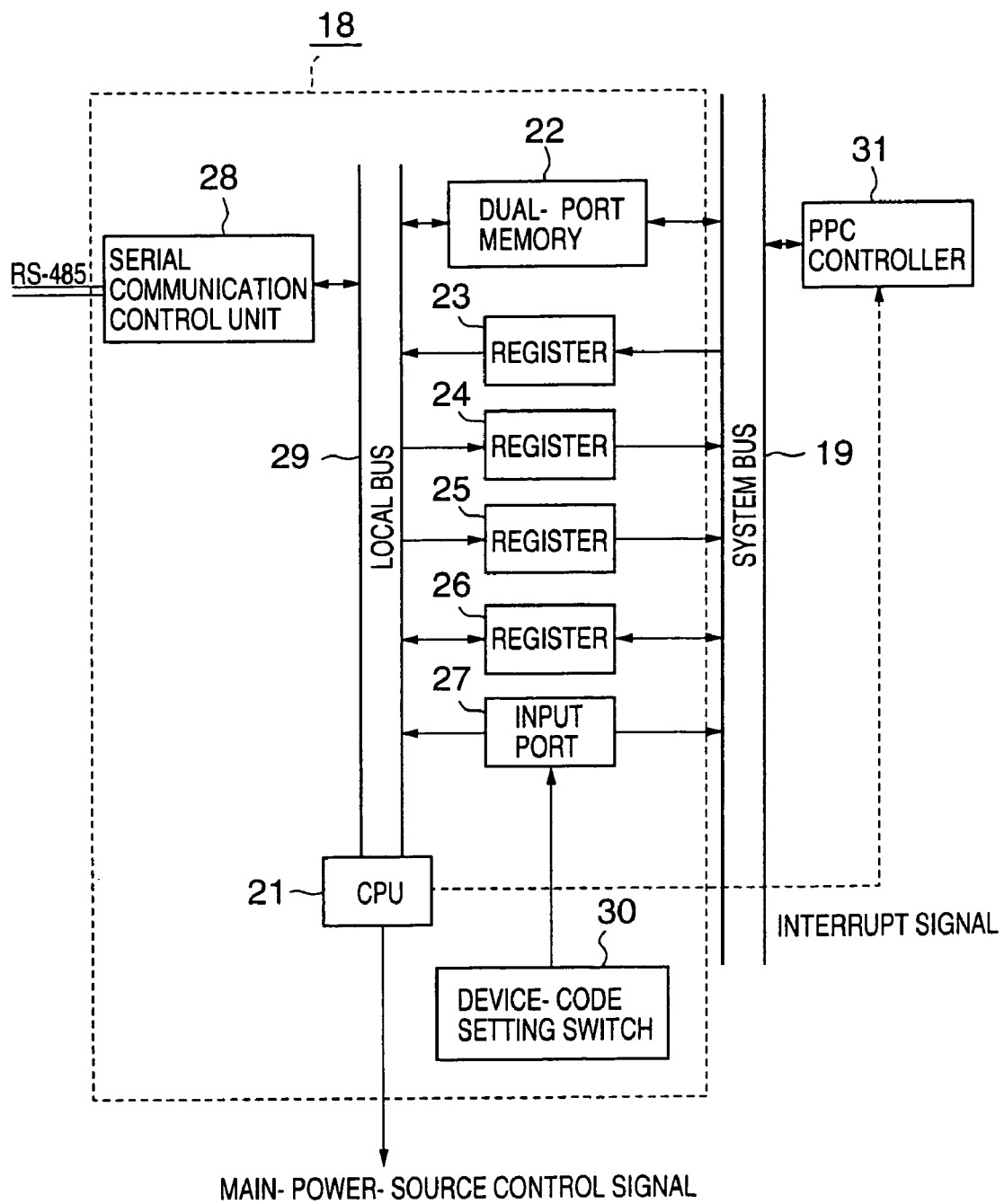
FIG. 21 is a block diagram showing a structure of a personal interface that is included in the control unit shown in FIG. 20.

FIG. 21 is a block diagram showing a structure of the personal interface 18 that is included in the control unit shown in FIG. 20. The personal interface 18 shown in FIG. 21 has the same hardware structure and functions as the personal interface 18 shown in FIG. 4. In addition, the personal interface 18 shown in FIG. 21 has the following function. The CPU 21 turns on the main power source 61 by using the main-power-source control signal-if the CPU 21 receives the selecting signal that composes the data-transmission requesting signal or the data-write requesting signal, from the data communication device 7 by using the serial communication control unit 28. The other functions of the image-forming devices 1 though 5 according to the second embodiment are the same as those of the image-forming devices 1 through 5 according to the first embodiment, and, thus, their descriptions are omitted.

Figure 22:
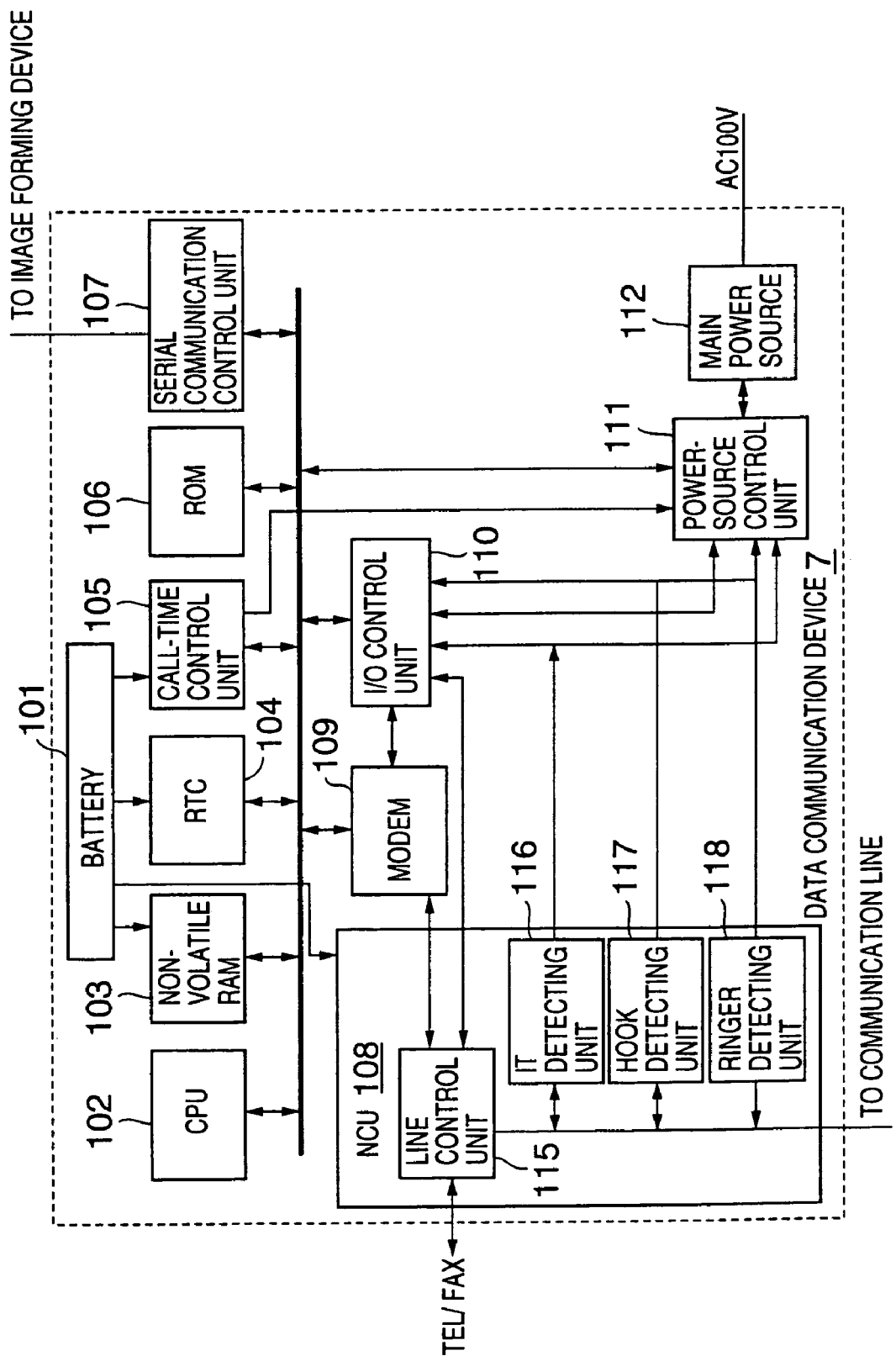
FIG. 22 is a block diagram showing a structure of a data communication device used in the image-forming-device management system according to the second embodiment.

FIG. 22 is a block diagram showing a structure of the data communication device 7 used in the image-forming-device management system according to the second embodiment. The data communication device 7 shown in FIG. 22 includes a battery 101, a CPU 102, a non-volatile RAM 103, an RTC (Real-Time Clock circuit) 104, a call-time control unit 105, a ROM 106, a serial communication control unit 107, a network control unit (NCU) 108, a modem 109, an I/O (Input/Output) control unit 110, a power-source control unit 111, a main power source 112, and the like.

The battery 101 is a power source different from the main power source 112, and always supplies electricity to the non-volatile RAM 103, the RTC 104, the call-time control unit 105, the NCU 108 and the power-source control unit 111. The battery 101 may be a rechargeable battery. Alternatively, a sub power source or a high-capacity condenser can be substituted for the battery 101.

The CPU 102 is a central processing unit that controls the entire data communication device 7 collectively. In detail, the CPU 102 controls a plurality of the image-forming devices 1 through 5, and transmission/reception of an instruction signal to the central management device 6 via the communication line 8, by following a control program stored in the ROM 106. Additionally, the CPU 102 calls out the central management device 6 via the communication line 8 based on various report data received from the image-forming devices 1 through 5, by following the control program. This CPU 102 functions as data writing means and the power-supply part setting means.

The non-volatile RAM 103 is a readable and writable memory (data storing means) defined as a work memory used by the CPU 102 when processing data or a data memory storing later-described various data. This non-volatile RAM 103 is always supplied with the electricity from the battery 101, and, thus, can store data even if the main power source 112 is turned off. The non-volatile RAM 103 may be a memory, which does not need power supply from the battery 101.

The non-volatile RAM 103 stores transmission data transmitted from one of the central management device 6 and the plurality of the image-forming devices 1 through 5 to the other, a device code (a distinguishing number) and an ID code specifying one of the plurality of the image-forming devices 1 through 5, a data-transmission time (a year, a month, a date, an hour and a minute), a data acquisition time (a year, a month, a date, an hour and a minute), a telephone number of the central management device 6, the number of recalls or retries in a case in which line connection is not successful, transmission process information (parameters) such as a recall interval, and a job number of the transmission process information.

The RTC 104 functions as the time generating means, and generates a current time (a year, a month, a date, an hour and a minute). This RTC 104 is always supplied with the electricity from the battery 101, and, thus, can generate the accurate current time even if the main power source 112 is turned off. The call-time control unit 105 functions as data-transmission request generating means and data-acquisition request generating means with the RTC 104, and includes a transmission-time setting register, an acquisition-time setting register and a time comparing unit. The transmission-time setting register sets a data-transmission time to transmit data related to the image-forming devices 1 through 5 to the central management device 6. The acquisition-time setting register sets a data-acquisition time to acquire data from the image-forming devices 1 through 5.

The time comparing unit of the call-time control unit 105 compares the current time generated by the RTC 104 with the data-transmission time preset in the transmission-time setting register. If the current time matches with the data-transmission time, or if the current time passes the data-transmission time, the time comparing unit generates a data-transmission request that requests for data transmission to the central management device 6. In such a case, the time comparing unit also outputs a main-power-source turning-on signal (a startup signal) to the power-source control unit 111 as well as outputs a data-transmission requesting signal to the CPU 102.

Additionally, the time comparing unit compares the current time generated by the RTC 104 with the data-acquisition time preset in the acquisition-time setting register. If the current time matches with the data-acquisition time, or if the current time passes the data-acquisition time, the time comparing unit generates a data-acquisition request requested from the image-forming devices 1 through 5. In such a case, the time comparing unit also outputs the main-power-source turning-on signal (the startup signal) to the power-source control unit 111 as well as outputs an acquisition-request signal to the CPU 102.

The ROM 106 is a read only memory that stores various fixed data including the control program used by the CPU 102. The serial communication control unit 107 exchanges a signal with the image-forming devices 1 through 5. The NCU 108 includes a line control unit 115, an IT detecting unit 116, a hook-detecting unit 117 and a ringer-detecting unit 118. Each unit included in the NCU 108 functions as data-transmission-requesting-signal transmitting means, data transmission means and data reception means, with the CPU 102, the modem 109 and the like. The data reception means is means for receiving various signals and data including a call signal.

The line control unit 115 controls a call to the central management device 6, and a switching operation to connect the communication line 8 to a side of the image-forming devices 1 through 5, or a side of a general telephone device (TEL) or a facsimile device (FAX). The IT detecting unit 116 detects an IT signal transmitted from the central management device 6 through the communication line 8. This IT signal is, for example, a DTMF signal, which is a combination of codes "*#0#". The hook-detecting unit 117 detects a hook. The ringer-detecting unit 118 detects a ringer signal (a ringing signal) transmitted from a switching system inside the communication line 8 according to a call out made by the central management device 6 or an external device such as an external facsimile device.

The modem 109 modulates data to be transmitted, and demodulates received data. In detail, the modem 109 carries out digital/analog conversion of data to be transmitted to an external device through the communication line 8, and analog/digital conversion of data received from an external device through the communication line 8. The I/O control unit 110 controls input of a signal to each unit, and output of a signal from each unit, in the data communication device 7.

The power-source control unit 111 functions as call-origin detecting means, data-type detecting means and power-supply control means, with the CPU 102, the NCU 108 and the like. In detail, the power-source control unit 111 keeps the main power source 112 turned on if the data communication device 7 is in the normal operation mode. On the other hand, the power-source control unit 111 keeps the main power source 112 turned off of the data communication device 7 is in the energy-saving mode.

Additionally, the power-source control unit 111 turns the main power source 112 on if the data-transmission request or the data-acquisition request is generated. Further, the power-source control unit 111 turns the main power source 112 on, if receiving the ringer signal from the communication line 8, or the startup signal used for starting up the data communication device 7 from one of the image-forming devices 1 though 5. After finishing a process corresponding to a generated or received signal, the power-source control unit 111 turns the main power source 112 off. A detailed description about the power-source control unit 111 will be given later.

A description will now be given of summarized functions of the image-forming-device management system according to the second embodiment. This image-forming-device management system according to the second embodiment also has three main functions similar to that of the first embodiment, which are communication control (1) from the central management device 6 to the image-forming devices 1 though 5, communication control (2) from the image-forming devices 1 through 5 to the central management device 6 or the data communication device 7, and control (3) of the data communication device 7 itself.

Text data transferred between the central management device 6 and the data communication device 7, text data transferred between the data communication device 7 and the personal interface 18 of the image-forming devices 1 through 5 and text data transferred between the personal interface 18 of the image-forming devices 1 through 5 and the PPC controller 31 shown in FIG. 21 are the same as the text data described with reference to FIGS. 10, 11 and 12, respectively.

The communication control (1) from the central management device 6 to the image-forming devices 1 though 5 includes the above-described communication controls A1, A2 and A3. The data communication device 7 performs the communication control (1) by receiving an instruction signal, that is, either the data-transmission requesting signal requesting for data transmission or the data-write requesting signal requesting for writing data, from the central management device 6, and carrying out the selecting operation to the image-forming devices 1 through 5.

Figure 23:
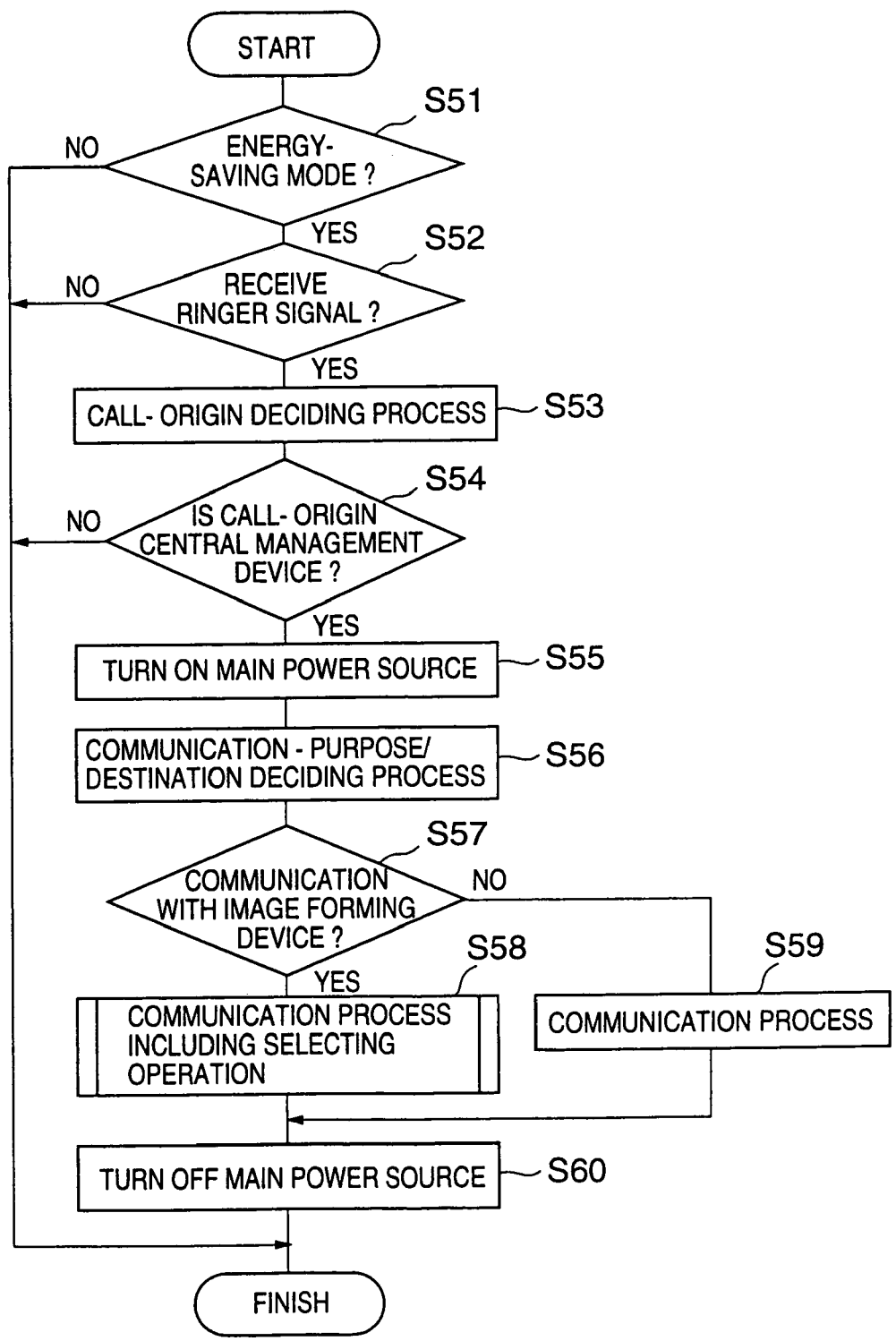
FIG. 23 is a flowchart showing a control process including power-supply control when the data communication device shown in FIG. 22 receives a ringer signal.

A description will now be given of a control when receiving the ringing signal or the ringer signal at the data communication device 7, with reference to FIG. 23. FIG. 23 is a flowchart showing a control process including power-supply control when the data communication device 7 receives the ringer signal.

If the ringing signal or the ringer signal is transmitted according to a call out made by an external device from the communication line 8 to the data communication device 7, the ringer-detecting unit 118 of the NCU 108 shown in FIG. 22 detects the ringer signal, and outputs a signal indicating reception of the ringer signal to the power-source control unit 111. Additionally, when an external telephone device (TEL) or a facsimile device (FAX) detects the ringer signal, and closes a line, the central management device 6 transmits the IT signal to the data communication device 7 if the central management device 6 is the call origin. In this case, the IT detecting unit 116 detects the IT signal, and outputs a signal that indicates the detection of the IT signal to the power-source control unit 111.

At a step S51 shown in FIG. 23, the power-source control unit 111 decides whether the data communication device 7 is in the normal operation mode or the energy-saving mode, in which the main power source 112 is tuned off. An operation mode of the data communication device 7 can be set to the normal operation mode or the energy-saving mode, by operating a switch not shown in the figures. If the operation mode of the data communication device 7 is the normal operation mode, the data communication device 7 interrupts the processes shown in FIG. 23, and carries out another regular process, which is a later-described process that is carried out in the energy-saving mode, and excludes the power-supply control.

On the other hand, if the operation mode of the data communication device 7 is the energy-saving mode, the ringer-detecting unit 118 detects whether the ringer signal is received by the data communication device 7, at a step S52. If the ringer-detecting unit 118 detects the ringer signal supplied from the communication line 8, the power-source control unit 111 proceeds to a step S53, and decides whether the call origin is the central management device 6. In a case in which the IT detecting unit 116 detects the IT signal continuously after the detection of the ringer signal by the ringer-detecting unit 118, the power-source control unit 111 decides that the call origin is the central management device 6, at a step S54. Subsequently, the power-source control unit 111 turns on the main power source 112 at a step S55, and supplies electricity to units related to communication including the CPU 102 and the modem 109 functioning as the data transmission means. Consequently, the CPU 102 starts up.

The CPU 102 carries out an initialization process not shown in the figures after receiving the electricity from the main power source 112 in the energy-saving mode. In a case in which the CPU 102 receives text data having the format shown in FIG. 11 and composing the instruction signal transmitted continuously after the IT signal from the central management device 6, by using the NCU 108 and the modem 109, the CPU 102 decides a destination of data and a type of the data from the instruction signal or the text data, at a step S56. It should be noted that the instruction signal supplied from the central management device 6 is either the data-transmission requesting signal or the data-write requesting signal.

The above-described destination indicates a destination of the instruction signal. For example, the data communication device 7 and an image-forming device are defined as a destination "2" and a destination "3", respectively. A field of the distinguishing code of the text data shown in FIG. 11 holds a code indicating a source or a call origin of the text data. For example, the central management device 6 is defined as a source "1". The type of data indicates a type of data that is to be transmitted to the central management device 6, or data that is to be written to the destination.

In a case in which the CPU 102 recognizes that a process requested by the central management device 6 is communication between the data communication device 7 and the central management device 6 based on a result of deciding the destination of the data and the type of the data at the step S56, the CPU 102 communicates with the central management device 6.

In detail, in a case in which the CPU 102 recognizes that the process requested by the central management device 6 is transmission of data stored in the data communication device 7 to the central management device 6 according to the instruction signal as the data-transmission requesting signal, the CPU 102 transmits data stored in the non-volatile RAM 103 such as data related to the image-forming devices 1 through 5, to the central management device 6 by using the NCU 108 and the modem 109. If the CPU 102 can recognize the type of the data that is to be transmitted to the central management device 6 from the result of deciding the destination and the type of the data, the CPU 102 transmits only data that corresponds to the recognized type, to the central management device 6 by using the NCU 108 and the modem 109.

On the other hand, in a case in which the CPU 102 recognizes that the process requested by the central management device 6 is a data-write process to the data communication device 7 according to the instruction signal as the data-write requesting signal, the CPU 102 writes data such as a parameter stored in a field of the information record inside the instruction signal or the text data received from the central management device 6, in the non-volatile RAM 103.

Additionally, the CPU 102 of the data communication device 7 carries out a communication process including a later-described selecting operation, at a step S58, in a case in which the CPU 102 decides at a step S57 that the process requested by the central management device 6 is transmission of data related an image-forming device as the destination of data among the plurality of the image-forming devices 1 though 5 to the central management device 6, or a data-write process to the image-forming device as the destination of the data. In such a case, the CPU 102 outputs a specific code (a combination of codes) that indicates a predetermined selecting function composing a selecting signal (SA), and a device code of the image-forming device to be selected, to the serial communication interface RS-485by using the serial communication control unit 107.

At each image-forming device 1 through 5, the CPU 21 of the personal interface 18 carries out various processes such as a process to turn on the main power source 61 if the main power source 61 is off., when receiving the selecting signal from the data communication device 7. A description about the processes carried out by the CPU 21 will be described later.

The CPU 102 of the data communication device 7 turns off the main power source 112 by outputting the main-power-source turning-off signal to the power-source control unit 111 to stop supplying electricity to the units related to communication including the CPU 102 and the modem 109, after finishing the communication with the central management device 6, at a step S60. If the data communication device 7 is in the energy-saving mode, and the IT detecting unit 116 cannot detect the IT signal in a predetermined period, that is, four to twenty seconds after the detection of the ringer signal by the ringer-detecting unit 118 or the detection of the hook by the hook-detecting unit 117, the CPU 102 of the data communication device 7 decides that the call origin is not the central management device 6, and finishes the processes shown in FIG. 23 with the main power source 112 turned off.

Figure 24A:
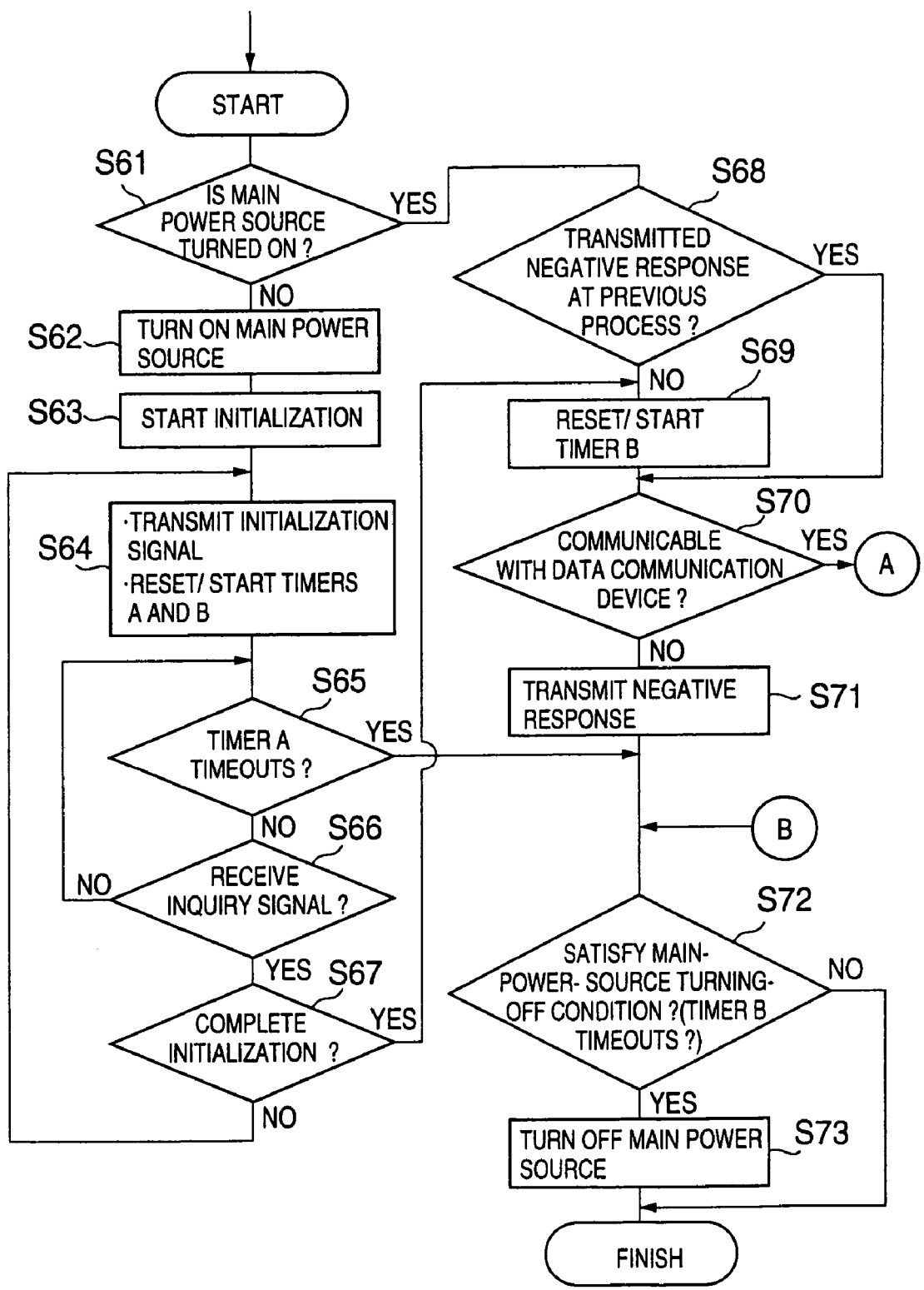
FIGS. 24A and 24B are flowcharts showing a process carried out by a CPU of the personal interface shown in FIG. 21 during a selecting operation.
Figure 24B:
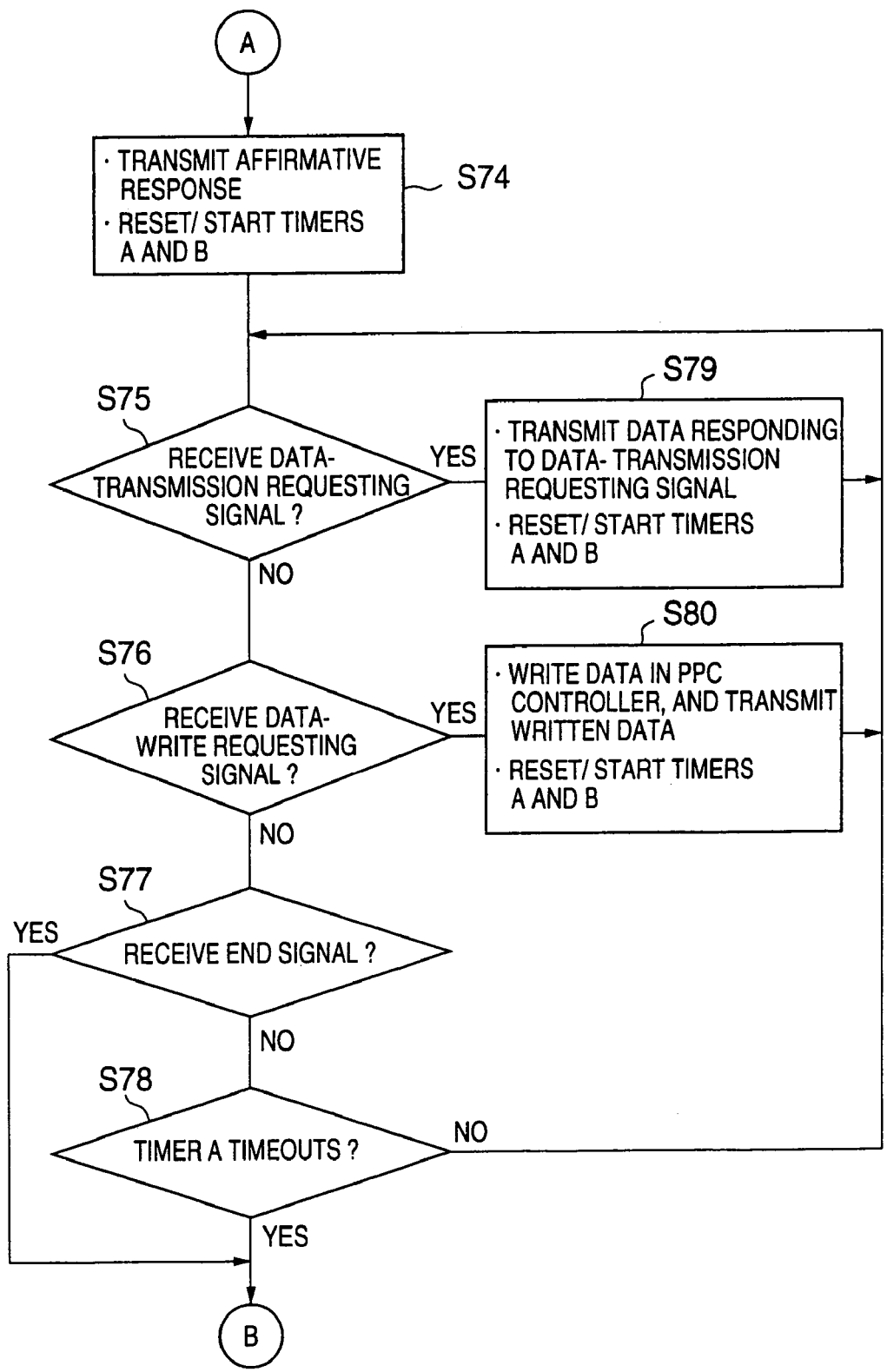

FIGS. 24A and 24B are flowcharts showing a process carried out by the CPU 21 of the personal interface 18 included in each image-forming device 1 through 5 during the selecting operation. In addition, FIG. 25 is a diagram showing a communication sequence between the personal interface 18 of one of the image-forming devices 1 through 5 and the data communication device 7. The personal interface 18 included in each image-forming device 1 through 5 is activated by the power supply from the sub power source 62, as described above. The CPU 21 of the personal interface 18 can decide whether the main power source 61 is turned on or off, according to a condition signal inputted by the main power source 61, the condition signal indicating whether the main power source 61 is turned on or off.

When the data communication device 7 receives the ringer signal corresponding to a call out made by the central management device 6 from the communication line 8, the data communication device 7 transmits the selecting signal used for calling an image-forming device, to the image-forming device. This selecting signal is composed of a specific code (a combination of codes) indicating a selecting function, and a device code of the image-forming device to be selected.

The CPU 21 of the personal interface 18 included in the image-forming device receives the specific code and the device code, by using the serial communication control unit 28 shown in FIG. 21, and compares the received device code with a device code of its own image-forming device by using the specific code indicating the selecting function. If the received device code matches with the device code of the image-forming device, the CPU 21 recognizes that the image-forming device is selected by the data communication device 7, and starts the process (a sub-routine) shown in FIG. 24A and 24B according to a call from a main routine.

The CPU 21 initially decides whether the main power source 61 is turned on, at a step S61. If it is determined at the step S61 that the main power source 61 is turned on, the CPU 21 proceeds to a step S68, and decides whether the CPU 21 has transmitted a negative response or a busy signal to the data communication device 7 at the previous process. If the CPU 21 did not transmit the negative response at the previous process, the CPU 21 resets a later-described timer B by initializing a time measured by the timer B, and starts measuring a time by use of the timer B, at a step S69. Subsequently, the CPU 21 proceeds to a step S70.

On the other hand, if the CPU 21 has transmitted the negative response to the data communication device 7 at the previous process, the CPU 21 skips the step S69, and proceeds to the step S70, in order to use the timer B that was reset and started during the previous process.

If it is determined at the step S61 that the main power source 61 is turned off, the CPU 21 proceeds to a step S62, and turns on the main power source 61 by using the main-power-source control signal, thereby supplying electricity to the PPC controller 31 including the CPU 11, which is a unit related to communication. Subsequently, at a step S63, the CPU 21 transmits a signal instructing initialization of the PPC controller 31, to the CPU 11 included in the PPC controller 31, thereby making the CPU 11 start initializing the PPC controller 31.

At this moment, internal information of the PPC controller 31 is not established, and, thus, the image-forming device cannot communicate with the data communication device 7. Accordingly, at a step S64, the CPU 21 of the personal interface 18 transmits a signal (an initialization signal) indicating that the PPC controller 31 is being initialized or a signal indicating a condition in which the image-forming device is unable to receive data, to the data communication device 7, as well as resets and starts timers A and B.

The timer A is used for carrying out a communication-failure process, for instance, to notify a user about a communication failure by displaying information about the communication failure on the text-display unit 83 of the operation display unit shown in FIG. 5, in a case in which the communication failure occurs between the image-forming device and the data communication device 7. Accordingly, a fixed timeout period "Ta" is set longer than a period necessary for completing the communication between the image-forming device and the data communication device 7. The timer A is reset, and starts measuring time after the above-described communication starts. When the time measured by the timer A passes the timeout period Ta, the timer A timeouts.

The timer B is used for turning off the main power source 61 to save energy, in a case in which the image-forming device is unused for a fixed period, for instance, an hour. Accordingly, the above-described fixed time is set as a timeout period "Tb" of the timer B, in advance. The timer B is reset, and starts measuring time according to an instruction signal from the CPU 11 after the image-forming device starts being unused. When the time measured by the timer B passes the timeout period Tb, the timer B timeouts according to the instruction signal from the CPU 11.

Additionally, the timer B is reset, and starts measuring the time according to the instruction signal from the CPU 11, when the image-forming device starts an image forming operation, or when the image-forming device shifts to a specific operation mode. The timer B repeats being reset and starting measuring the time at a fixed timing, so that the time measured by the timer B does not pass the timeout period Tb while the image-forming device is carrying out the image forming operation or is in the specific operation mode. In other words, the timer B prevents the main power source 61 from being turned off, while the image-forming device is carrying out the image forming operation or is in the specific operation mode. The timeout period Tb is set larger than the timeout period Ta.

After executing the step S64, the CPU 21 of the personal interface 18 decides whether the time measured by the timer A passes the timeout period Ta, at a step S65. If it is determined at the step S65 that the time measured by the timer A passes the timeout period Ta, or the timer A timeouts, the CPU 21 proceeds to a step S72. In other words, if the timer A timeouts before completion of the initialization of the PPC controller 31, the CPU 21 proceeds to the step S72. On the other hand, if it is determined at the step S65 that the time measured by the timer A does not pass the timeout period Ta, or the timer A does not timeout, the CPU 21 proceeds to a step S66, and decides whether the image-forming device receives an inquiry signal from the data communication device 7.

If it is determined at the step S66 that the image-forming device does not receive the inquiry signal from the data communication device 7, the CPU 21 shifts back to the step S65. On the other hand, if it is determined at the step S66 that the image-forming device receives the inquiry signal from the data communication device 7, the CPU 21 proceeds to a step S67, and decides whether the CPU 11 completes the initialization of the PPC controller 31.

If the image-forming device receives the inquiry signal from the data communication device 7, and the CPU 11 completes the initialization of the PPC controller 31 before the timer A timeouts, the CPU 21 proceeds to the step S69. If it is determined at the step S67 that the CPU 11 does not complete the initialization of the PPC controller 31, the CPU 21 shits back to the step S64.

Meanwhile, if the data communication device 7 receives the initialization signal from the image-forming device, that is, the destination of the selecting signal, by using the serial communication control unit 107, the CPU 102 of the data communication device 7 decides that the PPC controller 31 of the image-forming device is being initialized, and transmits the inquiry signal after two or three seconds passes. If the data communication device 7 receives the initialization signal from the image-forming device again, the data communication device 7 waits for another two or three minutes, and, then, transmits the inquiry signal to the image-forming device, as shown in FIG. 25.

The CPU 21 of the personal interface 18 inside the image-forming device proceeds to the step S69, if it is determined at the step S68 that the CPU 21 did not transmit the negative response at the previous process, or if it is determined at the step S67 that the initialization of the PPC controller 31 is completed. At the step S69, the CPU 21 resets and starts the timer B. Subsequently, at the step S70, the CPU 21 decides whether the image-forming device can communicate with the data communication device 7.

For example, if it is determined at the step S61 that the main power source 61 is turned on, the image-forming device may be in a specific operation mode, in which the image-forming device cannot communicate with the data communication device 7. Alternatively, a communication failure may be occurring between the image-forming device and the data communication device 7, or the image-forming device may have data to be outputted. In the above-described cases, the CPU 21 decides that the image-forming device cannot communicate with the data communication device 7, and proceeds to a step S71.

At the step S71, the transmits the negative response or the busy signal to the data communication device 7. Subsequently, at the step S72, the CPU 21 decides whether the image-forming device satisfies a fixed main-power-source turning-off condition that enables the CPU 21 to turn off the main power source 61. If the time measured by the timer B does not pass the timeout period Tb, or the timer B timeouts, at the step S72, the CPU 21 decides that the image-forming device does not satisfy the main-power-source turning-off condition, and returns to the main routine in order to shift to another subroutine. On the other hand, if the timer B timeouts, or the fixed period passes while the image-forming device is unused, the CPU 21 decides that the image-forming device satisfies the main-power-source turning-off condition, and proceeds to a step S73. At the step S73, the CPU 21 stops supplying the electricity to the PPC controller 31 by turning the main power source 61 off, and returns to the main routine.

Meanwhile, if the data communication device 7 receives the negative response from the image-forming device by using the serial communication control unit 107, the CPU 102 of the data communication device 7 decides that the image-forming device cannot communicate with the data communication device 7, and interrupts the selecting operation. Subsequently, the CPU 102 proceeds to a later-described polling operation, or the like.

If it is determined at the step S70 that the image-forming device can communicate with the data communication device 7, the CPU 21 of the personal interface 18 proceeds to a step S74, and transmits an affirmative response to the data communication device 7 by using the serial communication control unit 28. In addition, the CPU 21 resets and starts the timers A and B to prepare for the communication failure process.

If the data communication device 7 receives the affirmative response from the image-forming device by using the serial communication control unit 107, the CPU 102 transmits a requesting signal used for carrying out a process requested by the central management device 6, to the image-forming device by using the serial communication control unit 107. The requesting signal is either the data-transmission requesting signal or the data-write requesting signal. The data-transmission requesting signal requests transmission of data inside the PPC controller 31 such as counter information and log information, that are related to the image-forming device. The data-write requesting signal requests a data-write process to the image-forming device. A field of the information record inside the data-write requesting signal holds writing data, which includes adjusted values or parameters such as a voltage setting value of a high-voltage unit and a toner-density setting value.

After executing the step S74, the CPU 21 of the personal interface 18 decides whether the image-forming device receives the data-transmission requesting signal from the data communication device 7 by using the serial communication control unit 28, at a step S75. If it is determined at the step S75 that the image-forming device receives the data-transmission requesting signal from the data communication device 7, the CPU 21 proceeds to a step S79. At the step S79, the CPU 21 obtains data (text data) inside the PPC controller 31 of the image-forming device as data responding the data-transmission requesting signal, and transmits the data to the data communication device 7 by using the serial communication control unit 28. In addition, at the step S79, the CPU 21 resets and starts the timers A and B. The CPU 21, then, shifts back to the step S75.

Additionally, the CPU 21 controls supplying electricity from the main power source 61 to units that need the electricity for obtaining the data to be transmitted to the central management device 6 among data inside the PPC controller 31, or for writing (rewriting) data in, in the case in which the image-forming device receives an instruction signal, which is either the data-transmission requesting signal or the data-write requesting signal. Therefore, the CPU 21 needs to set the units that need the electricity, in advance, or when receiving the instruction signal from the data communication device 7. A description about a process to set the units that need the electricity will be given later.

If the data communication device 7 receives the data inside the PPC controller 31 in response to the data-transmission requesting signal, from the image-forming device by using the serial communication control unit 107, the CPU 102 of the data communication device 7 transmits the data to the central management device 6 by using the NCU 108 and the modem 109.

If the image-forming device does not receive the data-transmission requesting signal from the data communication device 7 at the step S75, the CPU 21 proceeds to a step S76, and decides whether the image-forming device receives the data-write requesting signal from the data communication device 7 by using the serial communication control unit 28. If it is determined at the step S76 that the image-forming device receives the data-write requesting signal from the data communication device 7, the CPU 21 proceeds to a step S80. At the step S80, the CPU 21 instructs the CPU 11 to write or set the writing data stored in the field of the information record of the data-write requesting signal (the text data) to the PPC controller 31. Subsequently, the CPU 21 transmits set data, that is, a value obtained by carrying out a fixed measuring process to the writing data written in the PPC controller 31, to the data communication device 7 by using the serial communication control unit 28. Additionally, the CPU 21 resets and starts the timers A and B. The CPU 21, then, shifts back to the step S75.

On the other hand, the CPU 102 of the data communication device 7 compares the writing data transmitted to the image-forming device by including the writing data in the data-write requesting signal, with the set data transmitted from the image-forming device in response to the writing data, thereby deciding whether the writing data is correctly written in the PPC controller 31 of the image-forming device. In addition, the CPU 102 transmits an end signal to the image-forming device after completing the transmission of the data-transmission requesting signal or the data-write requesting signal.

If the image-forming device does not receive the data-write requesting signal from the data communication device 7 at the step S76, the CPU 21 of the personal interface 18 decides whether the image-forming device receives the end signal from the data communication device 7 by using the serial communication control unit 28, at a step S77. In other words, the CPU 21 decides whether the communication between the image-forming device and the data communication device 7 has ended. At a step S78, the CPU 21 decides whether the timer A timeouts, or the time measured by the timer A passes the timeout period Ta.

The CPU 21 repeats the step S75, S76, S79 or S80 until the image-forming device receives the end signal from the data communication device 7 before the timer A timeouts. If the image-forming device receives the end signal from the data communication device 7 before the timer A timeouts, the CPU 21 proceeds to the step S72. Additionally, if the timer A timeouts before the image-forming device receives the end signal from the data communication device 7, the CPU 21 also proceeds to the step S72.

At the step S72, the CPU 21 decides whether the image-forming device satisfies the main-power-source turning-off condition, as described above. However, if the CPU 21 shifts to the step S72 from the step S65, S77 or S78, the CPU 21 returns to the main routine, and shift to another subroutine, since the timer B does not timeout at the step S72.

In a case in which the CPU 21 shifts to another subroutine while the main power source 61 is turned on, the CPU 21 turns off the main power source 61, thereby stopping the power supply to all the units including the PPC controller 31, when the main switch is turned off, or the timer B timeouts, or the fixed period passes while the image-forming device is unused. Additionally, in a case in which the timer A timeouts, the CPU 21 decides that the communication failure occurs between the image-forming device and the data communication device 7, and carries out the communication failure process, for instance, to notify a user about the communication failure by displaying the information about the communication failure on the text-display unit 83 of the operation display unit.

As describe above, the data communication device 7 used in the image-forming-device management system according to the second embodiment includes the non-volatile RAM 103, the RTC 104, the call-time control unit 105, the NCU 108 and the power-source control unit 111, which are always supplied with the electricity from the battery 101. In the energy-saving mode, the power-source control unit 111 decides whether the call origin is the central management device 6 according to a result of detecting the IT signal by the IT detecting unit 116, in the case in which the ringer-detecting unit 118 inside the NCU 108 detects the ringer signal transmitted by the call out of the external device from the communication line 8.

If it is determined that the call origin is the central management device 6, the electricity is supplied to the units including the CPU 102 related to communication, by turning on the main power source 112 of the data communication device 7.

Accordingly, the CPU 102 receives the instruction signal (the text data) transmitted continuously after the IT signal, by use of the NCU 108 and the modem 109, and, then, communicates between the data communication device 7 and the central management device 6. For example, the CPU 102 transmits the data, which is related to the image-forming devices 1 through 5, and is stored in the non-volatile RAM 103, to the central management device 6 by using the NCU 108 and the modem 109. When the CPU 102 finishes the communication between the data communication device 7 and the central management device 6, the power-source control unit 111 turns off the main power source 112.

Consequently, the data communication device 7 can reduce unnecessary electricity consumption as well as can communicate with the central management device 6 at any time.

If the data communication device 7 turns on the main power source 112 according to only the ringer signal, the data communication device 7 wastes electricity by turning on the main power source 112 every time the data communication device 7 receives a telephone call or carries out facsimile communication, which are unrelated to communication between the data communication device 7 and the central management device 6. On the other hand, according to the present invention, the data communication device 7 turns on the main power source 112 according to only a signal from the central management device 6, by detecting both the ringer signal and the IT signal. Thus, usage efficiency of electricity is improved at the data communication device 7.

Additionally, the CPU 102 of the data communication device 7 decides whether a process requested by the central management device 6 is transmission of data related to an image-forming device to the central management device 6, according to the instruction signal (the distinguishing code of the text data) received continuously after the ringer signal and the IT signal. If the process requested by the central management device 6 is the transmission of the data related to the image-forming device, the data communication device 7 transmits the selecting signal, which composes either the data-transmission requesting signal or the data-write requesting signal, to the image-forming device, by using the serial communication control unit 107. As a result, the CPU 21 of the personal interface 18 included in the image-forming device supplies electricity to the PPC controller 31 by turning on the main power source 61 if the main power source 61 is turned off.

Accordingly, the image-forming devices 1 through 5 can reduce unnecessary electricity consumption, as well as can communicate with the data communication device 7 or the central management device 6 at any time.

Furthermore, if the power-source control unit 111 of the data communication device 7 detects that the call origin is a device other than the central management device 6, a call by use of a telephone device or communication by use of a facsimile device are performed. Consequently, the data communication device 7 can keep the main power source 112 off, and, thus, can avoid unnecessary electricity consumption.

A description will now be given of the communication control (2) from the image-forming devices 1 through 5 to the central management device 6 or the data communication device 7, where the communication control (2) is one of the three main functions of the image-forming-device management system according to the second embodiment.

The communication control (2) of the image-forming-device management system includes the following five controls F1 through F5, for example.

(F1) In a case in which a failure occurs so that each image-forming device 1 through 5 cannot carry out an image forming operation, the CPU 11 of the image-forming device transmits data indicating the failure by using the personal interface 18 immediately to the data communication device 7, where the data communication device 7 transmits the data indicating the failure (an emergency report) to the central management device 6 through the communication line 8.

(F2) The CPU 11 of each image-forming device 1 through 5 shifts from an image forming mode to a user-request input mode used by a user to input a necessary request such as a repair request or an equipment-supply request, in response to a key operation carried out by the user on the operation display unit. The CPU 11, then, displays a user-request input screen on the text-display unit 83 of the operation display unit. When the necessary request is inputted, by the user pressing down a fixed key on the screen, the CPU 11 transmits data indicating the necessary request by using the personal interface 18 immediately to the data communication device 7, where the data communication device 7 transmits the data (an emergency report) to the central management device 6 through the communication line 8.

(F3) The CPU 11 of each image-forming device 1 through 5 transmits data indicating a total number of forming images or an order of copy paper (emergency-call data) immediately to the data communication device 7 by using the personal interface 18 every time the total number of forming images reaches a predetermined number (a reporting-level value), where the data communication device 7 transmits the data (an emergency report) to the central management device 6 through the communication line 8.

(F4) The CPU 11 of each image-forming device 1 through 5 transmits data indicating the total number of forming images to the data communication device 7 by using the personal interface 18 for every predetermined period. AT a preset data-transmission time on a specific day, the CPU 102 of the data communication device 7 transmits the data received from the image-forming device before the data-transmission time together as a non-emergency report, by using the NCU 108 and the modem 109, to the central management device 6 through the communication line 8. This communication control includes control to transmit the data to the central management device 6 without waiting for the data-transmission time, in a case in which the number of transmitting the data reaches a predetermined number before the data-transmission time. It should be noted that the data-transmission time is set by the central management device 6, and is stored in the non-volatile RAM 103 inside the data communication device 7.

(F5) The CPU 11 of each image-forming device 1 through 5 transmits data indicating that preventive maintenance is necessary, to the data communication device 7 by using the personal interface 18, in a case in which the image-forming operation can be started, but an event that needs preventive maintenance occurs. This event is, for instance, an event in which the number or the period which exchangeable parts are used for becomes closer to a predetermined number of times or a predetermined period, or an event in which a sensor reaches a standard level.

At a preset data-transmission time on a specific day, the CPU 102 of the data communication device 7 transmits the data (a non-emergency report) received from the image-forming device before the data-transmission time together, by using the NCU 108 and the modem 109, to the central management device 6 through the communication line 8. This communication control includes control to transmit the data to the central management device 6 without waiting for the data-transmission time, in a case in which the number of transmitting the data received from image-forming device reaches a predetermined number. It should be noted that the data-transmission time is set by the central management device 6, and is stored in the non-volatile RAM 103 inside the data communication device 7.

The above-described communication controls (F1 through F5) are performed when the data communication device 7 carries out the polling operation. Hence, a description will now be given of processes carried out by the data communication device 7 and the image-forming devices 1 through 5 used in the image-forming-device management system according to the second embodiment, during the polling operation, with reference to FIG. 10.

The CPU 102 of the data communication device 7 outputs a predetermined specific code (a combination of codes) indicating a polling function, and a device code of an image-forming device that is to be selected, to the serial communication interface RS-485 by using the serial communication control unit 107, in the normal operation mode. The specific code and the device code compose a polling signal (PA) together.

The CPU 11 of each image-forming device 1 through 5 compares the device code that follows the specific code indicating the polling function, with a device code of its own image-forming device, by using the specific code, if receiving the polling signal from the data communication device 7 by use of the personal interface 18. If the device code of the image-forming device matches with the device code that is included in the polling signal supplied from data communication device 7, the image-forming device recognizes that the image-forming device is polled by the data communication device 7.

Subsequently, the CPU 11 of an image-forming device polled by the data communication device 7 starts communication with the data communication device 7, or transmission of data related to the image-forming device, if the image-forming device has output data or receives a data-transmission request requesting transmission of data to the data communication device 7 or the central management device 6. On the other hand, if the image-forming device does not have the output data, or the previously-started communication has ended, the CPU 11 of the image-forming device transmits an end response indicated by a predetermined specific code (a combination of codes) to the data communication device 7 by using the personal interface 18, and, then, terminates the communication between the image-forming device and the data communication device 7.

If the data communication device 7 receives the end response from the image-forming device by using the serial communication control unit 107, the CPU 102 of the data communication device 7 shifts to the polling operation performed to the next image-forming device.

In addition, in a case in which an image-forming device corresponding to the device code outputted by the data communication device 7 cannot output the end response, the CPU 102 of the data communication device 7 finishes the polling operation after a predetermined period passes. This polling operation is repeated sequentially by the data communication device 7 to each image-forming device 1 through 5 connected to the data communication device 7 in the normal operation mode unless the selecting operation is performed by the data communication device 7.

The CPU 21 of the personal interface 18 included in each image-forming device 1 through 5 can supply the electricity to the PPC controller 31 by turning the main power source 61 on, in a case in which the image-forming device receives the polling signal from the data communication device 7 as well as the device code of the received polling signal and the device code of the image-forming device are the same. The CPU 21 can stop supplying the electricity to the PPC controller 31 by turning off the main power source 61 automatically after completion of the communication between the image-forming device and the data communication device 7.

The CPU 21 can turn off the main power source automatically, when the image-forming device satisfies the main-power-source turning-off condition. The image-forming device satisfies the main-power-source turning-off condition, if a fixed period passes after the completion of the communication between the image-forming device and the data communication device 7, or if a fixed period passes while the image-forming device is unused.

Additionally, until the initialization of the PPC controller 31 ends after the main power source 61 is turned on, the CPU 21 can transmit the initialization signal indicating that the PPC controller 31 is being initialized, or the signal indicating that the image-forming device cannot receive data, to the data communication device 7 in response to the inquiry signal received from the data communication device 7.

According to the processes performed by the image-forming devices 1 though 5 during the polling operation, the image-forming device 1 through 5 can reduce unnecessary electricity consumption.

A description will now be given of the control (3) of the data communication device 7 itself, which is one of the three main functions of the image-forming-device management system according to the second embodiment. This control (3) includes the following controls G1 and G2.

(G1) The control GI is to read data related to an image-forming device such as a total counter value.

(G2) The control G2 is to return a result of communication from the image-forming devices 1 through 5 to the data communication device 7 according to the communication control (2).

The data communication device 7 controls reading the data related to the image-forming device such as the total counter value, by carrying out the selecting operation when a data-acquisition request from the image-forming device is generated. The data-acquisition request from the image-forming device is assumed to be generated at a predetermined data acquisition time, for example, at 0:00 AM once a day.

The data communication device 7 has two memories for a total counter of each image-forming device connected to the data communication device 7, which are named a memory A and a memory B. The CPU 102 writes the total counter value read by the selecting operation once a day as described above, in the memory A. In other words, the call-time control unit 105 generates the data-acquisition request to be requested from the image-forming device, at a predetermined data-acquisition time once a day. Subsequently, the call-time control unit 105 supplies a data-acquisition requesting signal to the CPU 102.

Accordingly, the CPU 102 transmits the selecting signal and the data-transmission requesting signal sequentially to the image-forming devices 1 through 5 by use of the serial communication control unit 107. If the data communication device 7 receives the total counter value (the text data) from one of the image-forming devices 1 through 5 in response to the selecting signal and the data-transmission requesting signal, the CPU 102 of the data communication device 7 writes the total counter value in the memory A. Thus, every day, the total counter value written in the memory A on the previous day is rewritten over by the total counter value of the present day.

It should be noted that the power-source control unit 111 needs to carry out later-described power-supply control if the data communication device 7 is in the energy-saving mode. In addition, the CPU 102 copies the total counter value stored in the memory A to the memory B on a date and time predetermined by the central management device 6 and stored in the non-volatile RAM 103 of the data communication device 7, once a month.

The data communication device 7 transmits contents of the memory B to the central management device 6 by following one of methods H1 and H2 described below.

(H1) The central management device 6 reads the total counter value stored in the memory B of the data communication device 7 after the date and time on which the contents of the memory A is copied to the memory B. In detail, the central management device 6 connects itself to the data communication device 7 by calling the data communication device 7, so that the central management device 6 can communicate with the data communication device 7. Subsequently, the central management device 6 accesses to the data communication device 7 by transmitting a corresponding data-transmission requesting signal to the data communication device 7, and obtains the contents (the total counter value of each image-forming device 1 through 5) of the memory B, which is transmitted from the data communication device 7.

(H2) The CPU 102 of the data communication device 7 calls spontaneously at a predetermined data-transmission time (a year, a month, a date, an hour and a minute), that is, after the above-described date and time on which the contents of the memory A is copied to the memory B and, then, transmits the total counter value stored in the memory B to the central management device 6 through the communication line 8 by using the NCU 108 and the modem 109. If the operation mode of the data communication device 7 is the energy-saving mode, the data communication device 7 needs to carry out the later-described power-supply control. The data-transmission time or a call time is set by the central management device 6, and is stored in the non-volatile RAM 103 of the data communication device 7.

It should be noted that the data communication device 7 includes a plurality of memories, each being composed of the memories A and B, in the non-volatile RAM 103 for each image-forming device connected to the data communication device 7, because various total counter values may be assigned for black/white copy, application copy and color copy, for instance.

Figure 26:
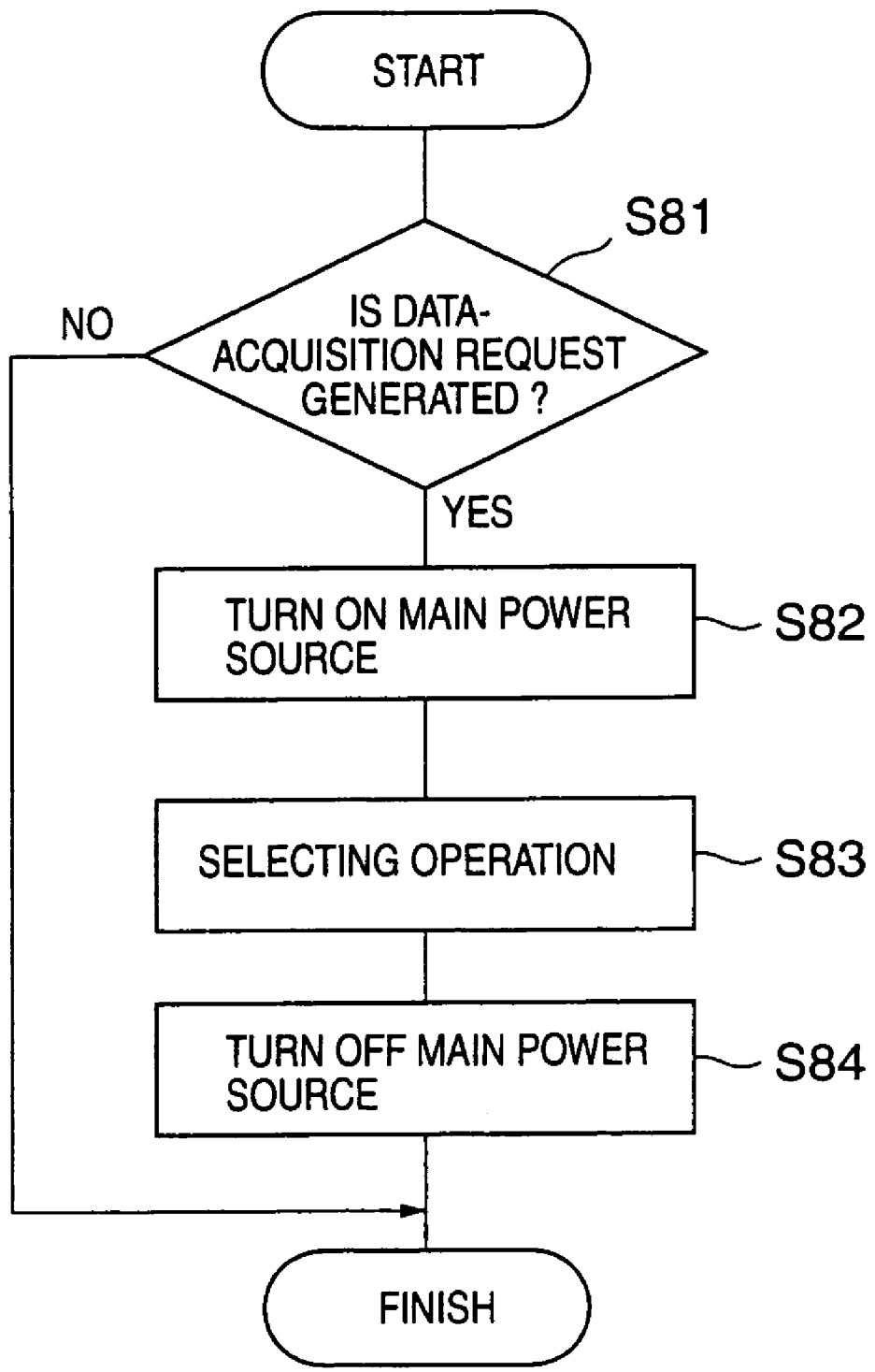
FIG. 26 is a flowchart showing a data acquisition process carried out by the data communication device shown in FIG. 22 in an energy-saving mode.

A description will now be given of a data acquisition process carried out by the data communication device 7 in the energy-saving mode, with reference to FIG. 26. FIG. 26 is a flowchart showing the data acquisition process carried out by the data communication device 7 in the energy-saving mode.

The CPU 102 of the data communication device 7 reads out a data acquisition time "Td" (a year, a month, a date, an hour and a minute) predetermined once a day, from the non-volatile RAM 103, when the main power source 112 is turned on for the first time after the data communication device 7 is installed. Subsequently, the CPU 102 sets the data-acquisition time to the call-time control unit 105.

The call-time control unit 105 of the data communication device 7 compares the data-acquisition time Td with a current time T generated by the RTC 104, if the data communication device 7 is in the energy-saving mode. If the current time T matches with the data-acquisition time Td, or if the current time T passes the data-acquisition time Td, the call-time control unit 105 outputs the main-power-source turning-on signal to the power-source control unit 111, and, then, outputs a data-acquisition requesting signal to the CPU 102, thereby generating a data-acquisition request used for acquiring data from an image-forming device, at a step S81 shown in FIG. 26.

After receiving the main-power-source turning-on signal from the call-time control unit 105, the power-source control unit 111 turns on the main power source 112 at a step S82, thereby supplying electricity to units related to communication, which are the CPU 102 and the serial communication control unit 107 together functioning as the data-transmission-requesting-signal transmitting means and the data writing means.

The CPU 102 carries out the selecting operation at a step S83, when receiving the data-acquisition requesting signal from the call-time control unit 105 after being supplied with electricity from the main power source 112. According to the selecting operation, the CPU 102 transmits the selecting signal and the data-transmission requesting signal (the text data) sequentially by using the serial communication control unit 107. In a case in which the data communication device 7 receives a total counter value from one of the image-forming devices 1 through 5 in response to the selecting signal and the data-transmission requesting signal, the CPU 102 writes the total counter value in the memory A of the non-volatile RAM 103.

After writing the total counter value in the memory A, the CPU 102 outputs the main-power-source turning-off signal to the power-source control unit 111. At a step S84, the power-source control unit 111 turns off the main power source 112 by receiving the main-power-source turning-off signal from the CPU 102, and stops supplying electricity to the units related to communication.

As described above, the data communication device 7 used in the image-forming-device management system according to the second embodiment includes the non-volatile RAM 103, the RTC 104, the call-time control unit 105, the NCU 108 and the power-source control unit 111, which are always supplied with the electricity from the battery 101. If the data communication device 7 is in the energy-saving mode, the call-time control unit 105 compares the current time generated by the RTC 104 with the predetermined data-acquisition time. If the current time matches with the data-acquisition time, or if the current time passes the data-acquisition time, the call-time control unit 105 generates the data-acquisition request. Accordingly, the power-source control unit 111 turns on the main power source 112, thereby supplying the electricity to the units including the CPU 102, which are related to communication.

The units related to communication obtain data from an image-forming device. Subsequently, the power-source control unit 111 turns off the main power source 112, thereby stopping the power supply to the unit related to communication. Therefore, the data communication device 7 can reduce unnecessary electricity consumption, as well as can obtain data from the image-forming devices 1 through 5 at any time.

A description will now be given of a data transmission process carried out by the data communication device 7 in the energy-saving mode, with reference to FIG. 17.

The CPU 102 of the data communication device 7 reads out a data transmission time "Tc" (a year, a month, a date, an hour and a minute) stored in the non-volatile RAM 103 when the main power source 112 is turned on for the first time after the data communication device 7 is installed, and sets the data transmission time Tc to the call-time control unit 105.

The call-time control unit 105 compares the current time T generated by the RTC 104 with the predetermined data transmission time Tc, if the data communication device 7 is in the energy-saving mode. If the current time T matches with the data transmission time Tc, or if the current time T passes the data transmission time Tc, the call-time control unit 105 outputs the main-power-source turning-on signal to the power-source control unit 111, and, then, outputs the data-transmission requesting signal to the CPU 102, thereby generating a data-transmission request that requests for transmitting data to the central management device 6.

The power-source control unit 111 turns on the main power source 112 if receiving the main-power-source turning-on signal from the call-time control unit 105, thereby supplying the electricity to the units including the CPU 102 and the modem 109, which are related to communication. In fact, the power-source control unit 111 turns on the main power source 112, and supplies the electricity from the main power source 112 to the entire data communication device 7.

The CPU 102 calls out the central management device 6 by using the NCU 108 after being supplied with the electricity from the main power source 112, and receiving the data-transmission requesting signal from the call-time control unit 105. Subsequently, the CPU 102 reads out data related to the image-forming devices 1 through 5 from the non-volatile RAM 103, and transmits the data to the central management device 6 by using the NCU 108 and the modem 109. After completing the transmission of the data to the central management device 6, the CPU 102 outputs the main-power-source turning-off signal to the power-source control unit 111, thereby turning off the main power source 112. Consequently, the main power source 112 stops supplying the electricity to the units including the CPU 102 and the modem 109, which are related to communication.

Alternatively, the call-time control unit 105 compares the current time T generated by the RTC 104 with the data-transmission time Tc, and decides whether the non-volatile RAM 103 stores the data related to the image-forming devices 1 through 5 if the current time T becomes equal to the data-transmission time Tc, or if the current time T passes the data-transmission time Tc. The call-time control unit 105 may generate the data-transmission request if the call-time control unit 105 decides that the non-volatile RAM 103 stores the data related to the image-forming devices 1 through 5.

Alternatively, the call-time control unit 105 decides whether the non-volatile RAM 103 stores the data related to the image-forming devices 1 through 5. If it is determined that the non-volatile RAM 103 stores the data related to the image-forming devices 1 through 5, the call-time control unit 105 compares the current time T generated by the RTC 104 with the data-transmission time Tc preset for the data. Accordingly, the call-time control unit 105 can generate the data-transmission request if the current time T matches with the data-transmission time Tc, or if the current time T passes the data-transmission time Tc.

Alternatively, the call-time control unit 105 decides whether the non-volatile RAM 103 stores the data related to the image-forming devices 1 through 5. If it is determined that the non-volatile RAM 103 stores the data related to the image-forming devices 1 through 5, the call-time control unit 105 sets the data-transmission time Tc for the data. Subsequently, the call-time control unit 105 compares the current time T generated by the RTC 104 with the data-transmission time Tc. Accordingly, the call-time control unit 105 can generate the data-transmission request if the current time T matches with the data-transmission time Tc, or if the current time T passes the data-transmission time Tc.

Alternatively, it is assumed that a data transmission time is set for each data item that is related to the image-forming devices 1 through 5, and is stored in the non-volatile RAM 103. For example, the data-transmission time Tc is given for the total counter value of each image-forming device 1 through 5. The call-time control unit 105 compares the data-transmission time Tc set for the total counter value of an image-forming device, with the current time T generated by the RTC 104. If the current time T matches with the data-transmission time Tc, or if the current time T passes the data-transmission time Tc, the call-time control unit 105 generates the data-transmission request that requests for transmission of data to the central management device 6.

Subsequently, the CPU 102 reads out the total counter value of the image-forming device from the non-volatile RAM 103, and transmits the total counter value to the central management device 6 by using the NCU 108 and the modem 109. The CPU 102 does not turn off the main power source 112 by using the power-source control unit 111 immediately after the transmission of the total counter value. Instead, the CPU 102 searches through the non-volatile RAM 103 for other data items that should also be transmitted to the central management device 6. If the non-volatile RAM 103 stores a data item that should be transmitted to the central management device 6, the CPU 102 reads out the data item from the non-volatile RAM 103, and transmits the data to the central management device 6 by using the NCU 108 and the modem 109, continuously after the transmission of the total counter value.

If the data communication device 7 has an occupied time, for instance, five to ten minutes, before the next data transmission to the central management device 6, the CPU 102 sets the next data-transmission time to the call-time control unit 105, and, then, outputs the main-power-source turning-off signal to the power-source control unit 111 to turn off the main power source 112. In addition, the CPU 102 preferably stores a transmission result as a transmission log in the non-volatile RAM 103, and, then, clears information about data transmission to the central management device 6, in a case in which the data transmission was successful.

Additionally, in a case in which the central management device 6 is busy when the data communication device 7 calls out the central management device 6, the data communication device 7 cannot transmit data to the central management device 6 because of a communication error. Thus, the data communication device 7 transmits the data afterwards by calling out the central management device 6 again. In detail, the data communication device 7 preferably calls out the central management device 6 after a re-call period passes. Alike the above-described example, the CPU of the data communication device 7 may set the next data-transmission time to the call-time control unit 105, and may call out the central management device 6 at the next data-transmission time.

As described above, the data communication device 7 used in the image-forming-device management system according to the second embodiment includes the non-volatile RAM 103, the RTC 104, the call-time control unit 105, the NCU 108 and the power-source control unit 111, which are always supplied with the electricity from the battery 101. In the energy-saving mode, the call-time control unit 105 compares the current time generated by the RTC 104 with the predetermined data-transmission time. If the current time matches with the data-transmission time, or if the current time passes the data-transmission time, the call-time control unit 105 generates the data-transmission request.

Accordingly, the power-source control unit 111 turns on the main power source 112, thereby supplying the electricity to the units including the CPU 102, which are related to communication. After the units related to communication complete data transmission to the central management device 6, the power-source control unit 111 turns off the main power source 112. Consequently, the data communication device 7 can reduce unnecessary electricity consumption as well as can carry out data transmission to the central management device 6 at any time.

A description will now be given of a power-supply control process and a power-supply part setting process carried out by the CPU 21 of the personal interface 18 included in each image-forming device 1 through 5, with reference to FIGS. 27 through 34. FIG. 27 is a block diagram showing a structure of units included in each image-forming device 1 through 5 and a power-supply circuit.

In a case in which each image-forming device 1 through 5 receives the instruction signal, that is, either the data-transmission requesting signal or the data-write requesting signal, from the data communication device 7, the CPU 21 of the personal interface 18 inside each image-forming device 1 though 5 carries out power-supply control to supply electricity from the main power source 61 to a part, which needs power supply for acquiring data to be transmitted to the central management device 6, or for writing or rewriting data. The CPU 21 needs to set a part that needs power supply in order to carry out the power-supply control.

Control to set the part that needs power supply includes the following controls I1 and I2.

(I1) The CPU 11 of each image-forming device 1 through 5 sets a part that needs power supply, in accordance with an operation signal outputted by a key operation from an operation display unit.

(I2) The CPU 11 sets a part that needs power supply, in accordance with a type of data that is added to an instruction signal transmitted from the data communication device 7 or the central management device 6, for example, a type of data that should be transmitted to the central management device 6.

A detailed description will initially given of the control I1. In the normal operation mode, the CPU 11 of each image-forming device 1 through 5 can set an SP mode, that is, a mode used by a service, by a key operation on the operation display unit. Additionally, the CPU 11 can display a power-supply mode setting screen on the text-display unit 83 of the operation display unit shown in FIG. 5, as shown in FIG. 28.

Every time an ON/OFF key corresponding to each unit displayed on the power-supply mode setting screen is pressed, the CPU 11 switches an ON/OFF display of the key. The CPU 11, then, sets a unit corresponding to a key displayed as "ON" to a part that needs power supply, and sets a unit corresponding to a key displayed as "OFF" to a part that does not need the power supply.

Accordingly, the CPU 21 of the personal interface 18 turns on the main power source 61, and supplies the electricity from the main power source 61 to units preset as parts that need power supply, in addition to the PPC controller 31 including the CPU 11, which is related to communication. On the other hand, the CPU 21 continues not supplying the electricity from the main power source 61 to units other than the PPC controller 31 and the units preset as the parts that need power supply.

FIG. 27 shows the main power source 61, the personal interface 18, the PPC controller 31, relays 151 through 154, switches 151a through 154a, an operation display unit 161, a fixing unit 162, an ADF 163 and a sorter 164. The relays 151 through 154 are included in the PPC controller 31 or attached to the PPC controller 31 from outside.

The relay 151 supplies the electricity from the main power source 61 to the operation display unit 161 by closing the switch 151a, when the relay 151 shifts to an operating state according to a drive signal supplied from the CPU 21. The relay 152 supplies the electricity from the main power source 61 to the fixing unit 162 by closing the switch 152a, when the relay 152 shifts to the operating state according to the drive signal supplied from the CPU 21. The relay 153 supplies the electricity from the main power source 61 to the ADF (a document transmission unit) 163 by closing the switch 153a, when the relay 153 shifts to the operating state according to the drive signal supplied from the CPU 21. Additionally, the relay 154 supplies the electricity from the main power source 61 to the sorter (a copy sheet after-processing unit) 164 by closing the switch 154a, when the relay 154 shifts to the operating state according to the drive signal supplied from the CPU 21.

The CPU 21 of the personal interface 18 included in each image-forming device 1 through 5 turns on the main power source 61 to supply the electricity to the PPC controller including the CPU 11, if the main power source 61 is turned off in the energy-saving mode when the CPU 21 receives the instruction signal from the data communication device 7. In addition, the CPU 21 also supplies the electricity from the main power source 61 to a unit preset as the part that needs power supply, by operating a relay corresponding to the unit to close a switch corresponding to the relay. For example, in a case in which only the fixing unit 162 is preset as the part that needs power supply, the CPU 21 operates the relay 152 to close the switch 152a, and supplies the electricity from the main power source 61 to the fixing unit 162.

As described above, each image-forming device 1 through 5 can preset a part or a unit that needs power supply, and, thus, can carry out data transmission effectively without supplying electricity to a part unnecessary for the data transmission. Alternatively, each image-forming device 1 through 5 may set the part that needs power supply by a remote control operation according to an instruction signal supplied from the central management device 6. If a main switch not shown in the figures is turned on, the CPU 21 turns on all the relays 151 through 154 to close their switches 151a through 154a, and supplies the electricity from the main power source 61 to all the units shown in FIG. 27.

Next, a description will be given of the control I2. Here, the description is particularly given of the control I2 to supply electricity from the main power source 61 to only the fixing unit 162. FIG. 29 is a diagram showing a communication sequence between the personal interface 18 of one of the image-forming devices 1 through 5 and the data communication device 7. In FIG. 29, an affirmative signal and a negative signal are indicated as ACK and EOT, respectively. A fixing-temperature requesting signal (text data) corresponds to the data-transmission requesting signal, and includes power-source control information, which indicates whether power supply is necessary for a unit.

The fixing-temperature requesting signal has a structure shown in FIG. 30, for instance. Additionally, the power-source control information included in the fixing-temperature requesting signal has contents shown in FIG. 31, for example, and indicates whether power supply is necessary for individual units. Information indicating an actual request for a fixing temperature has contents shown in FIG. 32, for instance.

The personal interface 18 included in one of the image-forming devices 1 through 5 turns on the main power source 61 to supply the electricity to the PPC controller 31 including the CPU 11, in a case in which the personal interface 18 receives the fixing-temperature requesting signal while the main power source 61 is turned off due to the energy-saving mode.

Additionally, the personal interface 18 extracts the power-source control information from the fixing-temperature requesting signal, and analyzes the power-source control information. The personal interface 18, then, controls the main power source 61 according to bits "0" and "1", which are included in the power-source control information. For example, if a bit corresponding to the fixing unit 162 is "1", the personal interface 18 recognizes that the fixing unit 162 is set as a part that needs power supply, and, then, operates the relay 152 to close the switch 152a, thereby supplying the electricity from the main power source 61 to the fixing unit 162. Accordingly, the CPU 11 of the PPC controller 31 can acquire a set value of a fixing temperature from the fixing unit 162.

In the second embodiment, the CPU 11 of each image-forming device 1 through 5 turns off the main power source 61 to stop supplying the electricity to all the units including the PPC controller 31 related to communication, after transmitting the set value of the fixing temperature acquired from the fixing unit 162 to the data communication device 7. Alternatively, the CPU 11 can stop operating the relay 152 to make the relay 152 open the switch 152a to stop supplying the electricity from the main power source 61 to the fixing unit 162, in a case in which the CPU 11 receives an instruction signal shown in FIG. 33 from the data communication device 7 after transmitting the set value of the fixing temperature acquired from the fixing unit 162 to the data communication device 7.

If an image-forming device is in the normal operation mode, the image-forming device may be carrying out a printing process or an image forming process when the personal interface 18 of the image-forming device receives an information-modification requesting signal from the central management device 6 through the data communication device 7. This information-modification requesting signal is one type of the data-write requesting signal that requests modification of information about a specific area in an image-forming device.

For example, the information-modification requesting signal may request modification of a value of a current flowing through a photosensitive drum. If the value of the current (a drum current) flowing through the photosensitive drum is modified while the image-forming device is carrying out the image forming process, image density may differ with a location on a single copy sheet, as shown in FIG. 34. Consequently, information recorded on the copy sheet by the image-forming device may become unusable. In addition, if the CPU 11 of an image-forming device does not have satisfactory processing ability, the image-forming device may not be able to carry out an image forming process and a communication process between the image-forming device and the data communication device 7 concurrently.

Accordingly, the CPU 11 of each image-forming device 1 through 5 carries out the following controls J1 through J4, in addition to the above-described power-supply control.

(J1) In a case in which the CPU 11 modifies information related to image formation during an image forming process, the CPU 11 modifies the information after completing a current image forming process being carried out to a copy sheet. Accordingly, image recorded on a single copy sheet by the image forming process does not change its characteristics during the image forming process. The information related to image formation includes conditions of a drum current, a fixing temperature, a ramp voltage and a laser diode.

(J2) In a case in which processing ability of the CPU 11 of an image-forming device is low so that the CPU 11 has difficulty to carry out a communication process and an internal process such as an image forming process concurrently, the CPU 11 notifies the personal interface 18 that the image-forming device is busy, simultaneously as the image-forming device starts the internal process. The personal interface 18 does not pass an instruction signal, that is, either the data-transmission requesting signal or the data-write requesting signal, received from the data communication device 7 or the central management device 6, until the personal interface 18 receives a ready signal indicating that the image-forming device is ready for carrying out the next process, from the CPU 11. The CPU 11 supplies the ready signal to the personal interface 18 when the image-forming device completes the internal process. Consequently, the CPU 11 shifts the image-forming device to a state in which the image-forming device can communicate with the data communication device 7 or the central management device 6.

(J3) In a case in which processing ability of the CPU 11 of an image-forming device is low, the CPU 11 notifies the personal interface 18 that the image-forming device is busy by supplying a busy signal thereto, simultaneously as the image-forming device starts its internal process such as an image forming process. The personal interface 18 does not pass the instruction signal, that is, either the data-transmission requesting signal or the data-write requesting signal, received from the data communication device 7 or the central management device 6, until the personal interface 18 receives the ready signal indicating that the image-forming device is ready for carrying out the next process, from the CPU 11. The CPU 11 supplies the ready signal to the personal interface 18 when the image-forming device completes the internal process. Consequently, the CPU 11 shifts the image-forming device to the state in which the image-forming device can communicate with the data communication device 7 or the central management device 6.

If the personal interface 18 receives the instruction signal from the central management device 6 and receives the busy signal from the CPU 11, the personal interface 18 transmits the busy signal to the central management device 6 in response to the instruction signal received therefrom. Thus, the central management device 6 can decide whether the image-forming device is currently operating, according to the busy signal transmitted from the image-forming device.

(J4) In a case in which the data communication device 7 or the central management device 6 carries out an emergency process to an image-forming device, a communication process between the image-forming device and the data communication device 7 or the central management device 6 is set as a first priority over a process being carried out by the image-forming device, by temporarily prohibiting the process being carried out by the image-forming device.

For example, in a case in which the image-forming device is communicating with the data communication device 7 or the central management device 6 when recognizing an operation signal transmitted to the image-forming device according to a print key 73 (a start button) that is turned-on, the image-forming device ignores the operation signal, thereby temporarily prohibiting the process being carried out by the image-forming device, and setting the communication process as the first priority.

If the data communication device 7 is in the energy-saving mode, and its main power source 61 is turned off, data inside the image-forming devices 1 through 5 cannot be transmitted to the central management device 6 through the data communication device 7 instantaneously since the data communication device 7 cannot transmit the polling signal to the image-forming devices 1 through 5.

Figure 35:
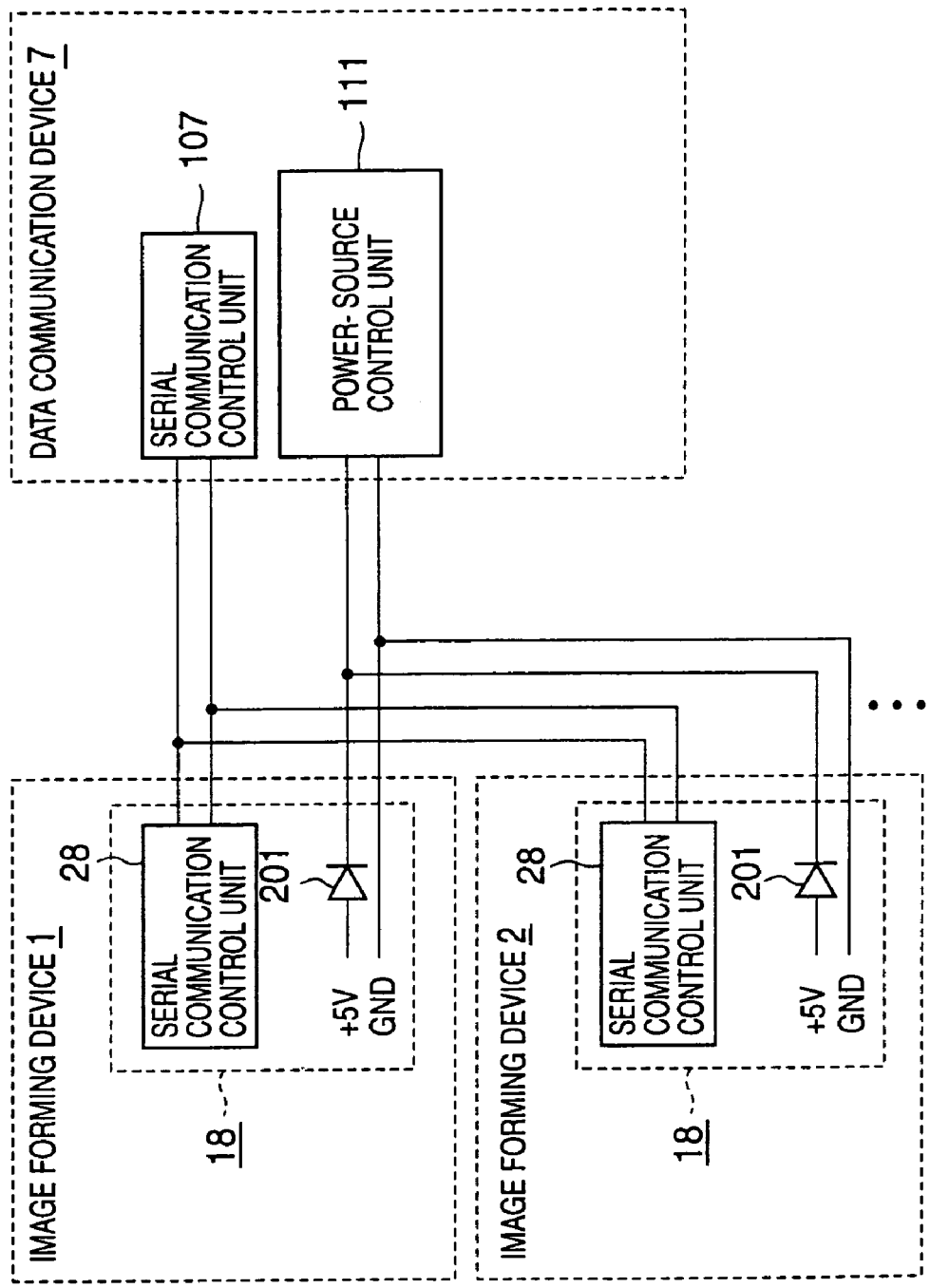
FIG. 35 is a block diagram showing an example of a connection between the data communication device shown in FIG. 22, and each image-forming device shown in FIG. 20.
Figure 36:
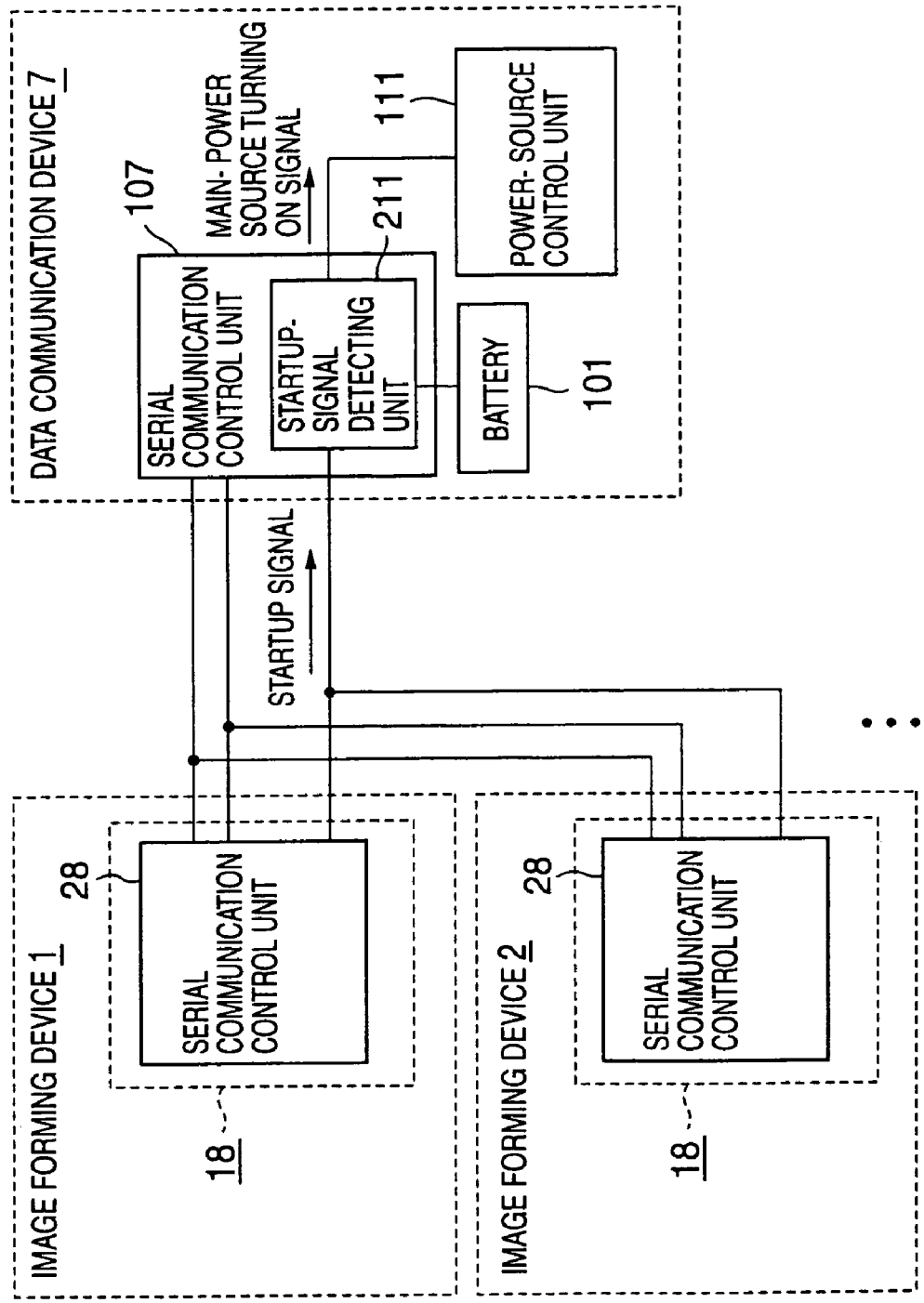
FIG. 36 is a block diagram showing another example of the connection between the data communication device shown in FIG. 22, and each image-forming device shown in FIG. 20.

Accordingly, it is considered that the main power source 112 of the data communication device 7 is turned on in a case in which the main power source 61 of an image-forming device transmitting data is turned on by an operation of a main switch. In detail, the data communication device 7 and each image-forming device 1 through 5 are connected as shown in FIGS. 35 and 36. The image-forming devices 3, 4 and 5 are omitted from FIGS. 35 and 36.

FIG. 35 is a block diagram showing an example of a connection between the data communication- device 7, and the image-forming devices 1 and 2. The image-forming devices 3, 4 and 5 are omitted from FIG. 35, but are, in fact, connected to the data communication device 7 in the same manner as the image-forming devices 1 and 2.

Each image-forming device 1 through 5 outputs a power-source voltage +5V via a diode 201, and is connected with the data communication device 7 through four cables including an output line of the diode 201, as shown in FIG. 35. In a case in which a plurality of the image-forming devices 1 through 5 are connected together to the data communication device 7, as shown in FIG. 35, the diode 201 prevents an output voltage (the power-source voltage) +5V of the main power source 61 of an image-forming device from interfering another image-forming device having the lower output voltage or having its main power source 61 turned off.

At each image-forming device 1 through 5, the main power source 61 is turned on, and supplies the electricity to the entire image-forming device, if the main switch is turned on. Accordingly, the power-source voltage +5V is inputted to the data communication device 7 from an image-forming device whose main power source 61 is turned on. Subsequently, the power-source control unit 111 of the data communication device 7 detects the power-source voltage +5V supplied from the image-forming device, and, thus, recognizes that the main power source 61 of one of the image-forming devices 1 through 5 is turned on. Consequently, the power-source control unit 111 turns on the main power source 112 of the data communication device 7, and supplies the electricity from the main power source 112 to the units including the CPU 102, the serial communication control unit 107 and the modem 109, which are related to communication.

Subsequently, the CPU 102 of the data communication device 7 acquires data related to the image-forming device whose main power source 61 is turned on, by carrying out the above-described selecting operation, and decides a type of the acquired data. If the CPU 102 decides that the data is emergency-call data, which is, data that indicates a critical failure and should be transmitted to the central management device 6 immediately, the CPU 102 transmits the emergency-call data to the central management device 6 by using the NCU 108 and the modem 109.

In the case in which the CPU 102 of the data communication device 7 acquires the data inside the image-forming device whose main power source 61 is turned on by carrying out the selecting operation, the CPU 102 transmits the selecting signal to the image-forming device by using the serial communication control unit 107. By receiving the selecting signal from the data communication device 7, the CPU 11 of the image-forming device transmits the data to the data communication device 7 by using the serial communication control unit 28 of the personal interface 18 subsequently, the CPU 102 of the data communication device 7 receives the data from the image-forming device by using the serial communication control unit 107. The detail description about this selecting operation is previously given.

If the CPU 102 of the data communication device 7 decides that the data acquired from the image-forming device is data such as the total counter value whose degree of urgency is low, the CPU 102 writes the data in the non-volatile RAM 103. The CPU 102 turns off the main power source 112 by use of the power-source control unit 111, thereby stopping the power supply to parts related to communication, after transmitting the data acquired from the image-forming device whose main power source 61 is turned on, to the central management device 6, or after writing the data in the non-volatile RAM 103.

The call-time control unit 105 outputs the data-transmission requesting signal to the CPU 102, in a case in which a current time matches with the data-transmission time set in the call-time control unit 105, or the current time passes the data-transmission time, at a timing, at which the data communication device 7 transmits the data acquired from the image-forming device to the central management device 6. Accordingly, the CPU 102 can transmit initially acquired data to the central management device 6 by using the NCU 108 and the modem 109, and, then, can transmit the data such as the total counter value stored in the non-volatile RAM 103 to the central management device 6 by using the NCU 108 and the modem 109.

Subsequently, the CPU 102 turns off the main power source 112 by use of the power-source control unit 111, thereby stopping the power supply to the parts related to communication, after transmitting the data acquired from the image-forming device whose main power source 61 is turned on, to the central management device 6, or after writing the data in the non-volatile RAM 103.

On the other hand, if the turned-on main power source 61 of the image-forming device is turned off, the power-source voltage +5V is not inputted to the data communication device 7. Accordingly, the power-source control unit 111 becomes unable to detect the power-source voltage +5V, and, thus, recognizes that the main power source 61 of the above-described image-forming device is turned off. Subsequently, the power-source control unit 111 turns off the main power source 112, thereby stopping the power supply to the parts related to communication.

However, if the data communication device 7 is communicating with the central management device 6 or is carrying out its internal process, the CPU 102 outputs a prohibiting signal to the power-source control unit 111, thereby prohibiting the power-source control unit 111 to turn off the main power source 112, in order to prevent the main power source 112 from being turned off. After the data communication device 7 completes the communication with the central management device 6 or the internal process, the CPU 102 outputs the power-source turning-off signal to the power-source control unit 111 to turnoff the main power source 112.

As described above, in the case in which one of the image-forming devices 1 through 5 is supplied with the electricity entirely after its main power source 61 is turned on because of the operation of the main switch, the data communication device 7 is supplied with the power-source voltage +5V from the image-forming device whose main power source 61 is turned on. At the data communication device 7, the power-source control unit 111 recognizes that the main power source 61 of one of the image-forming devices 1 through 5 is turned on, by detecting the power-source voltage +5V, and, then, turns on the main power source 112 to supply the electricity from the main power source 112 to the parts including the CPU 102, which are related to communication.

The data communication device 7 acquires data from the image-forming device whose main power source 61 is turned on, and transmits the data to the central management device 6, by use of the parts related to communication. Alternatively, the data communication device 7 writes the data acquired from the image-forming device in the non-volatile RAM 103. After transmitting the data to the central management device 6 or writing the data in the non-volatile RAM 103, the power-source control unit 111 turns off the main power source 112, thereby stopping the power supply from the main power source 112 to the parts related to communication. Alternatively, the power-source control unit 111 turns off the main power source 112, after the data communication device 7 recognizes that the turned-on main power source 61 of the image-forming device is turned off. Accordingly, the data communication device 7 can reduce unnecessary electricity consumption. Additionally, the image-forming devices can carry out data transmission to the data communication device 7 or the central management device 6 at any time.

FIG. 36 is a block diagram showing another example of the connection between the data communication device 7, and the image-forming devices 1 and 2. The image-forming devices 3, 4 and 5 are omitted from FIG. 36, but are, in fact, connected to the data communication device 7 in the same manner as the image-forming devices 1 and 2.

At each image-forming device 1 through 5, if the main switch is turned on, the main power source 61 is turned on, and supplies electricity to the entire image-forming device. Subsequently, the CPU 21 of the personal interface 18 recognizes that the electricity is supplied to the entire image-forming device, and transmits a startup signal to the data communication device 7 by using the serial communication control unit 28.

At the data communication device 7, the serial communication control unit 107 includes a startup-signal detecting unit 211 always supplied with electricity from the battery 101, where the startup-signal detecting unit 211 outputs the main-power-source turning-on signal to the power-source control unit 111 if detecting the startup signal transmitted from one of the image-forming devices 1 through 5. After receiving the main-power-source turning-on signal from the startup-signal detecting unit 211 included in the serial communication control unit 107, the power-source control unit 111 turns on the main power source 112, and supplies electricity from the main power source 112 to parts including the CPU 102, the serial communication control unit 107 and the modem 109, which are related to communication.

Subsequently, the CPU 102 acquires data inside the image-forming device whose main power source 61 is turned on, by carrying out the above-described selecting operation, and decides a type of the acquired data. If the acquired data is emergency-call data that indicates a failure and should be transmitted to the central management device 6 immediately, the CPU 102 transmits the emergency-call data to the central management device 6 by using the NCU 108 and the modem 109.

If deciding that the acquired data is data such as the total counter value whose degree of urgency is low, the CPU 102 writes the data in the non-volatile RAM 103.

The CPU 102 turns off the main power source 112 by use of the power-source control unit 111, thereby stopping the power supply to the parts related to communication, after transmitting the data acquired from the image-forming device whose main power source 61 is turned on, to the central management device 6, or after writing the data in the non-volatile RAM 103.

The call-time control unit 105 outputs the data-transmission requesting signal to the CPU 102, in a case in which a current time matches with the data-transmission time set in the call-time control unit 105, or the current time passes the data-transmission time, at a timing, at which the data communication device 7 transmits the data acquired from the image-forming device to the central management device 6. Accordingly, the CPU 102 can transmit initially acquired data to the central management device 6 by using the NCU 108 and the modem 109, and, then, can transmit the data such as the total counter value stored in the non-volatile RAM 103 to the central management device 6 by using the NCU 108 and the modem 109.

Subsequently, the CPU 102 turns off the main power source 112 by use of the power-source control unit 111, thereby stopping the power supply to the parts related to communication, after transmitting the data acquired from the image-forming device whose main power source 61 is turned on, to the central management device 6, or after writing the data in the non-volatile RAM 103.

In the image-forming device whose main power source 61 is turned on, the CPU 21 of the personal interface 18 turns off the main power source 61, and stops supplying the electricity from the main power source 61 to the parts other than the personal interface 18 that are related to communication, after transmitting the data to the data communication device 7.

As described above, if each image-forming device 1 through 5 is supplied entirely with the electricity from the main power source 61 after the main power source 61 is turned on according to an individual operation of its main switch, the CPU 21 of the personal interface 18 transmits the startup signal to the data communication device 7 by using the serial communication control unit 28.

In the data communication device 7, the power-source control unit 111 turns on the main power source 112 in the case in which the startup-signal detecting unit 211 of the serial communication control unit 107 detects the startup signal transmitted from one of the image-forming devices 1 through 5. Subsequently, the main power source 112 supplies the electricity to the parts including the CPU 102 that are related to communication. The CPU 102 acquires the data from the image-forming device whose main power source 61 is turned on, and transmits the data to the central management device 6, by using the parts related to communication. Alternatively, the CPU 102 writes the data acquired from the image-forming device, in the non-volatile RAM 103.

After the CPU 102 completes transmitting the data to the central management device 6 or writing the data in the non-volatile RAM 103, the power-source control unit 111 turns off the main power source 112, and stops supplying the electricity to the parts related to communication. Accordingly, the data communication device 7 can reduce unnecessary electricity consumption. In addition, the image-forming devices 1 through 5 can carry out data transmission to the data communication device 7 or the central management device 6 at any time.

Additionally, in the image-forming device whose main power source 61 is turned on, the CPU 21 of the personal interface 18 turns off the main power source 61, and stops supplying the electricity from the main power source 61 to the parts other than the personal interface 18 that are related to communication, after transmitting the data to the data communication device 7. Accordingly, the image-forming devices 1 through 5 can reduce unnecessary electricity consumption.

In the above-described example, the main power source 61 is turned on if the main switch is turned on at each image-forming device 1 through 5. In the case in which the electricity is supplied from the main power source 61 to the entire image-forming device, the CPU 21 of the personal interface 18 recognizes that the electricity is supplied to the entire image-forming device, and transmits the startup signal to the data communication device 7 by using the serial communication control unit 28. Alternatively, the CPU 21 of the personal interface 18 can supply the electricity from the main power source 61 to the parts including the CPU 11 that are related to communication by turning on the main power source 61, in the case in which the data-transmission request is generated to request for data transmission to the data communication device 7.

The data-transmission request is preferably generated as follows. For example, the RTC 12 compares a current time generated by a clock function with the predetermined data-transmission time. If the current time matches with the data-transmission time, or if the current time passes the data-transmission time, the RTC 12 generates the data-transmission request requesting for the data transmission to the data communication device 7.

Additionally, in the case in which the data-transmission request is generated for the data transmission to the data communication device 7, the controls are preferably carried out to supply the electricity from the main power source 61 to a part that needs power supply for acquiring data that should be transmitted to the central management device 6 among data included in the PPC controller 31, and to stop the power supply to the part after completion of transmission of the data to the data communication device 7. In order to carry out the above-described controls, each image-forming device 1 through 5 initially needs to set the part that needs power supply. This process to set the part that needs power supply is described above, and, thus, a description of the process is omitted here.

Additionally, in the case in which the power-source control unit 111 of the data communication device 7 receives the main-power-source turning-on signal from the startup-signal detecting unit 211 of the serial communication control unit 107, the power-source control unit 111 turns on the main power source 112, and may supply the electricity from the main power source 112 to only parts, that are, the CPU 102, the ROM 106 and the serial communication control unit 107 necessary for deciding a type of data acquired from an image-forming device whose main power source 61 is turned on.

Subsequently, the CPU 102 acquires the data from the image-forming device whose main power source 61 is turned on. If CPU 102 decides that the data acquired from the image-forming device is emergency-call data, the CPU 102 may supply the electricity by use of the power-source control unit 111 from the main power source 61 to parts related to communication, in fact, the modem 109 and the like, since the other parts related to communication are already supplied with the electricity from the main power source 61.

Furthermore, the data communication device 7 can be set to the normal operation mode or the energy-saving mode selectively in the image-forming-device management system according to the second embodiment. Instead, the data communication device 7 can be set to the energy-saving mode at all times, and can hold the main power source 112 turned off.

A description will now be given of a facsimile (FAX) compound device used in an image-forming-device management system according to a third embodiment of the present invention.

Figure 37:
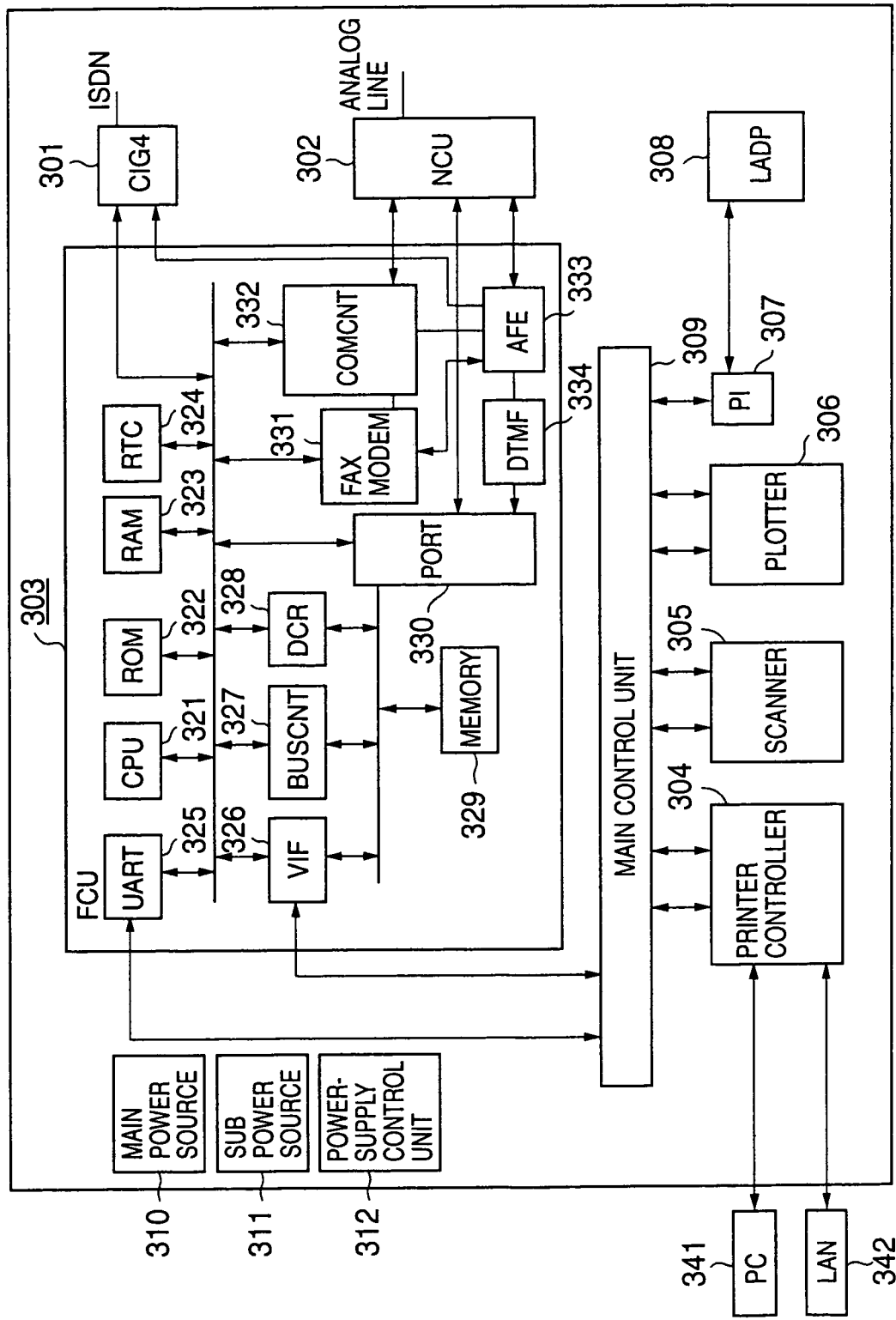
FIG. 37 is a block diagram showing a structure of a main unit of a facsimile compound device used in an image-forming-device management system according to a third embodiment of the present invention.

FIG. 37 is a block diagram showing a structure of a main unit of the facsimile compound device used in the image-forming-device management system according to the third embodiment. The facsimile compound device shown in FIG. 37 includes a CIG4 301, an NCU 302, an FCU 303, a printer controller 304, a scanner 305, a plotter 306, a personal interface (PI) 307, an LADP 308, a main control unit 309, a main power source 310, a sub power source 311 and a power-supply control unit 312. In addition, the facsimile compound device includes an operation display unit not shown in the figures.

The CIG4 301 is a G4 unit of a facsimile device, and is always supplied with electricity from the sub power source 311. The NCU 302 is a network control unit always supplied with the electricity from the sub power source 311, and carries out connection of a line, disconnection of a line, detection of a line being connected, and the like. The FCU 303 is a facsimile control unit that controls communication with an external facsimile device, and includes a CPU 321, a ROM 322, a RAM 323, a RTC 324, a UART 325, a VIF 326, a BUSCNT 327, a DCR 328, a memory 329, a PORT 330, a FAX modem 331, a COMCNT 332, an AFE 333, a DTMF 334, and the like.

The CPU 321 is a central processing unit that controls the entire FCU 303 collectively by following a control program stored in the ROM 322, and functions as power-supply part setting means. The ROM 322 is a read only memory that stores various types of fixed data including the control program used by the CPU 321. The RAM 323 is a temporarily storing memory such as a work memory used by the CPU 321 for processing data.

The RTC 324 has a function as data-transmission request generating means that includes time generating means, and is always supplied with the electricity from the sub power source 311. In detail, the RTC 44 includes a time generating unit, a facsimile-transmission-time setting register and a time comparing unit. The time generating unit generates a current time (a year, a month, a date, an hour and a minute). The facsimile-transmission-time setting register sets a facsimile-transmission time, at which image data for facsimile communication is transmitted to an external facsimile device.

In addition, the time comparing unit compares the current time generated by the time generating unit with the facsimile-transmission time preset in the facsimile-transmission-time setting register. The time comparing unit generates a facsimile-transmission request that requests facsimile transmission to a predetermined destination (an external facsimile device), if the current time and the facsimile-transmission time match with each other, or if the current time passes the facsimile-transmission time.

This RTC 324 is supplied with the electricity from the sub power source 311 different from the main power source 310, and, thus, can generate an accurate current time even if the main power source is turned off. Alternatively, the RTC 324 may include only the time generating unit, and the facsimile-transmission-time setting register and the time comparing unit may be provided separately from the RTC 324.

The UART 325 is a serial communication unit that functions as an interface exchanging a control signal with the main control unit 309. The VIF 326 is a video interface that exchanges image data (image information) with the main control unit 309. The BUSCNT 327 is a bus control circuit that connects or disconnects buses, and substitutes a bit on a bus with another bit on the other bus. The DCR 328 is a compression/decompression circuit that compresses or decompresses the image data. The memory 329 is a rewritable memory that is always supplied with electricity from the main power source 310, and stores the image data. The PORT 330 is an I/O (Input/Output) port that controls input and output of each signal by following an instruction from the CPU 321. The FAX modem 331 modulates or demodulates image data for facsimile communication, which is received or to be transmitted.

The COMCNT 332 is a communication control circuit that is always supplied with the electricity from the sub power source 311, and controls input and output of each signal by following an instruction from the CPU 321. In addition, the COMCNT 332 detects or receives a call signal (a ringer signal) corresponding to a call out made by an external facsimile device, and notifies the CPU 321 about the call signal, if the call signal is transmitted to the facsimile compound device from a communication line. This COMCNT 332 starts carrying out energy-saving control if the energy-saving mode is set. The COMCNT 332 can still detect the call signal from the communication line in the energy-saving mode.

The AFE 333 is an analog front end (an analog signal control circuit) that amplifies and filters a signal from the communication line (a telephone line). The DTMF 334 detects a DTMF signal, for example, a combination code of "*#0#" transmitted from an external device to the facsimile compound device through the communication line.

The printer controller 304 converts print information transmitted directly from a personal computer (PC) 341 to the facsimile compound device, or print information transmitted from a personal computer to the facsimile compound device via a LAN (Local Area Network) 342, to image data (image information). The scanner 305 reads a document image. The plotter 306 forms or prints an image on a sheet of paper, based on image data converted by the printer controller 304, image data read by the scanner 305, or image data received by the FCU 303 and the like from an external facsimile device.

The personal interface 307 has a function similar to the personal interface 18 according to the second embodiment except the power-supply control means, where the personal interface 18 is previously described with reference to FIG. 21. The LADP 308 is a line adapter that has a function similar to the data communication device 7 according to the second embodiment except the power-supply control means, where the data communication device 7 is previously described with reference to FIG. 22.

The main control unit 309 controls the FCU 303, the printer controller 304, the scanner 305, the plotter 306 and the personal interface 307 collectively. The main power source 310 is a power source used for supplying the electricity to each unit in the facsimile compound device. The sub power source 311 is a low-level power source different from the main power source 310. The power-supply control unit 312 is always supplied with the electricity from the sub power source 311, and has a function as power-supply control means possessed by each of the personal interface 18, the main power source 61, the sub power source 62 and the data communication device 7 according to the second embodiment, which are previously described with reference to FIGS. 20, 21 and 22.

The facsimile compound device structured as described above has functions that are almost same as those of the image-forming devices 1 through 5 and the data communication device 7 according to the second embodiment, and can acquire the same operation effect. In addition, in a case in which the facsimile compound device shifts to the energy-saving mode, the power-supply control unit 312 stops the power supply to a display device on the operation display unit that consumes much electricity, the printer controller 304, the scanner 305, the plotter 306, and units other than the RTC 324, the COMCNT 332 and the memory 329 in the FCU 303, by turning off the main power source 310. On the other hand, the power-supply control unit 312 continues supplying the electricity from the sub power source 311 to the CIG4 301 and the NCU 302, in addition to the RTC 324, the COMCNT 332 and the memory 329 included in the FCU 303.

In a case in which the COMCNT 332 of the FCU 303 receives a call signal (a ringer signal), which corresponds to a call out made by an external facsimile device and is transmitted from the communication line through the NCU 302, during the energy-saving mode, the COMCNT 332 notifies the power-supply control unit 312, and, then, the CPU 321, about the received call signal.

After receiving the above-described notification from the COMCNT 332, the power-supply control unit 312 supplies the electricity from the main power source 310 to the entire FCU 303, in fact, a part that is not supplied with the electricity regularly in the FCU 303, in addition to the main control unit 309 and the plotter 306, by turning on the main power source 310.

In a case in which the CPU 321 receives the above-described notification from the COMCNT 332 after being supplied with the electricity from the main power source 310, the CPU 321 outputs image data continuously received from the communication line by the NCU 302, to the plotter 306 through a part in the FCU 303 related to communication and the main control unit 309, every time after the NCU 302 receives a page of the image data or all the pages of the image data. Meanwhile, the CPU 321 instructs the plotter 306 to print the image data on a sheet of paper. When the plotter completes printing the image data on the sheet of paper, the CPU 321 instructs the power-supply control unit 312 to turn off the main power source 310, thereby stopping the power supply to the parts that are supplied with the electricity according to the notification from the COMCNT 332.

Additionally, in a case in which the facsimile compound device shifts to the energy-saving mode while the facsimile-transmission time is set in the facsimile-transmission-time setting register of the RTC 324, the power-supply control unit 312 stops the power supply to the display device on the operation display unit, the printer controller 304, the scanner 305, the plotter 306, and the units in the FCU 303 other than the RTC 324, the COMCNT 332 and the memory in the FCU 303, by turning off the main power source 310. On the other hand, the power-supply control unit 312 continues supplying the electricity from the sub power source 311 to the CIG4 301 and the NCU 302, in addition to the RTC 324, the COMCNT 332 and the memory 329 included in the FCU 303.

Subsequently, the time comparing unit of the RTC 324 compares the current time generated by the time generating unit with the facsimile-transmission time preset in the facsimile-transmission-time setting register during this energy-saving mode. The time comparing unit generates the facsimile-transmission request that requests for facsimile transmission to the predetermined destination (the external facsimile device), if the current time matches with the facsimile-transmission time, of if the current time passes the facsimile-transmission time. Subsequently, the time comparing unit supplies the facsimile-transmission request to the power-supply control unit 312, and, then, the CPU 321.

After receiving the facsimile-transmission request from the time comparing unit, the power-supply control unit 312 supplies the electricity from the main power source 310 to the entire FCU 303, in fact, the part that is not supplied with the electricity regularly, by turning on the main power source 310. Additionally, the CPU 321 of the FCU 303 transmits image data of a document initially read by the scanner 305 and stored in the memory 329 to the predetermined destination by using the FAX modem 331, the COMCNT 332 and the NCU 302, in a case in which the CPU 321 receives the facsimile-transmission request from the time comparing unit after being supplied with the electricity from the main power source 310.

In a case in which a document to be transmitted from the facsimile compound device is set in the scanner 305, the power-supply control unit 312 supplies the electricity from the main power source 310 to the main control unit 309 and the scanner 305, in addition to the entire FCU 303, in fact, the part that is not supplied with the electricity regularly in the FCU 303, by turning on the main power source 310.

After being supplied with the electricity from the main power source 310, the scanner 305 reads image data of the document set therein, and outputs the image data to the FCU 303 by use of the main control unit 309. The CPU 321 of the FCU 303 transmits the image data to the predetermined destination by use of the FAX modem 331, the COMCNT 332 and the NCU 302, if the CPU 321 receives the image data from the scanner 305 after being supplied with the electricity from the main power source 310.

According to the third embodiment of the present invention, the facsimile compound device used in the image-forming-device management system can reduce unnecessary electricity consumption as well as can carry out facsimile communication with an external facsimile device regularly.

Figure 38:
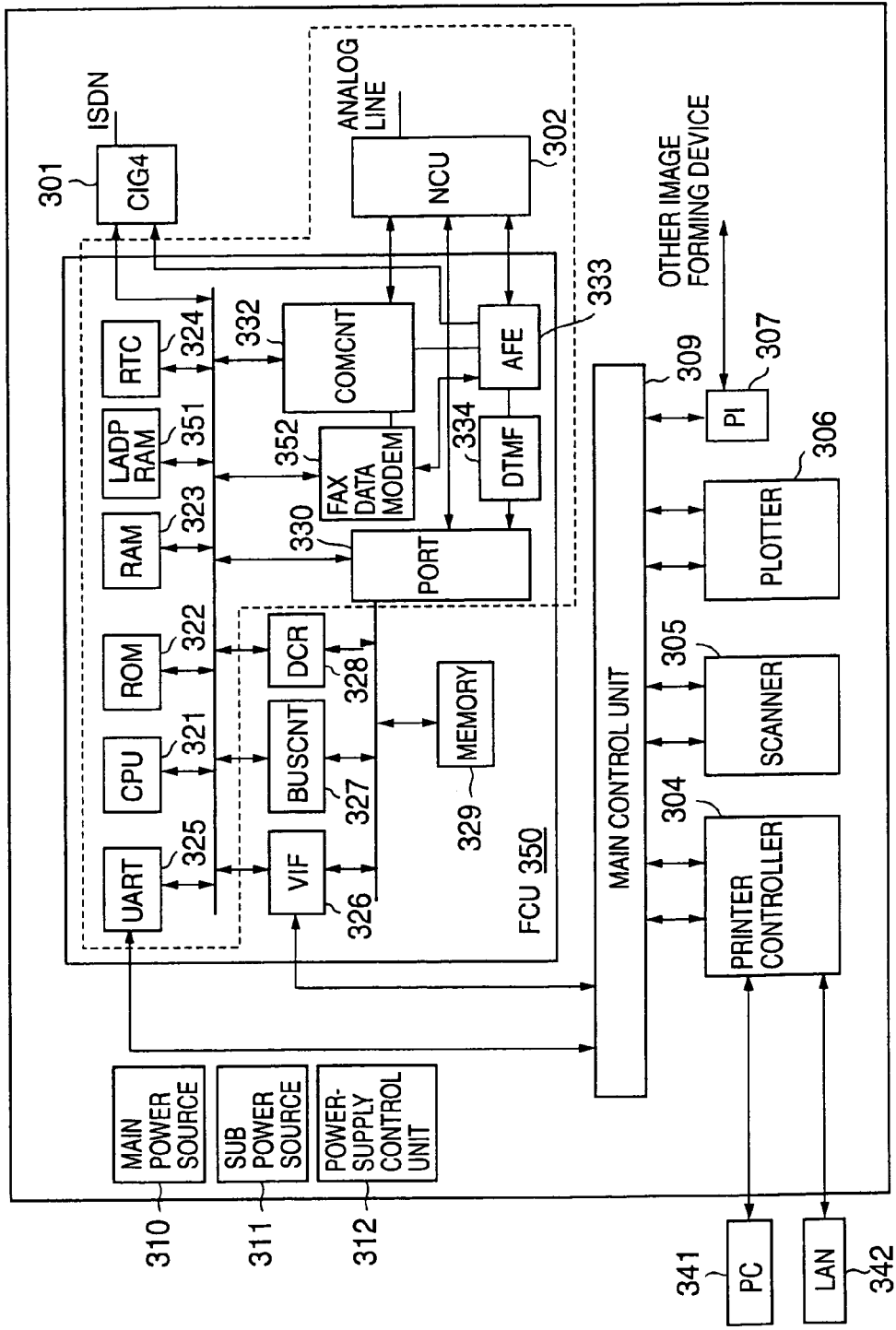
FIG. 38 is a block diagram showing a structure of a main unit of a facsimile compound device used in an image-forming-device management system according to a fourth embodiment of the present invention.

A description will now be given of a facsimile compound device used in an image-forming-device management system according to a fourth embodiment of the present invention. FIG. 38 is a block diagram showing a structure of a main unit of the facsimile compound device used in the image-forming-device management system according to the fourth embodiment. A unit shown in FIG. 38 corresponding to a unit shown in FIG. 37 has a same unit number as the unit shown in FIG. 37, and its description is omitted in this embodiment.

The facsimile compound device shown in FIG. 38 includes the CIG4 301, the NCU 302, an FCU 350, the printer controller 304, the scanner 305, the plotter 306, the personal interface (PI) 307, the LADP 308, the main control unit 309, the main power source 310, the sub power source 311 and the power-supply control unit 312. In addition, the facsimile compound device includes an operation display unit not shown in the figures.

The FCU 350 is a facsimile control unit that controls communication with an external facsimile device or a central management device, and includes the CPU 321, the ROM 322, the RAM 323, an LADP RAM 351, the RTC 324, the UART 325, the VIF 326, the BUSCNT 327, the DCR 328, the memory 329, the PORT 330, a FAX data modem 352, the COMCNT 332, the AFE 333, the DTMF 334, and the like. Units inside an area surrounded by a broken line function as communication control means or a data communication device.

The CPU 321 is a central processing unit that controls the entire FCU 350 collectively by following a control program stored in the ROM 322, and functions as data-type deciding means, power-supply part setting means and power-supply part deciding means. The LADP RAM 351 is a non-volatile memory (data storing means) always supplied with electricity from the sub power source 311, and stores data such as a total counter value that is related to the facsimile compound device and should be transmitted to the central management device.

The RTC 324 has a function as data-transmission request generating means that includes time generating means, and is always supplied with the electricity from the sub power source 311. In detail, the RTC 44 includes a time generating unit, a data-transmission-time setting register, a data-transmission-time comparing unit, a facsimile-transmission-time setting register and a facsimile-transmission-time comparing unit. The time generating unit generates a current time (a year, a month, a date, an hour and a minute). The data-transmission-time setting register sets a data-transmission time, at which the facsimile compound device transmits the data related to the facsimile compound device to the central management device.

In addition, the data-transmission-time comparing unit compares the current time generated by the time generating unit with the data-transmission time preset in the data-transmission-time setting register. The time comparing unit generates a data-transmission request that requests for data transmission to the central management device, if the current time and the data-transmission time match with each other, or if the current time passes the data-transmission time.

The facsimile-transmission-time setting register sets a facsimile-transmission time, at which the facsimile compound device transmits image data for facsimile communication to an external facsimile device. In addition, the facsimile-transmission-time comparing unit compares the current time generated by the time generating unit with the facsimile-transmission time preset in the facsimile-transmission-time setting register. The facsimile-transmission-time comparing unit generates a facsimile-transmission request that requests for facsimile transmission to a predetermined destination (an external facsimile device), if the current time and the facsimile-transmission time match with each other, or if the current time passes the facsimile-transmission time.

The RTC 324 may include only the time generating unit, and the data-transmission-time setting register, the facsimile-transmission-time setting register, the data-transmission-time comparing unit and the facsimile-transmission-time comparing unit may be provided separately from the RTC 324.

The FAX data modem 352 modulates or demodulates communication data transmitted or received between the facsimile compound device and the central management device, and image data for facsimile communication. This Fax data modem 352 functions as data transmitting means with the NCU 302 and the like.

The COMCNT 332 is a communication control circuit that is always supplied with the electricity from the sub power source 311, and controls input and output of each signal by following an instruction from the CPU 321. In addition, a ringer-detecting unit included in the COMCNT 332 detects or receives a call signal (a ringer signal) corresponding to a call out made by the central management device or an external facsimile device, and notifies the CPU 321 about the call signal, if the call signal is transmitted to the facsimile compound device from a communication line. This COMCNT 332 shifts to carry out energy-saving control if the energy-saving mode is set, in which the COMCNT 332 can still detect the call signal from the communication line.

The main control unit 309 controls the FCU 350, the printer controller 304, the scanner 305, the plotter 306 and the personal interface 307 collectively. The power-supply control unit 312 is always supplied with the electricity from the sub power source 311, and has a function as power-supply control means and source (call-origin) deciding means.

When a main switch not shown in the figures is turned on, the power-supply control unit 312 supplies electricity from the main power source 310 to the entire facsimile compound device by turning on the main power source 310. The power-supply control unit 312 also supplies the electricity from the main power source 310 to a part necessary for processing a call signal by turning on the main power source 310, in a case in which the power-supply control unit 312 receives the call signal by use of the COMCNT 332 in the energy-saving mode.

Further, in a case in which the data-transmission request or the facsimile-transmission request is generated by the RTC 324 during the energy-saving mode, the power-supply control unit 312 supplies the electricity from the main power source 310 to a part related to communication, including the NCU 302 and the FAX data modem 352, by turning on the main power source 310. The power-supply control unit 312 also supplies the electricity from the main power source 310 to a part that needs power-supply for acquiring data, which should be transmitted to the central management device, or image data, which should be transmitted to the external facsimile device, in the case in which the data-transmission request or the facsimile-transmission request is generated.

Additionally, the power-supply control unit 312 stops supplying the electricity from the main power source 310 to each of the above-described units by turning off the main power source 310, after completion of the data transmission to the central management device or the facsimile transmission to the external facsimile device, or after a fixed period such as an hour passes while the facsimile compound device is being unused. Additionally, the power-supply control unit also stops supplying the electricity from that main power source 310 to each of the above-described units in a case in which the main switch is turned off.

Functions of other units in the facsimile compound device according to the fourth embodiment is the same as those of the facsimile compound device according to the third embodiment, and, thus, their descriptions are omitted.

A description will now be given of a data communication process carried out by the facsimile compound device according to the fourth embodiment. A description will initially be given of control including power-supply control, which is performed by the facsimile compound device when receiving a call signal.

In a case in which the facsimile compound device shifts to the energy-saving mode, the power-supply control unit 312 stops the power supply to a display device on the operation display unit that consumes much electricity, the printer controller 304, the scanner 305, the plotter 306, and units other than the RTC 324, the COMCNT 332, the memory 329 and the LADP RAM 351 in the FCU 350, by turning off the main power source 310. On the other hand, the power-supply control unit 312 continues supplying the electricity from the sub power source 311 to the CIG4 301 and the NCU 302, in addition to the RTC 324, the COMCNT 332, the memory 329 and the LADP RAM 351 included in the FCU 350.

In a case in which the call signal (a ringer signal) is transmitted from a communication line to the facsimile compound device according to a call out made by an external device, a ringer-detecting unit included in the COMCNT 332 detects or receives the call signal through the NCU 302, and notifies the power-supply control unit 312 about the reception of the call signal. In a case in which the power-supply control unit 312 receives the above-described notification from the COMCNT 332 during the energy-saving mode, the power-supply control unit 312 supplies the electricity from the main power source 310 to a part partially achieving a function as the source deciding means, which are the FAX data modem 352, the AFE 333, the DTMF 334 and the PORT 330, by turning on the main power source 310.

The DTMF 334 notifies the power-supply control unit 312 about detection of a DTMF signal, if the DTMF 334 detects the DTMF signal (an IT signal) supplied from the AFE 333 after being supplied with the electricity from the main power source 310. The power-supply control unit 312 decides whether the source or the call-origin is the central management device, after supplying the electricity to the part partially achieving a function as the source deciding means.

The power-supply control unit 312 decides that the source is a facsimile device, and supplies the electricity from the main power source 310 to the main control unit 309, the plotter 306 and the entire FCU 350, in fact, a part in the FCU 350 to which the electricity is not supplied yet, in a case in which the DTMF 334 does not detect the DTMF signal after the reception of the call signal. Subsequently, the power-supply control unit 312 carries out facsimile-reception control as described in the third embodiment.

On the other hand, in a case in which the DTMF 334 detects the DTMF signal after the reception of the call signal, the power-supply control unit 312 supplies the electricity from the main power source 310 to a part that is surrounded by the broken line in FIG. 38 and functions as the communication control means (LADP), in fact, a unit included in the part surrounded by the broken line, which is not supplied with the electricity yet.

The CPU 321 carries out an initialization process not shown in the figures after being supplied with the electricity from the main power source 310 during the energy-saving mode. Additionally, the CPU 321 decides a data type based on an instruction signal that is either the data-transmission requesting signal or the data-write requesting signal, both being text data, in a case in which the CPU 321 receives the instruction signal transmitted continuously after the DTMF signal from the central management device to the facsimile compound device by using the NCU 302, the COMCNT 332 and the FAX data modem 352.

In a case in which the CPU 321 recognizes that a process requested by the central management device is data transmission to the central management device, based on a result of deciding the data type, the CPU 321 transmits data stored in the LADP RAM 351 to the central management device by use of the FAX data modem 352, the COMCNT 332 and the NCU 302. This data stored in the LADP RAM 351 is updated if necessary. For example, in a case in which the scanner 305 or the plotter 306 is activated by being supplied with electricity, the CPU 321 acquires data indicating an operation number such as a total counter number, and updates the data stored in the LADP RAM 351 by using the acquired operation number.

In the above-described case in which the CPU 321 recognizes that the process requested by the central management device is data transmission to the central management device, based on the result of deciding the data type, the CPU 321 can also decide a part that needs power supply for acquiring data, which should be transmitted to the central management device among data related to the facsimile compound device, and can supply the electricity from the main power source 310 to the part. Subsequently, the CPU 321 can acquire the data that should be transmitted to the central management device from the part, and can transmit the data to the central management device by using the FAX data modem 352, the COMCNT 332 and the NCU 302. For example, in a case in which the CPU 321 acquires data indicating the newest operation number of the plotter 306, the CPU 321 also supplies the electricity from the main power source 310 to the plotter 306.

On the other hand, in a case in which the CPU 321 recognizes that the process requested by the central management device is a data-write process, based on the result of deciding the data type, the CPU 321 writes data such as parameters stored in a field of an information record of the instruction signal (text data) received from the central management device, in the LADP RAM 351.

In the case in which the CPU 321 recognizes that the process requested by the central management device is the data-write process, based on the result of deciding the data type, the CPU 321 can decide a part other than the LADP RAM 351 that needs power supply for writing or rewriting data, and can supply the electricity from the main power source 310 to the part. Subsequently, the CPU 321 can write the data stored in the field of the information record of the instruction signal (text data) received from the central management device, in the part. For example, in a case in which the CPU 321 rewrites a parameter of the plotter 306, the CPU 321 supplies the electricity from the main power source 310 to the plotter 306.

After completion of the data transmission to the central management device or the data-write process to the LADP RAM 351 or the like, the CPU 321 stops supplying the electricity from the main power source 310 to each unit supplied with the electricity for carrying out the data transmission or the data-write process, by turning off the main power source 310.

A description will now be given of call control including power-supply control carried out by the facsimile compound device according to the fourth embodiment.

When the facsimile compound device is in the energy-saving mode, the facsimile-transmission-time comparing unit included in the RTC 324 compares the current time generated by the time generating unit with the facsimile-transmission time preset in the facsimile-transmission-time setting register. If the current time matches with the facsimile-transmission time, or if the current time passes the facsimile-transmission time, the facsimile-transmission-time comparing unit generates the facsimile-transmission request that requests for facsimile transmission to the predetermined destination which is an external facsimile device, and supplies the facsimile-transmission request to the power-supply control unit 312, and, then, to the CPU 321. Facsimile-transmission control following the above-described generation of the facsimile-transmission request is described in the third embodiment.

On the other hand, during the energy-saving mode, the data-transmission-time comparing unit included in the RTC 324 compares the current time generated by the time generating unit with the data-transmission time preset in the data-transmission-time setting register. If the current time matches with the data-transmission time, or if the current time passes the data-transmission time, the data-transmission-time comparing unit generates the data-transmission request that requests for data transmission to the central management device, and supplies the data-transmission request to the power-supply control unit 312, and, then, to the CPU 321.

After receiving the data-transmission request, the power-supply control unit 312 supplies the electricity from the main power source 310 to the part surrounded by the broken line in FIG. 38, which functions as the communication control means (LADP), by turning on the main power source 310. The CPU 321 carries out the initialization process not shown in the figures after being supplied with the electricity from the main power source 310 during the energy-saving mode. Subsequently, the CPU 321 transmits the data stored in the LADP RAM 351 to the central management device by using the FAX data modem 352, the COMCNT 332 and the NCU 302, if receiving the data-transmission request from the RTC 324. The CPU 321 stops supplying the electricity to the part surrounded by the broken line shown in FIG. 38 by using the power-supply control unit 312, after completing the data transmission to the central management device.

Alternatively, the CPU 321 decides whether the memory 329 stores image data. In a case in which the CPU 321 decides that the memory 329 stores the image data, the CPU 321 can set a facsimile-transmission time corresponding to the image data in the facsimile-transmission-time setting register. Subsequently, the facsimile-transmission-time comparing unit compares the current time with the facsimile-transmission time corresponding to the image data. If the current time matches with the facsimile-transmission time, or if the current time passes the facsimile-transmission time, the facsimile-transmission-time comparing unit may generate the facsimile-transmission request that requests for transmission of the image data to an external facsimile device.

After transmitting the image data corresponding to the facsimile-transmission time set in the facsimile-transmission-time setting register to the external facsimile device (the predetermined destination) at the facsimile-transmission time, the CPU 321 decides whether the memory 329 stores another image data. If the CPU 321 decides that the memory 329 stores another image data, the CPU 321 sets a facsimile-transmission time for the image data in the facsimile-transmission-time setting register.

Additionally, if the external facsimile device is busy when the facsimile compound device calls out the external facsimile device once according to the generation of the facsimile-transmission request, the facsimile compound device cannot carry out facsimile transmission. Thus, the facsimile compound device calls out the external facsimile device again. By setting a next facsimile-transmission time (a re-call time) for re-calling out the external facsimile device in the facsimile-transmission-time setting register, the facsimile compound device can control the main power source 310 in detail.

The CPU 321 may also decide whether the LADP RAM 351 stores data. In a case in which the CPU 321 decides that the LADP RAM 351 stores the data, the CPU 321 can set a data-transmission time corresponding to the data in the data-transmission-time setting register. Subsequently, the data-transmission-time comparing unit compares the current time with the data-transmission time corresponding to the data. If the current time matches with the data-transmission time, or if the current time passes the data-transmission time, the data-transmission-time comparing unit may generate the data-transmission request that requests for transmission of the data to the central management device.

After transmitting the data corresponding to the data-transmission time set in the data-transmission-time setting register to the central management device at the data-transmission time, the CPU 321 decides whether the LADP RAM 351 stores another data. If the CPU 321 decides that the LADP RAM 351 stores another data, the CPU 321 sets a data-transmission time for the data in the data-transmission-time setting register.

Additionally, if the central management device is busy when the facsimile compound device calls out the central management device once according to the generation of the data-transmission request, the facsimile compound device cannot carry out data transmission. Thus, the facsimile compound device calls out the central management device again. By setting a next data-transmission time (a re-call time) for re-calling out the central management device in the data-transmission-time setting register, the facsimile compound device can control the main power source 310 in detail.

A description will now be given of a power-supply control process and a power-supply part setting process carried out by the CPU 321 of the facsimile compound device, with reference to FIGS. 27 through 34.

The CPU 321 carries out a power-supply control process as follows, for example. The CPU 321 supplies electricity from the main power source 310 to a part that needs power supply for acquiring data, which should be transmitted to the central management device, or a part that needs the power supply for writing data, in a case in which the CPU 321 receives an instruction signal from the central management device. This instruction signal is either the data-transmission requesting signal or the data-write requesting signal.

The CPU 321 needs to set the part that needs the power supply in order to carry out the above-described power-supply control process. Control for setting the part that needs the power-supply includes the following controls K1 and K2.

(K1) The CPU 321 of the facsimile compound device sets the part that needs the power supply based on an operation signal outputted from the operation display unit in accordance with a key operation.

(K2) The CPU 321 sets the part that needs the power supply in accordance with a type of data added to the instruction signal (text data) transmitted from the central management device to the facsimile compound device.

A simple description will initially be given of the control K1 for setting the part that needs the power supply, since the control K1 is the same as the control I1 described in the second embodiment.

In the normal operation mode, the CPU 321 of the facsimile compound device sets the SP mode, by a key operation on the operation display unit. Additionally, the CPU 321 displays a power-supply mode setting screen on a text-display unit of the operation display unit by a fixed key operation, as shown in FIG. 28. The CPU 321 sets a unit corresponding to a key indicated as "ON" on the text-display unit, to a part that needs the power supply, and sets a unit corresponding to a key indicated as "OFF", to a part that does not need the power supply, by carrying the operation described in the second embodiment.

Accordingly, in the case in which the power-supply control unit 312 of the facsimile compound device receives the instruction signal from the central management device, the power-supply control unit 312 supplies the electricity from the main power source 310 to the part including the CPU 321, which is surrounded by the broken line in FIG. 38 and functions as the communication control means, and the unit preset as the part that needs the power supply, by turning on the main power source 310. Meanwhile, the power-supply control unit 312 continues not supplying the electricity to units other than the above-described part and unit. This power-supply control is the same as the power-supply control described in the second embodiment, and, thus, its description is omitted here.

Next, a simple description will be given of the control K2 for setting the part that needs the power supply, since the control K2 is the same as the control I2 described in the second embodiment.

The power-supply control unit 312 of the facsimile compound device supplies the electricity from the main power source 310 to the part surrounded by the broken line in FIG. 38, by turning on the main power source 310, in a case in which the power-supply control unit 312 receives the fixing-temperature requesting signal shown in FIG. 30 from the central management device. Additionally, the power-supply control unit 312 controls the main power source 310 according to bits "0" and "1" inside the power-source control information by extracting and analyzing the power-source control information from the fixing-temperature requesting signal. For example, if a bit corresponding to a fixing unit included in the plotter 306 is "1", the power-supply control unit 312 recognizes that the fixing unit is set to the part that needs the power supply, and, then, operates a relay to close a switch as shown in FIG. 25, thereby supplying the electricity from the main power source 310 to the fixing unit. Accordingly, the CPU 321 of the facsimile compound device can acquire a set value of a fixing temperature from the fixing unit.

As described above, the facsimile compound device used in the image-forming-device management system according to the fourth embodiment includes the NCU 302, the power-supply control unit 312, the RTC 324, the memory 329, the COMCNT 332 and the LADP RAM 351, which are always provided with the electricity from the sub power source 311. In the energy-saving mode, the power-supply control unit 312 supplies the electricity from the main power source 310 to the parts that partially function as the source detecting means, which are the FAX data modem 352, the AFE 333, the DTMF 334 and the PORT 330, in the case in which the ringer-detecting unit included in the COMCNT 332 detects a call signal that corresponds to a call out made by an external device and is transmitted to the facsimile compound device through the NCU 302 from a communication line. The power-supply control unit 312 decides whether the source (the call origin) is the central management device, based on a result of detecting the DTMF signal by the DTMF 324 after the detection of the call signal.

In the case in which the power-supply control unit 312 decides that the source is the central management device in accordance with the detection of the DTMF signal by the DTMF 324, the power-supply control unit 312 supplies the electricity from the main power source 310 to the units not supplied with the electricity yet inside the part that functions as the communication control means and is surrounded by the broken line in FIG. 38.

Subsequently, the CPU 321 receives the instruction signal (text data) transmitted continuously after the DTMF signal from the central management device, through the NCU 302, the COMCNT 332 and the FAX data modem 352, and, then communicates with the central management device. For example, the CPU 321 transmits data stored in the LADP RAM 351 to the central management device by using the FAX data modem 352, the COMCNT 332 and the NCU 302. After completion of the data transmission to the central management device, the power-supply control unit 312 turns off the main power source 310, thereby stopping the power supply to each part related to communication.

Accordingly, the facsimile compound device can reduce unnecessary electricity consumption as well as can carry out communication between the facsimile compound device and the central management device.

Additionally, in the case in which the CPU 321 receives the instruction signal, which is the data-transmission requesting signal or the data-write requesting signal, from the central management device, the CPU 321 instructs the power-supply control unit 312 to supply the electricity from the main power source 310 to a predetermined part. This predetermined part is either the part that needs power supply for acquiring data, which should be transmitted to the central management device, or the part that needs the power supply for writing data received from the central management device. Subsequently, the CPU 321 stops the power supply after completing communication with the central management device. Accordingly, the facsimile compound device can reduce its electricity consumption. Additionally, the central management device can definitely acquire desired data from the facsimile compound device.

Alternatively, in the case in which the CPU 321 receives the instruction signal, which is the data-transmission requesting signal or the data-write requesting signal, from the central management device, the CPU 321 decides a type of data that should be transmitted to the central management device, based on the instruction signal. Subsequently, the CPU 321 decides the part that needs power supply for acquiring data, which should be transmitted to the central management device, or the part that needs the power supply for writing data received from the central management device, based on a result of deciding a type of the data. The CPU 321, then, instructs the power-supply control unit 312 to supply the electricity from the main power source 310 to the part that needs the power supply. After completing communication with the central management device, the CPU 321 stops the power supply from the main power source 310. Accordingly, the facsimile compound device can reduce its electricity consumption. Additionally, the central management device can definitely acquire desired data from the facsimile compound device.

The sub power source 311 may constantly supply the electricity to the NCU 302, the power-supply control unit 312, the RTC 324, the memory 329, the PORT 330, the COMCNT 332, the AFE 333, the DTMF 334, the LADP RAM 351 and the FAX data modem 352. In the case in which the ringer-detecting unit of the COMCNT 332 detects a call signal that corresponds to a call out made by an external device and is transmitted from the communication line to the facsimile compound device through the NCU 302, the DTMF 324 checks if the DTMF signal is received through the NCU 302, right after the detection of the call signal by the COMCNT 332. Accordingly, the power-supply control unit 312 can decide whether the source (the call origin) is the central management device according to a result of detecting the DTMF signal by the DTMF 324.

Furthermore, the facsimile compound device used in the image-forming-device management system according to the fourth embodiment includes the NCU 302, the power-supply control unit 312, the RTC 324, the memory 329, the COMCNT 332 and the LADP RAM 351, which are constantly supplied with the electricity from the sub power source 311. In the energy-saving mode, the data-transmission-time comparing unit included in the RTC 324 compares the current time generated by the time generating unit with the data-transmission time preset in the data-transmission-time setting register. This data-transmission-time comparing unit generates the data-transmission request that requests for data transmission to the central management device, if the current time matches with the data-transmission time, or if the current time passes the data-transmission time.

If the power-supply control unit 312 is notified about the generation of the data-transmission request, the power-supply control unit 312 supplies the electricity from the main power source 310 to the part that functions as the communication control means (LADP) and is surrounded by the broken line in FIG. 38, by turning on the main power source 310. Consequently, the CPU 321 transmits data stored in the LADP RAM 351 to the central management device by using the FAX data modem 352, the COMCNT 332 and the NCU 302. After the data transmission to the central management device, the CPU 321 stops the power supply to the part surrounded by the broken line in FIG. 38, by turning off the main power source 310 by use of the power-supply control unit 312.

Accordingly, the facsimile compound device can reduce unnecessary electricity consumption as well as can carry out data transmission to the central management device at any time.

In the above-described embodiments, an operation mode of each device can be selected between the normal operation mode and the energy-saving mode. However, the operation mode may always be set to the energy-saving mode, in which a main power source is normally turned off.

The embodiments have been described about the data communication device and the image-forming device such as a copy machine and a facsimile compound device used in a remote management system, which is the image-forming-device management system for managing the image-forming device remotely. However, the present invention is not limited to the above-described embodiments, and is applicable to a data communication device used in a remote management system that remotely manages various types of remotely-managed devices such as a key-card remote management system that remotely manages various types of remotely-managed devices such as a key-card device managing the number of copies made by a copy machine by a group, a gas meter, an electricity meter and a vending machine.

As described above, the data communication device and the image-forming device that compose the image-forming-device management system can reduce unnecessary electricity consumption as well as can carry our data transmission at any time.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is a continuation of application Ser. No. 09/874,994, filed Jun. 7, 2001, and is based on Japanese Priority Applications No. 2000-172219, filed on Jun. 8, 2000, No. 2000-196899, filed on Jun. 29, 2000, and No. 2001-051180, filed on Feb. 26, 2001, the entire contents of which are hereby incorporated by reference.

What is claimed is:

1. A data communication device configured to be connected to a data destination device through a communication line and to control communication between said data destination device and a data source device, said data communication device comprising:
   a power source;
   a data-storing unit configured to store data related to said data source device;
   a data transmission unit;
   a transmission-request generating unit configured to always be supplied with electricity from said power source and to generate a transmission request that requests transmission of the data to said data destination device; and
   a power-supply control unit configured to always be supplied with the electricity from said power source and to supply the electricity from said power source to a communication-related part including said data transmission unit, if said,transmission-request generating unit generates the transmission request, wherein said data transmission unit transmits the data to said data destination device if said data transmission unit is supplied with the electricity from said power source.

2. The data communication device as claimed in claim 1, wherein said power-supply control unit is configured to stop supplying the electricity from said power source to said communication-related part after said data transmission unit completes transmitting the data related to said data source device to said data destination device.

3. The data communication device as claimed in claim 1, wherein said transmission-request generating unit comprises:
   a time generating unit configured to generate a current time; and
   a time comparing unit configured to compare the current time with a predetermined data-transmission time, and said transmission-request generating unit is further to generate the transmission request if the current time matches with the predetermined data-transmission time.

4. The data communication device as claimed in claim 1, wherein said transmission-request generating unit comprises:
   a time generating unit configured to generate a current time;
   a data deciding unit configured to compare the current time with a predetermined data-transmission time, and to decide whether the data related to said data source device is stored in said data-storing unit if the current time matches with the data-transmission time; and
   a transmission requesting unit configured to generate the transmission request if said data deciding unit decides that the data related to said data source device is stored in said data-storing unit.

5. The data communication device as claimed in claim 1, wherein said transmission-request generating unit comprises:
   a time generating unit configured to generate a current time;
   a data deciding unit configured to decide whether the data related to said data source device is stored in said data-storing unit; and
   a time comparing unit configured to compare the current time with a predetermined data-transmission time corresponding to the data related to said data source device if said data deciding unit decides that the data related to said data source device is stored in said data-storing unit, and to generate the transmission request if the current time matches with the data-transmission time.

6. The data communication device as claimed in claim 1, wherein said transmission-request generating unit comprises:
   a time generating unit configured to generate a current time;
   a data deciding unit configured to decide whether the data related to said data source device is stored in said data-storing unit;
   a time setting unit configured to set a transmission time corresponding to the data related to said data source device, if said data deciding unit decides that the data related to said data source device is stored in said data-storing unit; and
   a time comparing unit configured to compare the current time with the transmission time, and to generate the transmission request if the current time matches with the transmission time.

7. The data communication device as claimed in claim 1, further comprising:
   a call-origin deciding unit configured to always be supplied with the electricity from said power source, and to decide whether a call origin is said data destination device based on a signal received continuously after a call signal if the call signal from said communication line in accordance with a call out made by the call origin is received, wherein said power-supply control unit is configured to always be supplied with the electricity from said power source, and to supply the electricity from said power source to said communication-related part if said call-origin deciding unit decides that the call origin is said data destination device, and wherein said data transmission unit is configured to transmit the data related to said data source device to said data destination device if said data destination device is supplied with the electricity from said power source.

8. The data communication device as claimed in claim 7, wherein said power-supply control unit is configured to stop supplying the electricity from said power source to said communication-related part after said data transmission unit completes transmitting the data related to said data source device to said data destination device.

9. The data communication device as claimed in claim 1, further comprising:
   a transmission-request-signal transmitting unit;
   a data writing unit; and
   an acquisition-request generating unit configured to always be supplied with electricity from said power source and to generate an acquisition request that requests acquisition of the data related to said data source device from said data source device,
   wherein said power-supply control unit is configured to supply the electricity from said power source to said transmission-request-signal transmitting unit and said data writing unit if said acquisition-request generating unit generates the acquisition request, said transmission-request-signal transmitting unit transmits a transmission-request signal to said data source device if said transmission-request-signal transmitting unit is supplied with the electricity from said power source, and said data-writing unit writes the data related to said data source device in said data-storing unit if the data related to said data source device is received from said data source device in response to said transmission-request signal after said data writing unit is supplied with the electricity from said power source.

10. The data communication device as claimed in claim 9, wherein said power-supply control unit is configured to stop supplying the electricity from said power source to said transmission-request-signal transmitting unit and said data writing unit after said data writing unit completes writing the data related to said data source device in said data-storing unit.

11. The data communication device as claimed in claim 9, wherein said acquisition-request generating unit comprises:
   a time generating unit configured to generate a current time; and
   a time comparing unit configured to compare the current time with a predetermined data-acquisition time, and said acquisition-request generating unit is configured to generate the acquisition request if the current time matches with the data-acquisition time.

12. The data communication device as claimed in claim 7, further comprising:
   a data-type deciding unit; and
   a transmission-request-signal transmitting unit,
   wherein said power-supply control unit is configured to supply the electricity from said power source to said data-type deciding unit and to said transmission-request-signal transmitting unit if said call-origin deciding unit decides that the call origin is the data destination device,
   wherein said data-type deciding unit is configured to decide a type of data that should be transmitted to said data destination device based on said signal received continuously after the call signal from said communication line, after said data-type deciding unit is supplied with the electricity from said power source,
   wherein said transmission-request-signal transmitting unit is configured to transmit a transmission-request signal to said data source device, if and only if said transmission-request-signal transmitting unit is supplied with the electricity from said power source, and said data-type deciding unit decides that said data that should be transmitted to said data destination device is the data related to said data source device, and
   wherein said data transmission unit is configured to transmit the data related to said data source device, to said data destination device, if and only if said data transmission unit is supplied with the electricity from said power source and said data related to said data source device is received from said data source device in response to the transmission-request signal.

13. The data communication device as claimed in claim 12, wherein said transmission-request-signal transmitting unit is configured to add information indicating said type decided by said data-type deciding unit to the transmission-request signal.

14. The data communication device as claimed in claim 1, further comprising:
   a data writing unit,
   wherein said power-supply control unit is configured to supply the electricity from said power source to said data writing unit if a startup signal is received from said data source device, and said data writing unit is configured to write the data related to said image source device in said data-storing unit if supplied with the electricity from said power source and the data related to said data source device is received from said data source device.

15. The data communication device as claimed in claim 14, wherein said power-supply control unit is configured to stop supplying the electricity from said power source to said data writing unit after said data writing unit completes writing the data related to said data source device in said data-storing unit.

16. The data communication device as claimed in claim 14, further comprising:
   a data-type deciding unit,
   wherein said power-supply control unit is configured to supply the electricity from said power source to said data-type deciding unit if the startup signal from said data source device is received, said data-type deciding unit is configured to decide a type of the data related to said data source device if the data related to said data source device is received from said data source device after said data type deciding unit is supplied with the electricity from said power source, said power-supply control unit is configured to supply the electricity from said power source to said communication-related part if said data-type deciding unit decides that the data received from said data source device is data indicating an abnormal condition, and said data transmission unit transmits the data received from said data source device to said data communication device if the electricity from the power source is received.

17. The data communication device as-claimed in claim 1, wherein said communication line is a public line, and said data source device is a copy machine.

18. A data source device that is connected to a data communication device, and communicates with a data destination device in accordance with control carried out by said data destination device, said data source device comprising:
- a power source;
- a data transmission unit; and
- a power-supply control unit configured to always be supplied with electricity from said power source, and to supply the electricity from said power source to a communication-related part including said data transmission unit if a transmission-request signal from said data communication device is received,
- wherein said data transmission unit transmits data related to said data source device, to said data communication device if said data communication device is supplied with the electricity from said power source.

19. The data source device as claimed in claim 18, wherein said data related to said data source device is data that indicates a total amount of data generated by said data source device or a condition of said data source device.

20. The data source device as claimed in claim 18, wherein said power-supply control unit is configured to stop supplying the electricity from said power source to said communication-related part after said data transmission unit completes transmitting the data related to said data source device to said data communication device.

21. The data source device as claimed in claim 18, wherein said power-supply control unit is configured to supply the electricity from said power source to a part that needs electricity for acquiring data, which should be transmitted to said data destination device among the data related to said data destination device, if the transmission-request signal is received from said data communication device.

22. The data source device as claimed in claim 21, wherein said power-supply control unit is configured to stop supplying the electricity from said power source to said part that needs the electricity for acquiring the data after said data transmission unit completes transmitting the data that should be transmitted to said data destination device from said data communication device.

23. The data source device as claimed in claim 21, further comprising a power-supply part setting unit configured to set the part that needs the electricity for acquiring the data.

24. The data source device as claimed in claim 18, wherein said data transmission unit is configured to transmit data corresponding to information that indicates a type of data, which should be transmitted to said data destination device and is added to said transmission request signal among the data related to said data source device, if said data transmission unit is supplied with the electricity from said power source.

25. The data source device as claimed in claim 24, wherein said power-supply control unit is configured to stop supplying the electricity from said power source to said communication-related part after said data transmission unit completes transmitting the data corresponding to the information to said data communication device.

26. The data source device as claimed in claim 24, wherein said power-supply control unit is configured to decide a part that needs the electricity for acquiring the data, which should be transmitted to said data destination device based on said information added to the transmission-request signal, and to supply the electricity from said power source to the part that needs the electricity for acquiring the data, if the said data-transmission signal is received from said data communication device.

27. The data source device as claimed in claim 26, wherein said power-supply control unit is configured to stop supplying the electricity from said main power source to said part that needs the electricity for acquiring the data after said data transmission unit completes transmitting the data corresponding to the information to said data communication device.

28. The data source device as claimed in claim 18, further comprising:
- a startup-signal transmitting unit; and
- a main switch,
- wherein said power-supply control unit is configured to always be supplied with the electricity from said power source and to supply the electricity from said power source to said data source device entirely according to an operation of said main switch,
- wherein said startup-signal transmitting unit is configured to transmit a startup signal to said data communication device to start up said data communication device if said startup-signal transmitting unit is supplied with the electricity from said power source, and
- wherein said data transmission unit is configured to transmit the data related to said data source device to said data communication device after said data transmission unit is supplied with the electricity from said power source, and said startup-signal transmitting unit is configured to transmit the startup signal to said data communication device.

29. The data source device as claimed in claim 18, further comprising:
- a startup-signal transmitting unit; and
- a transmission-request generating unit,
- wherein said communication-related part further includes said startup-signal transmitting unit,
- wherein said transmission-request generating unit is configured to always be supplied with the electricity from said power source and to generate a transmission request that requests transmission of the data related to said data source device to said data communication device,
- wherein said power-supply control unit is configured to always be supplied with the electricity from said power source and to supply the electricity from said power source to said communication-related part if said transmission-request generating unit generates the transmission request,
- wherein said startup-signal transmitting unit is configured to transmit a startup signal to said data communication device to start up said data communication device if said startup-signal transmitting unit is supplied with the electricity from said power source, and
- wherein said data transmission unit is configured to transmit the data related to said data source device to said data communication device after said data transmission unit is supplied with the electricity from said power source, and said startup-signal transmitting unit is configured to transmit the startup signal to said data communication device.

30. The data source device as claimed in claim 29, wherein said power-supply control unit is configured to stop supplying the electricity from said power source to said communication-related part after said data transmission unit completes transmitting the data related to said data source device to said data communication device.

31. The data source device as claimed in claim 29, wherein said power-supply control unit is configured to supply the electricity from said power source to a part that needs electricity for acquiring data, which should be transmitted to said data destination device among the data related to said data source device, if said transmission-request generating unit generates the transmission request.

32. The data source device as claimed in claim 31, wherein said power supply control unit is configured to stop supplying the electricity from said power source to said part that needs the electricity for acquiring the data, which should be transmitted to said data destination device after said data transmission unit completes transmitting the data that should be transmitted to said data destination device to said data communication device.

33. The data source device as claimed in claim 31, further comprising a power-supply part setting unit configured to set the part that needs the electricity for acquiring the data, which should be transmitted to said data destination device.

34. A data source device that is connected to a data destination device through a communication line, comprising:
a power source;
a communication control unit configured to control communication with said data destination device;
a transmission-request generating unit configured to always be supplied with electricity from said power source, and to generate a transmission request that requests data transmission to said data destination device; and
a power-supply control unit configured to always be supplied with the electricity from said power source, and to supply the electricity from said power source to said communication control unit if said transmission request generating unit generates the transmission request,
wherein said communication control unit is configured to transmit data related to said data source device to said data destination device, if said communication control unit is supplied with the electricity from said power source.

35. The data source device as claimed in claim 34, wherein said data destination device is an external device, and said communication line is a public line.

36. The data source device as claimed in claim 34, wherein said data related to said data source device is data that indicates a total amount of data generated by said data source device or a condition of said data source device.

37. The data source device as claimed in claim 34, wherein said power-supply control unit is configured to stop supplying the electricity from said power source to said communication control unit after said communication control unit completes transmitting the data related to said data source device to said data destination device.

38. The data source device as claimed in claim 34, wherein said transmission-request generating unit comprises:
a time generating unit configured to generate a current time; and
a time comparing unit configured to compare the current time with a predetermined data-transmission time, and to generate the transmission request if the current time matches with the data-transmission time.

39. The data source device as claimed in claim 34, further comprising a call-origin deciding unit configured to always be supplied with the electricity from said power source, and to decide whether a call origin is said data destination device based on a signal received continuously after a call signal, if the call signal from said communication line in accordance with a call out made by the call origin is received,
wherein said power-supply control unit is configured to always be supplied with the electricity from said power source, and to supply the electricity from said power source to said communication control unit if said call-origin deciding unit decides that the call origin is said data destination device, and
wherein said communication control unit is configured to transmit the data related to said data source device to said data destination device if said communication control unit is supplied with the electricity from said power source.

40. The data source device as claimed in claim 35, wherein said power-supply control unit is configured to stop supplying the electricity from said power source to said communication control unit after said communication control unit completes transmitting the data related to said data source device to said data destination device.

41. The data source device as claimed in claim 39, wherein said power-supply control unit is configured to supply the electricity from said power source to a part that needs the electricity for acquiring data, which should be transmitted to said data destination device among the data related to said data source device, if said call-origin deciding unit decides that the call-origin is said data destination device.

42. The data source device as claimed in claim 41, wherein said power-supply control unit is configured to stop supplying the electricity from said power source to said part that needs the electricity for acquiring the data after said communication control unit completes transmitting the data that should be transmitted to said data destination device.

43. The data source device as claimed in claim 41, further comprising a power-supply part setting unit configured to set the part that needs the electricity for acquiring the data.

44. The data source device as claimed in claim 39, further comprising:
a data-type deciding unit configured to be supplied with the electricity from said power source, and to decide a type of data that should be transmitted to said data destination device based on the signal received continuously after the call signal from said communication line, if said call-origin deciding unit decides that the call origin is said data destination device; and
a power-supply part deciding unit configured to always be supplied with the electricity from said power source and to decide a part that needs the electricity for acquiring data, which should be transmitted to said data destination device among the data related to said data source device,
wherein said power-supply control unit is configured to supply the electricity from said power source to the part decided by said power-supply part deciding unit as the part that needs the electricity for acquiring data, and
wherein said communication control unit is configured to acquire the data that should be transmitted to said data destination device and to transmit the data that should be transmitted to said data destination device to said data destination device, if said communication control unit is supplied with the electricity from said power source.

45. The data source device as claimed in claim 44, wherein said power-supply control unit is configured to stop supplying the electricity from said power source to said communication control unit and to said part decided by said power-supply part deciding unit as the part that needs the electricity for acquiring data, if said communication control unit completes transmitting the data that should be transmitted to said data destination device to said data destination device.

46. A communication system, comprising:
a data source device;
a data communication device; and
a data destination device configured to manage said data source device remotely through a communication line and said data communication device, wherein said data communication device includes, a first power source, a data-storing unit configured to store data of said data source device, a data-type deciding unit, a transmission-request-signal transmitting unit, a first data transmission unit, a call-origin deciding unit configure to always be supplied with the electricity from said first power source and to decide whether a call origin is said data destination device based on a signal received continuously after a call signal if the call signal from said communication line in accordance with a call out made by the call origin is received, and a first power-supply control unit configured to always be supplied with the electricity from said first power source and to supply the electricity from said first power source to said data-type deciding unit, to said transmission-request-signal transmitting unit, and to said first data transmission unit, if said call-origin deciding unit decides that the call origin is said data destination device, wherein said data-type deciding unit is configured to decide a type of data that should be transmitted to said data destination device based on the signal received continuously after the call signal from said communication line, if said data-type deciding unit is supplied with the electricity from said first power source, wherein said transmission-request-signal transmitting unit is configured to transmit a transmission-request signal to said data source device, if and only if said transmission-request-signal transmitting unit is supplied with the electricity from said first power source, and said data-type deciding unit is configured to decide that the data which should be transmitted to said data source device is the data related to said data source device, wherein said first data transmission unit is configured to transmit the data related to said data source device to said data destination device if said data transmission unit is supplied with the electricity from said first power source and to receive the data related to said data source device from said data source device in response to the transmission-request signal transmitted to said image-forming device by the transmission-request-signal transmitting unit, and wherein said first power-supply control unit is configured to stop supplying the electricity from said first power source to said data-type deciding unit, said transmission request signal transmitting unit, and said first data transmission unit, after said first data transmission unit completes transmitting the data related to said data source device to said data transmission device, wherein said data source device includes, a second power source, a second data transmission unit, and a second power-supply control unit that is configured to always be supplied with the electricity from said second power source, and to supply the electricity from said second power source to a communication related part including said second data transmission unit if the transmission request signal is received from said data communication device, wherein said second data transmission unit is configured to transmit the data related to said data source device to said data communication device if said second data transmission unit is supplied with the electricity from said second power source, and wherein said second power-supply control unit is configured to stop supplying the electricity from said second power source to said communication related part after said second data transmission unit completes transmitting the data related to said data source device to said data communication device.

47. The communication system as claimed in claim 46, wherein said transmission-request-signal transmitting unit of the data communication device is configured to add information indicating the type of the data that should be transmitted to said data destination device to the transmission-request signal, said type decided by said data-type deciding unit, and wherein said second power-supply control unit of the data source device is configured to decide a part that needs electricity for acquiring data that should be transmitted to said data destination device based on said information added to the transmission-request signal if the transmission-request signal from said data communication device is received and to supply the electricity from said second power source to a part decided by said second power-supply control unit as the part that needs electricity for acquiring the data, and to stop supplying the electricity from said second power source to said part decided by said second power-supply control unit as the part that needs power supply for acquiring the data after said second data transmission unit completes transmitting the data that should be transmitted to said data destination device to said data communication device.

48. The communication system as claimed in claim 46, wherein said data related to said data source device is data that indicates a total amount of data generated by said data source device or a condition of said data source device.

49. A method of controlling power supply in a communications system that remotely manages a data source device by using a data destination device through a communication line and a data communication device, said method comprising:

supplying electricity constantly from a power source of said data communication device to call-signal receiving device;

receiving a call signal from the communication line according to a call out made by a call origin;

deciding whether the call origin is said data destination device when receiving the call signal;

supplying the electricity from the power source of said data communication device to a communication-related part if deciding that the call origin is said data destination device, said communication-related part including, deciding a type of data that should be transmitted to said data destination device based on a signal received continuously after the call signal from said communication line, transmitting a transmission request signal added with information indicating the type of the data that should be transmitted to said data destination device to said data source device if recognizing that the data which should be transmitted to said data destination device is data related to said data destination device based on a result of deciding the type of the data that should be transmitted to said data destination device, receiving data from said data source device in response to the transmission-request signal transmitted to said data source device, and transmitting the data received from said data source device to said data destination device;

stopping the power supply from said power source to said communication-related part after completing a transmission of the data received from said data source device to said data destination device;

supplying the electricity constantly from a power source of said data source device to a signal receiving device receiving the transmission-request signal from said data communication device;

deciding a part that needs the power supply for acquiring the data which should be transmitted to said data destination device among the data related to said data source device, based on said information added to the transmission-request signal if the transmission-request signal is received by said signal receiving device;

supplying the electricity from the power source of said data source device to the part that needs the electricity for acquiring the data which should be transmitted to said data destination device, and a part that needs the power supply for transmitting the data to said data communication device; and stopping the power supply from the power source of said data source device to the part that needs the electricity for acquiring the data, and the part that needs the power supply for transmitting the data to said data communication device, after transmitting the data to said data communication device.

50. A method of controlling power supply in a communication system that manages a data source device by using a data destination device through a data communication device, said method comprising:

supplying electricity constantly from a power source of said data communication device to a call-signal receiving device and a call-origin deciding device;

supplying the electricity from the power source of said data communication device to a communication-related part if deciding that the call origin is said data destination device;

transmitting a transmission request from said data communication device to said data source device by use of said communication-related part;

receiving data from said data source device in response to the transmission request transmitted to said data source device;

transmitting the data to said data destination device; and stopping supplying the electricity from said power source to said communication-related part after transmitting the data to said data destination device.

51. The method as claimed in claim 50, further comprising:

supplying the electricity constantly from a power source of said data source device to request receiving device receiving the transmission request from said data communication device, in said data source device;

deciding a first part that needs the power supply for acquiring the data, based on the transmission request if the transmission-request signal is received by said signal receiving device;

supplying the electricity from the power source of said data source device to the first part and a second part that needs the power supply for transmitting the data to said data communication device;

transmitting the data to said data communication device; and stopping supplying the electricity from the power source of said data source device to the first part and the second part after transmitting the data to said data communication device.

52. An apparatus for controlling power supply in a communications system that remotely manages a data source device by using a data destination device through a communication line and a data communication device, said apparatus comprising:

means for supplying electricity constantly from a power source of said data communication device to call-signal receiving device;

means for receiving a call signal from the communication line according to a call out made by a call origin;

means for deciding whether the call origin is said data destination device when receiving the call signal;

means for supplying the electricity from the power source of said data communication device to a communication-related part if deciding that the call origin is said data destination device, said communication-related part including, means for deciding a type of data that should be transmitted to said data destination device based on a signal received continuously after the call signal from said communication line, means for transmitting a transmission request signal added with information indicating the type of the data that should be transmitted to said data destination device to said data source device if recognizing that the data which should be transmitted to said data destination device is data related to said data destination device based on a result of deciding the type of the data that should be transmitted to said data destination device, means for receiving data from said data source device in response to the transmission-request signal transmitted to said data source device, and means for transmitting the data received from said data source device to said data destination device;

means for stopping the power supply from said power source to said communication-related part after completing a transmission of the data received from said data source device to said data destination device;

means for supplying the electricity constantly from a power source of said data source device to a signal receiving device receiving the transmission-request signal from said data communication device;

means for deciding a part that needs the power supply for acquiring the data which should be transmitted to said data destination device among the data related to said data source device, based on said information added to the transmission-request signal if the transmission-request signal is received by said signal receiving device;

means for supplying the electricity from the power source of said data source device to the part that needs the electricity for acquiring the data which should be transmitted to said data destination device, and a part that needs the power supply for transmitting the data to said data communication device; and means for stopping the power supply from the power source of said data source device to the part that needs the electricity for acquiring the data, and the part that needs the power supply for transmitting the data to said data communication device, after transmitting the data to said data communication device.

53. An apparatus for controlling power supply in a communication system that manages a data source device by using a data destination device through a data communication device, said apparatus comprising:

means for supplying electricity constantly from a power source of said data communication device to a call-signal receiving device and a call-origin deciding device;

means for supplying the electricity from the power source of said data communication device to a communication-related part if deciding that the call origin is said data destination device;

means for transmitting a transmission request from said data communication device to said data source device by use of said communication-related part;

means for receiving data from said data source device in response to the transmission request transmitted to said data source device;

means for transmitting the data to said data destination device; and means for stopping supplying the electricity from said power source to said communication-related part after transmitting the data to said data destination device.

54. The apparatus as claimed in claim 53, further comprising:

means for supplying the electricity constantly from a power source of said data source device to request receiving device receiving the transmission request from said data communication device, in said data source device;

means for deciding a first part that needs the power supply for acquiring the data, based on the transmission request if the transmission-request signal is received by said signal receiving device;

means for supplying the electricity from the power source of said data source device to the first part and a second part that needs the power supply for transmitting the data to said data communication device;

means for transmitting the data to said data communication device; and means for stopping supplying the electricity from the power source of said data source device to the first part and the second part after transmitting the data to said data communication device.

\* \* \* \* \*